(12) United States Patent
Berns et al.

(10) Patent No.: US 7,652,789 B2
(45) Date of Patent: Jan. 26, 2010

(54) PRODUCTION OF COLOR CONVERSION PROFILE FOR PRINTING

(75) Inventors: Roy S. Berns, Pittsford, NY (US); Lawrence A. Taplin, Rochester, NY (US); Yoshifumi Arai, Nagano-ken (JP); Kimito Katsuyama, Nagano-ken (JP); Takashi Ito, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 794 days.

(21) Appl. No.: 10/700,658

(22) Filed: Nov. 3, 2003

(65) Prior Publication Data

US 2005/0094169 A1 May 5, 2005

(51) Int. Cl.
*G03F 3/00* (2006.01)
(52) U.S. Cl. .......................... 358/1.9; 358/1.1; 358/518; 358/504; 382/162; 382/167; 345/598; 345/599
(58) Field of Classification Search .................. 358/1.9, 358/502, 504, 518, 520, 521, 523, 534, 3.02, 358/3.09–3.12, 525, 3.27, 2.1, 1.1, 500, 515, 358/3.03, 3.04, 3.05, 3.06, 1.2; 382/167, 382/162, 164; 347/15; 345/596, 589, 590, 345/597, 601, 602, 603, 613, 598, 599
See application file for complete search history.

(56) References Cited

U.S. PATENT DOCUMENTS 5,929,906 A    7/1999    Arai et al.

(Continued)

FOREIGN PATENT DOCUMENTS

JP    11-261740    9/1999

(Continued)

OTHER PUBLICATIONS

Y. Chen et al., "A Multi-Ink Color-Separation Algorithm Maximizing Color Constancy," IS&T/SID Eleventh Color Imaging Conference (Nov. 2003), pp. 277-281.

(Continued)

*Primary Examiner*—King Y Poon
*Assistant Examiner*—Lawrence E Wills
(74) *Attorney, Agent, or Firm*—Martine Penilla & Gencarella, LLP

(57) ABSTRACT

A spectral printing model converter is used to convert ink amount data to spectral reflectance of a color patch to be printed according to the ink amount data. A plurality of sample ink amount data each representing a set of ink amounts of plural inks is provided, and each sample ink amount data is converted into spectral reflectance of a virtual sample patch to be printed with the ink amounts represented by the sample ink amount data using the spectral printing model converter. An evaluation index is calculated for each sample ink amount data, where the evaluation index includes a color difference index and an image quality index of the virtual sample patch to be printed according to the sample ink amount data. The color difference index represents a color difference between a sample color which is calculated from the spectral reflectance and a comparative color which is selected as a basis for comparison. Plural sample ink amount data is then selected based on the evaluation index, and a profile defining correspondence between colorimetric value data and ink amount data is produced based on the selected plural sample ink amount data.

38 Claims, 34 Drawing Sheets

U.S. PATENT DOCUMENTS

| | | | |
|---|---|---|---|
| 6,761,426 B2 * | 7/2004 | Tsuchiya et al. | 347/19 |
| 6,987,567 B2 * | 1/2006 | Takahashi et al. | 356/405 |
| 7,053,910 B2 | 5/2006 | Newman | |
| 7,298,513 B2 | 11/2007 | Namikata | |
| 2002/0024574 A1 * | 2/2002 | Uchida | 347/104 |
| 2003/0002064 A1 * | 1/2003 | Otsuki | 358/1.13 |
| 2003/0098896 A1 | 5/2003 | Berns et al. | |
| 2003/0177930 A1 * | 9/2003 | Derhak et al. | 101/484 |
| 2003/0214686 A1 * | 11/2003 | Saito et al. | 358/504 |
| 2005/0219569 A1 * | 10/2005 | Yamamoto et al. | 358/1.9 |
| 2007/0291312 A1 * | 12/2007 | Kaneko et al. | 358/2.1 |

FOREIGN PATENT DOCUMENTS

| | | |
|---|---|---|
| JP | 2001-320592 | 11/2001 |
| JP | 2002-354276 | 12/2002 |
| JP | 2003-153015 | 5/2003 |
| JP | 2003-153024 | 5/2003 |
| JP | 2003-303085 | 10/2003 |

OTHER PUBLICATIONS

Final Program and Proceedings of IS&T/SID, Fourth Color Imaging Conference: Color Science, Systems and Applications (Nov. 19-22, 1996), pp. i-iii and 4-9.

Y. Arai et al., "A neural network for correcting the color shifts due to the illuminant changes," Progress in Neural Information Processing: Proceedings of the International Conference on Neural Information Processing (Sep. 24-27, 1996), pp. 350-355.

Y. Arai et al., "Device-and-illuminant independent color reproduction using principal component analysis and neural networks," Device-Independent Color Imaging II: Proceedings of SPIE-The International Society for Optical Engineering (Feb. 7-8, 1995), vol. 2414, pp. i-iv and 114-122.

Y. Arai et al., "A Color Conversion Method Using a Neural Network for a Cross-Media Color Appearance Matching," AIC Color 97, Proceedings of the 8th Congress of the International Colour Association (May 25-30, 1997), pp. 556-569, vol. II, The Color Science Association of Japan, Kyoto, Japan.

Abstract of Japanese Patent Publication No. JP 11-261740, Pub. Date: Sep. 24, 1999, Patent Abstracts of Japan.

Abstract of Japanese Patent Publication No. JP 2001-320592, Pub. Date: Nov. 16, 2001, Patent Abstracts of Japan.

Abstract of Japanese Patent Publication No. JP 2002-354276, Pub. Date: Dec. 6, 2002, Patent Abstracts of Japan.

Abstract of Japanese Patent Publication No. JP 2003-153015, Pub. Date: May 23, 2003, Patent Abstracts of Japan.

Abstract of Japanese Patent Publication No. JP 2003-153024, Pub. Date: May 23, 2003, Patent Abstracts of Japan.

Abstract of Japanese Patent Publication No. JP 2003-303085, Pub. Date: Oct. 24, 2003, Patent Abstracts of Japan.

* cited by examiner

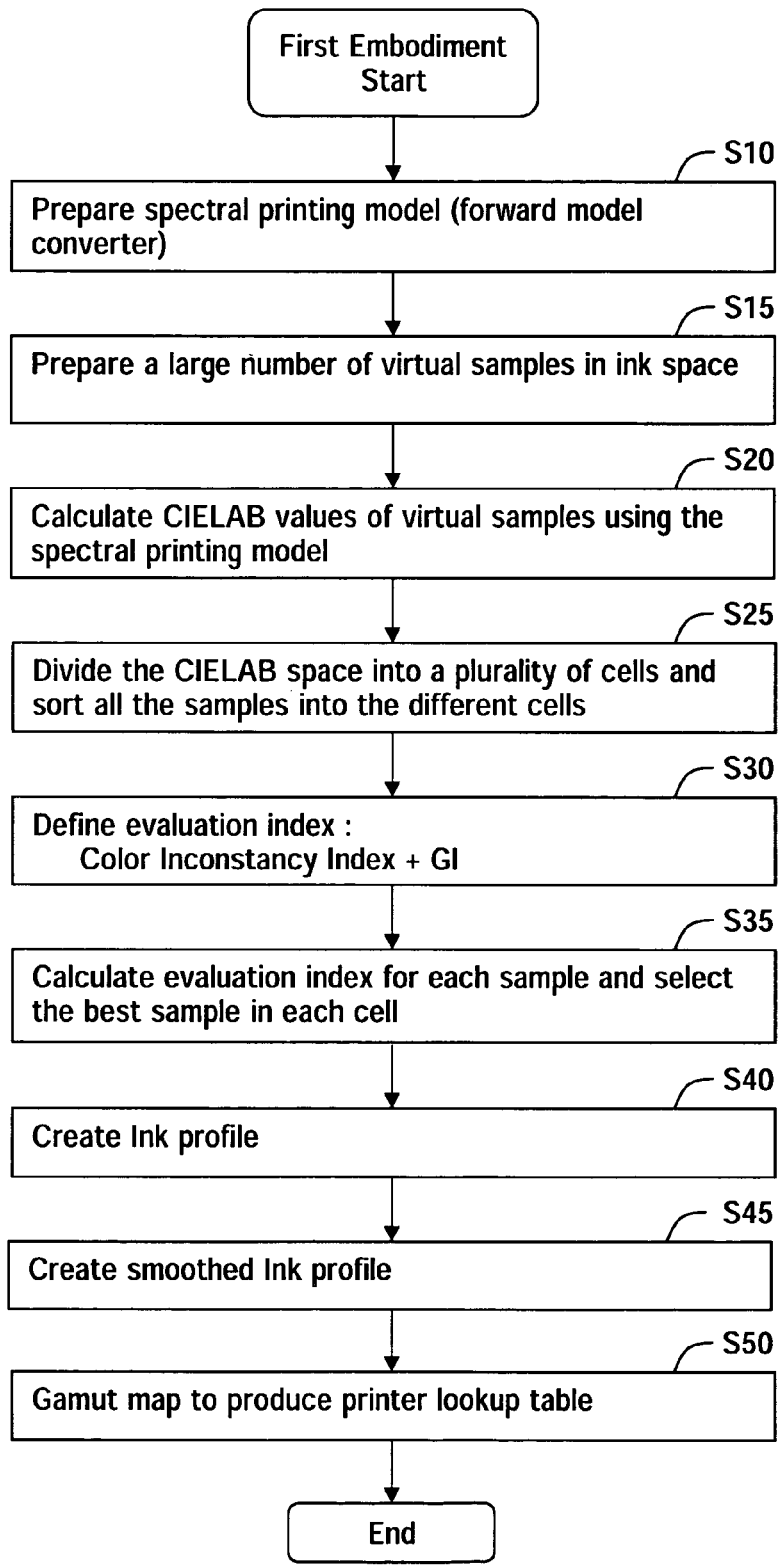

parameter data

- X resolution : 1440dpi
- Y resolution : 720dpi
- number of colors : 6
- printing media : photo paper
- number of subpixels／pixel : 20
- number of nozzles : 180 dot shape data

| color | nozzle No | first dot | | second dot | | relative distance | |
|---|---|---|---|---|---|---|---|
| | | Xsize ($Y_0$) | Ysize ($Y_0$) | Xsize ($X_1$) | Ysize ($Y_1$) | Xsize ($X_2$) | Ysize ($Y_2$) |
| C | #1 ⋮ #180 | 46 ⋮ 42 | 24 ⋮ 22 | 0 ⋮ 0 | 0 ⋮ 0 | 0 ⋮ 0 | 0 ⋮ 0 |
| M | #1 ⋮ #180 | | | | | | |
| Y | #1 ⋮ #180 | | | | | | |
| K | #1 ⋮ #180 | | | | | | |
| O | #1 ⋮ #180 | | | | | | |
| G | #1 ⋮ #180 | | | | | | |

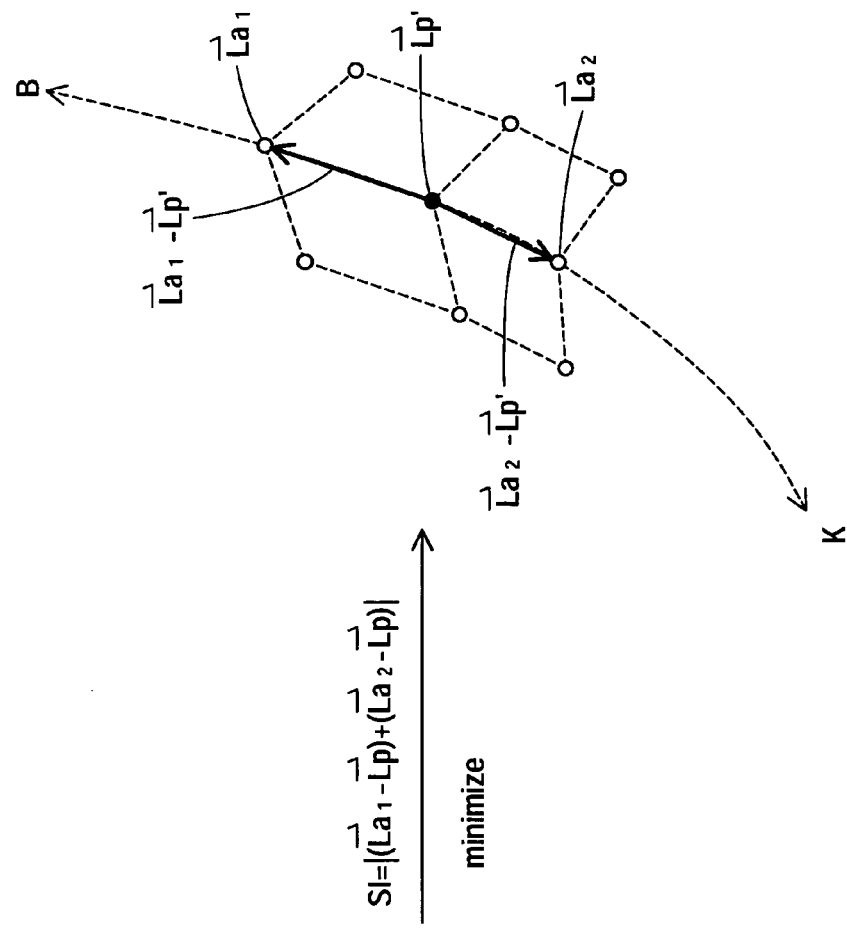
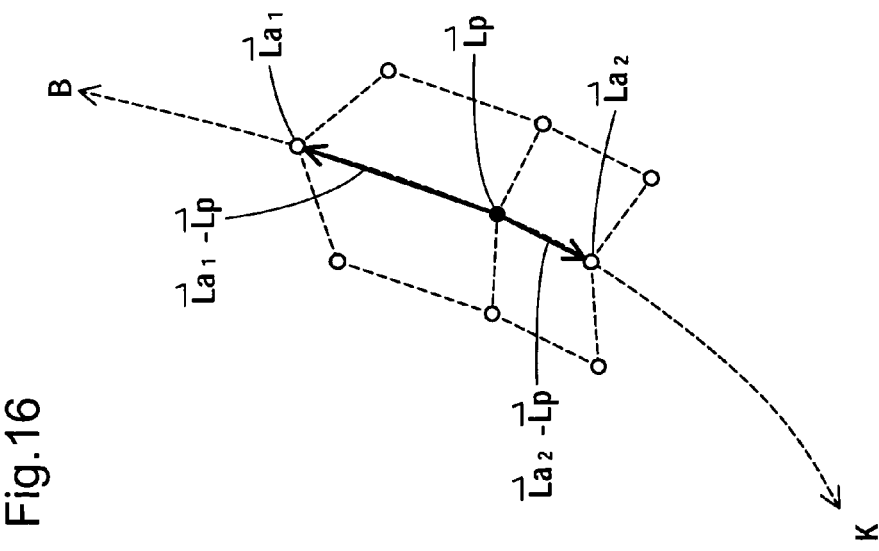
Fig. 16

Spectral Neugebauer model $$R(\lambda) = a_w R_w(\lambda) + a_c R_c(\lambda) + \cdots + a_k R_k(\lambda)$$
$$a_w = (1-f_c)(1-f_m)(1-f_y)$$
$$a_c = f_c(1-f_m)(1-f_y)$$
$$a_m = (1-f_c)f_m(1-f_y)$$
$$a_y = (1-f_c)(1-f_m)f_y$$
$$a_r = (1-f_c)f_m f_y$$
$$a_g = f_c(1-f_m)f_y$$
$$a_b = f_c f_m(1-f_y)$$
$$a_k = f_c f_m f_y$$

Murray-Davies model $$f_c = f_{\text{1D-LUT}}(d_c)$$

Cell division in
Cellular Yule-Nielsen Spectral Neugebauer Model

Ink area coverage fc(d)

Calculation of $Rsmp(\lambda)$ $$Rsmp(\lambda) = \left(\sum a_i R_i(\lambda)^{1/n}\right)^n$$
$$= \left(a_{11}R_{11}(\lambda)^{1/n} + a_{12}R_{12}(\lambda)^{1/n} + a_{21}R_{21}(\lambda)^{1/n} + a_{22}R_{22}(\lambda)^{1/n}\right)^n$$

Selected digital counts and area coverages of every ink for Cellular Yule-Nielsen Spectral Neugebauer Model

|         | Digital counts of ink amount ||||
|---------|---|-----|-----|-----|
| Cyan    | 0 | 50  | 168 | 255 |
| Magenta | 0 | 56  | 173 | 255 |
| Yellow  | 0 | 49  | 162 | 255 |
| Black   | 0 | 56  | 126 | 255 |
| Green   | 0 | 43  | 182 | 255 |
| Orange  | 0 | 64  | 186 | 255 |

$R(\lambda) = \{a_w R_w(\lambda)^{1/n} + a_c R_c(\lambda)^{1/n} + a_m R_m(\lambda)^{1/n} + a_b R_b(\lambda)^{1/n}\}^n$ $a_w = (1-f_c)(1-f_m)$
$a_c = f_c(1-f_m)$
$a_m = (1-f_c)f_m$
$a_b = f_c f_m$

PRODUCTION OF COLOR CONVERSION PROFILE FOR PRINTING

FIELD OF THE INVENTION

The present invention relates to a technique for producing a color conversion profile for use in printing.

BACKGROUND OF THE INVENTION

In recent years, the use of color ink-jet printers, color laser printers, and the like as color printers has become widespread. A color printer uses a color conversion lookup table to convert input color image data into amounts of plural inks. In the conventional method for creating a color conversion lookup table, (i) a plurality of color patches are printed, (ii) colors of the color patches are measured to obtain their colorimetric values, and (iii) a lookup table that represents correspondence relationships between color patch calorimetric values and the amounts of ink used to print the color patches is created.

However, calorimetric values are dependent upon viewing condition during color measurement. Accordingly, where a color conversion lookup table has been created so as to give a printout having good color reproduction under a certain viewing condition, it will not necessarily be the case that printouts created using that color conversion lookup table will afford good color reproduction under other viewing conditions. Accordingly, there has for some time existed a need for a color conversion lookup table able to give good color reproduction under various viewing conditions. There has also been a need, when creating a reproduction of a painting or drawing for example, to create a color conversion lookup table that can reproduce as faithfully as possible the color appearance of the original.

The image quality of a printout created using a color conversion lookup table is dependent in large degree to the calorimetric values and ink amounts specified in the color conversion lookup table. In practical terms, it is necessary for a color conversion lookup table to simultaneously afford good reproduction under various viewing conditions, and high image quality in printed output. According, there was a need to create a color conversion lookup table capable of afford good reproduction under various viewing conditions while at the same time printing with high image quality. Such requirements are not limited just to color conversion lookup tables, but are generally desirable in all manner of profiles used for color conversion.

SUMMARY OF THE INVENTION

Accordingly, the present invention produces a color conversion profile which achieves good color reproduction under various viewing conditions. The invention also produces a color conversion profile for reproducing faithfully the color appearance of an original. Additionally, the invention produces a color conversion profile which prints with high image quality. For example, the invention produces a color conversion profile providing printed output in which no graininess is apparent to the observer, having smooth transitions in tone, and having a large dynamic range of tone change.

A method of producing a profile defining correspondence between calorimetric value data and ink amount data representing a set of ink amounts of plural inks usable by a printer, comprising: (a) providing a spectral printing model converter configured to convert ink amount data to spectral reflectance of a color patch to be printed according to the ink amount data; (b) providing a plurality of sample ink amount data each representing a set of ink amounts of plural inks; (c) converting each sample ink amount data into spectral reflectance of a virtual sample patch to be printed with the ink amounts represented by the sample ink amount data using the spectral printing model converter; (d) calculating an evaluation index for each sample ink amount data, the evaluation index including a color difference index and an image quality index of the virtual sample patch to be printed according to the sample ink amount data, the color difference index representing a color difference between a sample color which is calculated from the spectral reflectance and a comparative color which is selected as a basis for comparison; (e) selecting plural sample ink amount data based on the evaluation index; and (f) producing a profile defining correspondence between colorimetric value data and ink amount data based on the selected plural sample ink amount data.

According to this method, by calculating an appropriate color difference evaluation index, it is possible to produce a color profile that achieves good color reproduction under various viewing conditions, or to produce a color profile capable of reproducing faithfully the color appearance of an original. Additionally, by calculating a image quality evaluation index, it is possible to objectively evaluate image quality of printed output, and to produce a color conversion profile able to achieve color reproduction as described above, while at the same time capable of printing with high image quality. Also, by defining a smoothness evaluation index representing smoothness of distribution of points in the aforementioned step (f), and producing a color conversion profile using a highly rated sample, it becomes possible to create a color conversion profile capable of producing printed output with smooth variation in tone.

The color difference evaluation index may be one including a color inconstancy index, or one including a metamerism index. When an evaluation index that includes a color inconstancy index is used, it is possible to produce a color profile that achieves good color reproduction under various viewing conditions.

As the image quality evaluation index, there may be used, for example, an index for evaluating graininess, an index for evaluating smoothness of distribution of points, and index for evaluating gamut size, or an index for evaluating ink amount. By using the graininess index, it is possible to avoid the appearance of graininess to the observer. As the graininess index, there could be employed one that includes an index for simulating dot recording state in a virtual patch and evaluating the spatial frequency of the simulation result. With such an index, it becomes possible to quantify graininess and noise of a printout, and to evaluate graininess without actually printing. During simulation of dot recording state, by considering variations in shape and placement of dots due to differences in dot shape, error-induced variation in placement, or differences in control methods, it becomes possible to simulate dot recording state in an extremely accurate manner.

As a smoothness evaluation index, there may be employed an index for evaluating, for points corresponding to a color in a sample, the smoothness of distribution of the points in a specific color space. By smoothing the distribution in a specific color space of points corresponding to a color in a sample in this way, conversion accuracy by the color conversion profile can be improved, and occurrence of sharp tone reduced. That is, interpolation is employed during color conversion during and after production of a color conversion profile; typically, for points that are well-ordered within a color space, interpolation can be carried out without creating significant variation in interpolation accuracy depending on localized position in the space when interpolating colors therebetween. Accordingly, by smoothing the distribution of points in accordance with the present invention, interpolation calculations can be carried out with a high degree of accuracy during color conversion during and after production of a color conversion profile. As a result, it becomes possible to produce a color conversion profile that reduces the occurrence of sharp tone and that gives printed output having smooth variation in tone. When smoothing the distribution of points, by using constraining conditions for maintaining gamut size during the smoothing process, it is possible to ensure a large gamut. As a result, rich-toned printout can be obtained.

The present invention may take any of a number of different embodiments, for example, a profile production method and profile production device, a computer program for realizing the functions of such a method or device, a storage medium having such a computer program recorded thereon, and a data signal including such a computer program and embodied in a carrier wave.

BRIEF DESCRIPTION OF THE DRAWINGS

FIG. 2 is a flowchart illustrating process flow in Embodiment 1.

FIG. 16 is an illustration of an SEI for optimizing a point on an edgeline.

FIG. 28 shows cell division grid coordinates in the Cellular Yule-Nielsen Spectral Neugebauer model.

DETAILED DESCRIPTION

The embodiments of the invention shall be described in the following order.

A. Embodiment 1
B. Embodiment 2
C. Embodiment 3
D. Embodiment 4
E. Embodiment 5
F. Example of Spectral Printing Model
G. Variant Examples

A. EMBODIMENT 1

Figure 1:
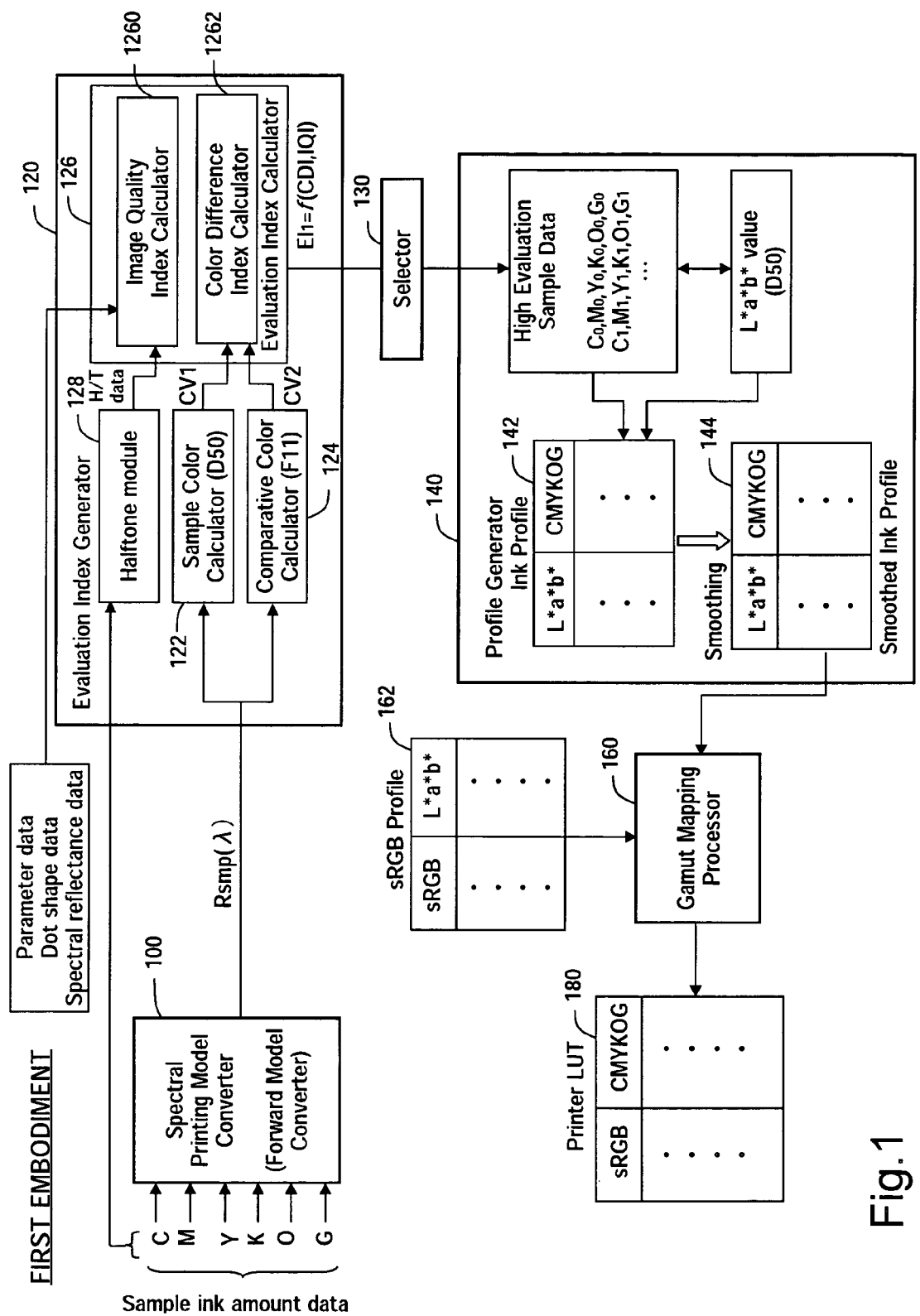
FIG. 1 is a block diagram showing system arrangement in Embodiment 1 of the invention.

FIG. 1 is a block diagram of a system in accordance with embodiments of the present invention. This system comprises a spectral printing model converter 100, an evaluation index generator 120, a selector 130, a profile generator 140, and a gamut mapping processor 160 although the system could be comprised of other numbers and types of components in other configurations. Spectral printing model converter 100 converts ink amount data into spectral reflectance Rsmp ($\lambda$) of a printed color patch to be printed according to the ink amount data. The term "color patch" herein is not limited to chromatic colors, but is used in a broad sense to include achromatic colors as well. In this embodiment, assuming a color printer that can use six colors of ink, namely, cyan (C), magenta (M), yellow (Y), black (K), orange (O), and green (G), spectral printing model converter 100 has as inputs ejection amounts of these six inks. In this embodiment, these input values are tone values representing in 256 tones ejection amounts for inks of the colors CMYKOG. The spectral printing model will be described in greater detail in Section F.

Hereinafter, "spectral printing model" will also be referred to as "forward model."

Evaluation index generator 120 comprises a sample color calculator 122, a comparative color calculator 124, an evaluation index calculator 126, and a halftone processor 128 although evaluation index generator 120 can comprise other types and numbers of elements in other combinations. Evaluation index calculator 126 includes an image quality evaluation index calculator 1260 and a color difference evaluation index calculator 1262, although evaluation index calculator 126 can comprise other types and numbers of elements in other combinations. Sample color calculator 122 uses the spectral reflectance Rsmp($\lambda$) for sample ink amount data to calculate a colorimetric value CV1 under a first viewing condition. In this embodiment, illuminant D50 is used as this first viewing condition. A color represented by calorimetric value CV1 obtained under this first viewing condition is termed a "sample color." Comparative color calculator 124 uses the spectral reflectance Rsmp($\lambda$) for sample ink amount data to calculate a calorimetric value CV2 under a second viewing condition. In this embodiment, illuminant F11 is used as this second viewing condition. Hereinafter, a color represented by calorimetric value CV2 obtained under the second viewing condition is sometimes referred to as a "comparative color."

As will be understood from the preceding description, in Embodiment 1, sample color calculator 122 and comparative color calculator 124 respectively calculate colorimetric values CV1, CV2 using the same spectral reflectance Rsmp(λ), but under different viewing conditions. Using these colorimetric values CV1, CV2, color difference evaluation index calculator 1262 calculates a color difference index CDI representing color difference observed when an output color according to sample ink amount data is viewed under different viewing conditions.

Halftone processor 128 is a module that acquires the CMYKOG tone values input to spectral printing model converter 100, and executes a halftone process. In this embodiment, halftone data representing the color of each pixel in less than 126 tones (e.g. two-tone) is generated on a color-by-color basis. During this halftone process, halftone data is generated in such a way that a virtual patch of predetermined area and uniform color can be printed. That is, the halftone process is carried out on the assumption that pixels of the aforementioned tone values are arrayed in a dot matrix.

While various algorithms can be employed in halftone processor 128, this embodiment employs as the algorithm the same algorithm employed by the printer using the printer lookup table 180 produced herein. Halftone data tone is not limited to two-tone; various other numbers of tones such as four-tone are also possible. Image quality evaluation index calculator 1260 uses halftone data for each of the colors to simulate dot formation states, without actual printing by the printer.

Using the results of the simulation, an image quality index IQI for evaluating image quality of a printout having the formation state in question is calculated.

Using the color difference evaluation index CDI and image quality evaluation index IQI described above, evaluation index calculator 126 calculates an evaluation index $EI_1$ for determining the quality of the sample ink amount data. Specific examples of the evaluation index $EI_1$ will be described hereinbelow.

Selector 130 selects sample ink amount data having a good evaluation index $EI_1$. Profile generator 140 uses the selected sample ink amount data, together with calorimetric values (L*a*b* values) of color patches printed using the sample ink amount data, to create an ink profile 142. The ink profile 142 comprises a lookup table which provides corresponding relationships between calorimetric values (L*a*b* values) and CMYKOG ink amounts. "Ink profile" may be referred to as "output device profile" as well. "Profile" herein refers to a specific embodiment of a set of conversion rules for converting color space, and is used in a wide sense to include device profiles and lookup tables of various kinds.

Gamut mapping processor 160 uses the ink profile 142 and an sRGB profile 162, which has been prepared in advance, to create a printer lookup table 180. Here, as the sRGB profile 162 there may be used, for example, a profile for converting the sRGB color space to the L*a*b* color space. "sRGB profile" may be referred to as "input device profile" as well. Printer lookup table 180 converts input color image data (e.g. sRGB data) to ink amount data.

FIG. 2 is a flowchart illustrating process flow in Embodiment 1. In Step S10, a spectral printing model is determined and a converter 100 is created. In one example, the Cellular Yule-Nielsen Spectral Neugebauer model is used as the spectral printing model. A detailed description thereof is provided in Section F.

In Step S15, a large number of virtual samples are prepared. Here, "virtual sample" refers to provisional ink amount data used in the profile creation process, and to a virtual color patch to be printed according to this ink amount data. Hereinbelow, virtual samples are also referred to simply as "samples". In the example, ink amounts for each of the CMYKOG inks are set at eleven points at 10% intervals within the range 0-100%, and the six inks are combined in all possible amounts to prepare virtual samples (sample ink amount data). As a result, $11^6$ (=1,771,516) virtual samples are prepared. "100% ink amount" refers to the amount of ink providing solid coverage with a single ink.

Figure 3A:
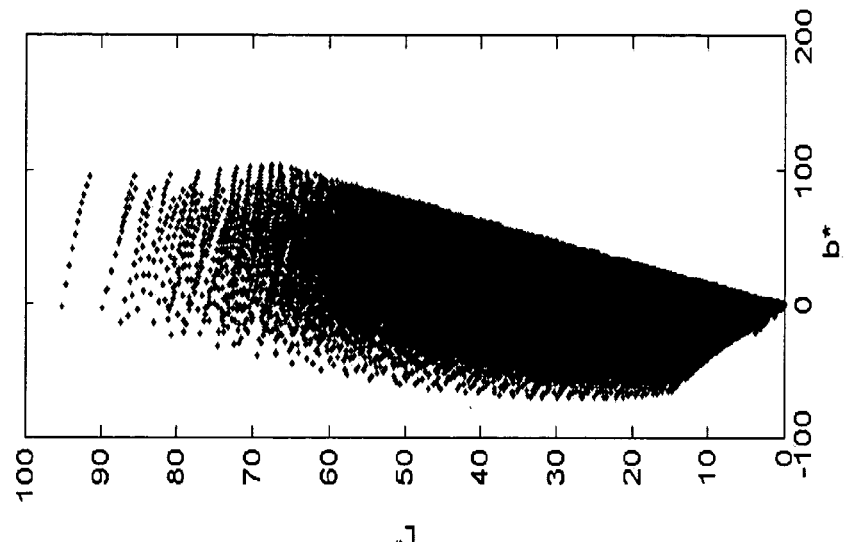
FIGS. 3(A)-3(C) are graphs showing sample colors in the CIELAB color space in a example.
Figure 3B:
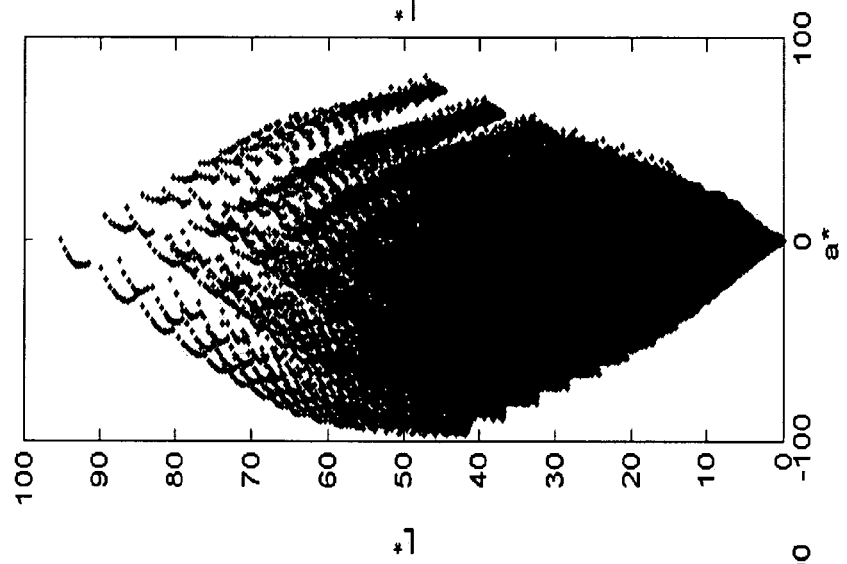
Figure 3C:
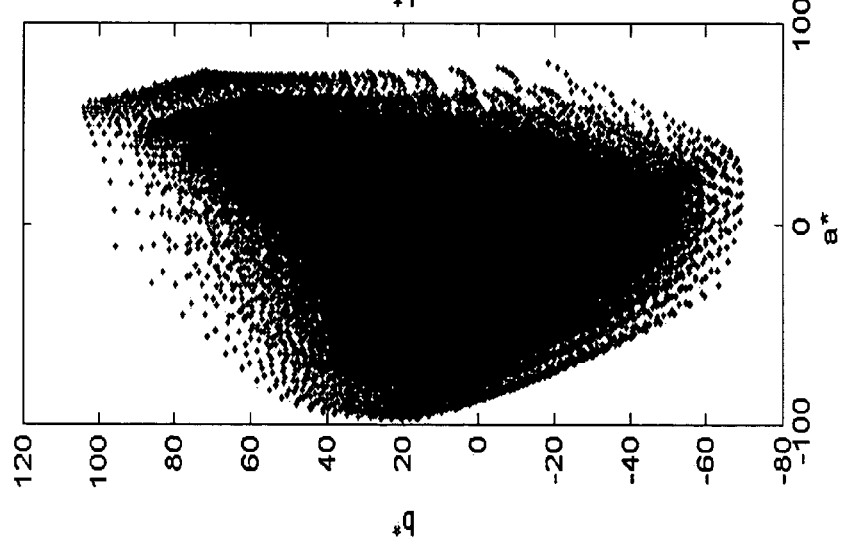

In Step S20, the sample ink amount data of the virtual samples is converted to spectral reflectance Rsmp (λ) using spectral printing model converter 100, and colorimetric values L*a*b* in the CIELAB color system are calculated from this spectral reflectance Rsmp (λ). In the example, colorimetric values are calculated using the CIE illuminant D50 and CIE 1931 2° Standard Observer viewing condition. Hereinbelow, the color observed when a virtual sample is viewed under a certain viewing condition is termed "sample color." FIGS. 3(A)-3(C) show sample color distributions calculated in the example. In FIG. 3(A) the horizontal axis represents the a* axis of the CIELAB color space, and the vertical axis represents the b* axis. In FIGS. 3(B) and (C), the horizontal axis represents the a* axis and b*, and the vertical axis represents the L* axis. As will be understood from the above, the 116 sample colors are concentrated where lightness L* is low, and distributed sparsely up to the area of high lightness L*. A more uniform distribution of sample colors may be achieved inter alia by setting sample ink amount data to finer intervals in the range of relatively small ink amount, and to coarser intervals in the range of relatively large ink amount.

In Step S25, the color space of the colorimetric values (here, the CIELAB color space) is divided into plural cells, and the plural sample colors are sorted in relation to the cells. In the example, the CIELAB color space is divided equally into 16×16×16 cells.

In Step S30, an evaluation index $EI_1$ for use in selecting a good sample is defined. The evaluation index $EI_1$ used in Embodiment 1 is represented by the following Equation (1).

$$EI_1 = f(CDI, IQI) = k \cdot CII + GI \quad (1)$$

Here, CII is a color inconstancy index, GI is a graininess index, and k is a coefficient for weighting the CII and GI. Through coefficient k, the extent of contribution of color inconstancy index CII and graininess index GI to evaluation index $EI_1$ may be modified. Of course, the value of coefficient k may be changed for each sample color discussed above. In Equation (1), the CII is the aforementioned color difference evaluation index CDI, and the GI is the aforementioned image quality evaluation index IQI. Evaluation index $EI_1$ is not limited to that given by Equation (1); another evaluation index α may be added.

CII is represented by the following equation, for example.

$$CII = \left[\left(\frac{\Delta L^*}{2S_L}\right)^2 + \left(\frac{\Delta C^*_{ab}}{2S_C}\right)^2 + \left(\frac{\Delta H^*_{ab}}{S_H}\right)^2\right]^{1/2} \Lambda \quad (2)$$

Here, $\Delta L^*$ denotes a lightness difference, $\Delta C^*_{ab}$ denotes a chroma difference, and $\Delta H^*_{ab}$ denotes a hue difference between CV1 and CV2. In calculating CII, CIELAB values of CV1 and CV2 have been converted to a common viewing condition, such as D65, using a chromatic adaptation transform (CAT) as described later with reference to FIG. 4. Regarding CII, see Billmeyer and Saltzman's Principles of Color Technology, 3rd edition, John Wiley & Sons Inc. 2000, p. 129, and pp. 213-215 which is herein incorporated by reference in its entirety.

The right-hand term of Equation (2) corresponds to color difference $\Delta E^{*}_{94(2:2)}$ obtained by the CIE 1994 Color Difference Equation, with values of the lightness and chroma variables $k_L$, $k_C$ set to 2, and the hue variable $k_H$ set to 1. In the CIE 1994 Color Difference Equation, the denominator coefficients $S_{Lx}$, $_{SC}$, $S_H$ of the right-hand term of Equation (2) are given by Equation (3) below.

$$S_L = 1$$

$$S_C = 1 + 0.045 C^{*}_{ab}$$

$$S_H = 1 + 0.015 C^{*}_{ab} \quad \quad A(3)$$

It is possible to use another equation as the color difference equation used for calculating CII.

The CII is defined as the difference in color appearance observed when a given color patch is viewed under first and second viewing conditions different from one another. Accordingly, a sample having a low CII is preferred in terms of less difference in apparent color when viewed under different viewing conditions.

The GI is represented by the following equation, for example.

$$GI = a_L \int \sqrt{WS(u)} VTF(u) du \quad (4)$$

Regarding GI, see, for example, Makoto Fujino, Image Quality Evaluation of Inkjet Prints, Japan Hardcopy '99, p. 291-294 which is herein incorporated by reference in its entirety. In Equation (4), $a_L$ is a lightness correction term, WS(u) is the Wiener spectrum of the image, VTF is the visible spatial frequency characteristic, and u is the spatial frequency.

GI represents the extent of graininess (or level of noise) perceived by the observer of a printout; a smaller GI means that less graininess is perceived by the observer. Of course, a different equation may be used for GI, it being sufficient that the equation is an index for evaluating graininess in a printed image.

In Step S35 in FIG. 2, evaluation index generator 120 calculates an evaluation index $EI_1$ for each sample, and selector 130 selects the best sample in each cell of the CIELAB color space with reference to this evaluation index $EI_1$.

Figure 4:
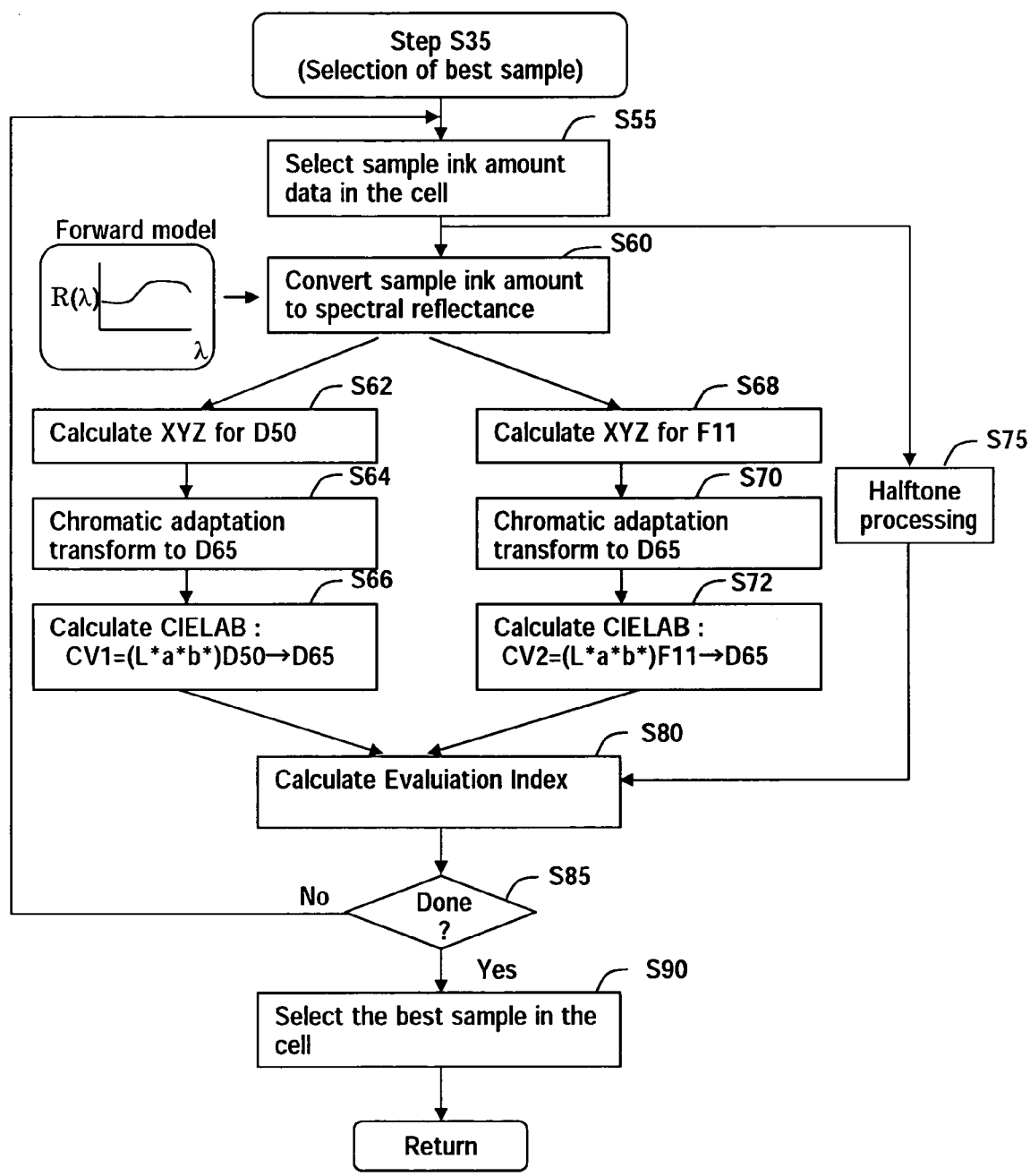
FIG. 4 is a flowchart showing in detail the procedure of Step S35.

FIG. 4 is a flowchart showing in detail the procedure of Step S35. In Step S55, one sample in a particular cell is selected. In Step S60, spectral reflectance Rsmp(λ) of the sample is obtained using the spectral printing model converter 100. The next Steps S62-S66 are executed by the sample color calculator 122 (FIG. 1) of evaluation index generator 120; Steps S68-S72 are executed by comparative color calculator 124. Step S75 is executed by halftone processor 128.

In Step S62, sample color calculator 122, using spectral reflectance Rsmp (λ), calculates tristimulus values XYZ under a first viewing condition. In the example, tristimulus values XYZ are calculated under CIE illuminant D50, CIE 1931 2° Standard Observer viewing condition. "Viewing condition" herein refers to a combination of an illuminant and an observer; unless noted otherwise, the observer is the CIE 1931 2° Standard Observer. In Step S64, these tristimulus values XYZ are put through a chromatic adaptation transform to calculate the corresponding color under the standard viewing condition. In the example, CIECAT02 is used as the chromatic adaptation transform, using illuminant D65 as the light source for the standard viewing condition. CIECAT02 is described, for example, in "The CIECAM02 Color Appearance Model:, Nathan Moroncy et al., IS&T/SID Tenth Color Imaging Conference, pp. 23-27, and in "The Performance of CIECAM02", Changjun Li et al., IS&T/SID Tenth Color Imaging Conference, pp. 28-31 which are each herein incorporated by reference in their entirety.

However, it would be possible to use a different chromatic adaptation transform, such as the von Kries chromatic adaptation prediction model, as the chromatic adaptation transform. In Step S66, colorimetric value of the corresponding color in the CIELAB color system $CV1 = (L^{*}a^{*}b^{*})_{D50 \to D65}$ is calculated. The subscript "D50→D65" denotes that this colorimetric value indicates color appearance under illuminant D50 and that it is represented by corresponding color under illuminant D65.

Comparative color calculator 124 executes calculations similar to sample color calculator 122, under a second viewing condition. Specifically, in Step S68, it calculates tristimulus values XYZ under the second viewing condition using spectral reflectance Rsmp (λ). In the example, tristimulus values XYZ are calculated under a viewing condition of the CIE illuminant F11 and CIE 1931 2° Standard Observer. In Step S70, the tristimulus values XYZ are put through a chromatic adaptation transform to calculate the corresponding color under the standard viewing condition. Then, in Step S72, colorimetric value of the corresponding color in the CIELAB color system $CV2 = (L^{*}a^{*}b^{*})_{F11 \to D65}$ is calculated.

Since the colorimetric value of the sample color $CV1 = (L^{*}a^{*}b^{*})_{D50 \to D65}$ and the colorimetric value of the comparative color $CV2 = (L^{*}a^{*}b^{*})_{F11 \to D65}$ are the values of corresponding colors under the same standard viewing condition, the CII (see Equation (2) hereinabove) which represents the color difference ΔE between them accurately represents the difference in color appearance between the sample color and the comparative color.

The standard viewing condition is not limited to illuminant D65; viewing conditions under any illuminant could be used. For example, where illuminant D50 is employed as the standard viewing condition, Step S64 in FIG. 4 will not be necessary, and in Step S70 a chromatic adaptation transform for illuminant D50 will be performed. However, color difference ΔE calculated using the CIELAB color system gives the most reliable values when illuminant D65 is being used. For this reason, illuminant D65 is used as the standard viewing condition.

In Step S75, ink amount data for the sample selected in the aforementioned Step S55 is input, and a virtual patch comprising a plurality of pixels from the ink amount data is subjected to a halftone process on a color-by-color basis. In step S80, color difference evaluation index calculator 1262 (FIG. 1) calculates the color inconstancy index CII according to Equation (2), using the aforementioned colorimetric values CV1, CV2. The image quality evaluation index calculator 1270 uses the aforementioned halftone data to calculate GI according to the flow charts in FIG. 5 and FIG. 10. Evaluation index $EI_1$ is then calculated according to Equation (1).

A process for calculating GI is now described in greater detail. While, image quality evaluation index calculator 1260 calculates GI on the basis of the aforementioned halftone data, in this embodiment, GI is calculated on the basis of the halftone data by means of simulating dot formation state, without actual printing. In this embodiment, date needed for simulation is prepared, a subpixel plane is formed from subpixels having higher resolution than pixels in the halftone data, and dot forming state is simulated in this subpixel plane.

In the example, dot shape data and spectral reflectance data are prepared as the parameter data needed for the simulation. Parameter data specifies conditions when printing is performed by a printer targeted for simulation, using the aforementioned printer lookup table 180. That is, since the printer lookup table 180 produced in this embodiment is referred to by the printer when printing under these conditions, in Step S100 in FIG. 5, desired conditions using printer lookup table 180 will be prepared as the parameter data. In the example described here, it is assumed that the printer ejects ink from nozzles formed on a carriage, while main scanning the carriage and performing sub-scanning by means of paper feed rollers.

Figure 6:
FIG. 6 shows an example of parameter data.

FIG. 6 shows an example of parameter data. In the figure, parameter data includes resolution in the main scanning direction (x resolution), resolution in the sub-scanning direction (y resolution), number of ink colors, type of printing media, "number of subpixels/pixel" and number of nozzles. x resolution and y resolution are given in units such as dpi; in the figure these are 1440 dpi and 720 dpi respectively. Herein, the main scanning direction is defined as the x direction and the sub-scanning direction as the y direction. The number of ink colors is the number of colors installed in the printer; in this embodiment, as noted, there are six colors CMYKOG. Of course, ink color per se could be specified directly.

Printing media indicates the type of media such as photo paper. That is, since dot formation state will differ depending on the printing media being simulated, when defining parameters necessary for the simulation, the printing media is distinguished, and a particular printing media with associated parameters is defined. Of course, if use of several different kinds of printing media is not contemplated, data indicating the type of printing media will not be needed.

Number of subpixels/pixel is a value that indicates, for each pixel in halftone data, the number of divisions resulting from dividing it into smaller subpixels; in FIG. 6, each pixel is shown as being divided vertically and horizontally into 20 subpixels. Of course, the number of divisions may be selected by the user as a printing parameter, and is not limited to 20. Herein, dots in dot matrix arrangement in halftone data will be termed simply "pixels", and dots obtained by dividing these as "subpixels." Number of nozzles indicates the number, in the sub-scanning direction, of nozzles formed on the carriage which is installed in the printer targeted for the simulation. Parameter data may additionally include various kinds of data other than that in the above example, as may be required in calculating GI.

Figure 7:
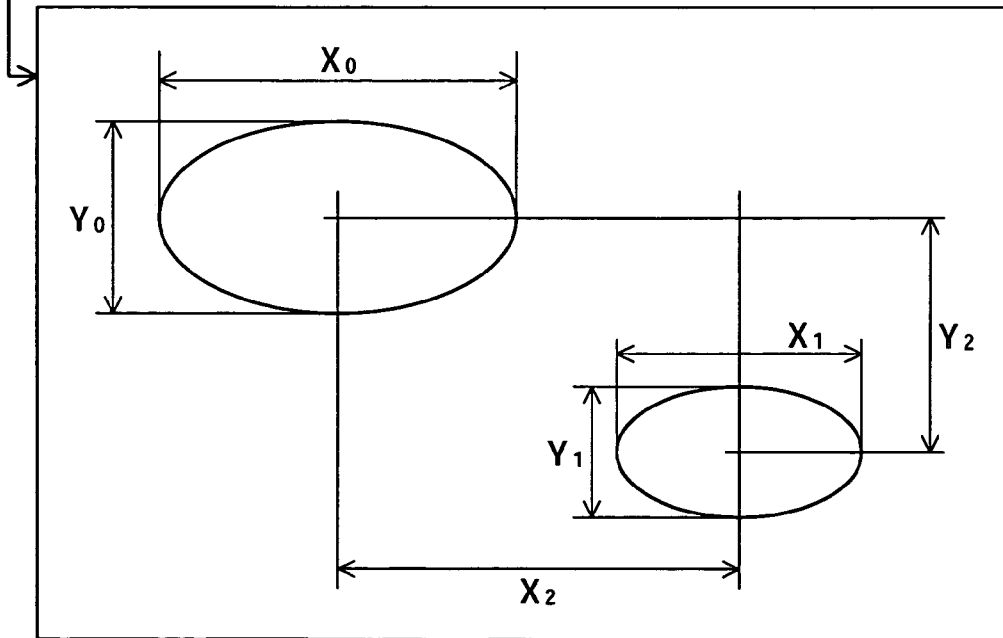
FIG. 7 shows an example of dot shape data.

In Step S110, dot shape data is determined. Dot shape data represents parameter data specifying the shape and size of a dot, for the purpose of reproducing, on a subpixel plane, a dot recorded onto printing media. FIG. 7 illustrates an example of dot shape data. In the example, dot shape is predetermined to be oval, with shape and size thereof specified through the major and minor axes of the oval. In the example shown in FIG. 7, in order to be able to deal with instances in which an ink drop splits into two before the ink drop from the nozzle reaches the printing media, size of a first and second dot and relative distance between the two can be specified as parameters.

Specifically, it is possible to describe a main scanning direction size ($X_0$) and sub-scanning direction size ($Y_0$) for the first dot, and a main scanning direction size ($X_1$) and sub-scanning direction size ($Y_1$) for the second dot, and to further describe relative distance between the first and second dots in terms of main scanning direction distance ($X_2$) and sub-scanning direction distance ($Y_2$). The above data represents data for the particular printing media indicated in the parameter data described earlier, and is prepared on a nozzle-by-nozzle and color-by-color basis.

At bottom in FIG. 7 are shown shapes of dots given by various parameters. For the first and second dots, an oval having a major axis and minor axis of scanning direction sizes specified in the dot shape data is formed to produce the shape of the dot. Relative distance between dots can be specified in terms of distance from the centers of the two. Dot shape data is created by actually ejecting ink from nozzles formed on a carriage installed in the printer targeted for the simulation, and measuring the shape and size of dots produced on printing media; parameter values are determined in subpixel units. Accordingly, it is possible to specify size in each scanning direction uniquely on a subpixel plane.

In the example of FIG. 7, a first dot formed with C ink by nozzle #1 has a main scanning direction size of 46, and sub-scanning direction size of 24. The second has size of "0" in both the main scanning and sub-scanning directions. Thus, relative distance is also "0." This represents an instance where the ink drop has not split up during flight, so that ejection of a single ink drop has formed a single first dot.

Where an ink drop is ejected while moving in the main scanning direction the carriage provided to the printer, the ink drop travels at a certain relative speed in the main scanning direction with respect to the printing media, and upon striking the printing media produces an oval dot whose major axis is substantially parallel to the main scanning direction. Accordingly, dot shape is typically like that shown at bottom in FIG. 7, with the major axis coincident with the main scanning direction; however, orientation of the major axis is not limited thereto, it being possible, for example, to make the dot circular by using the same value for the major and minor axes. Alternatively, dots may be split into three or more parts, and data indicating per se a dot shape pattern composed of a plurality of subpixels recorded.

Figure 8:
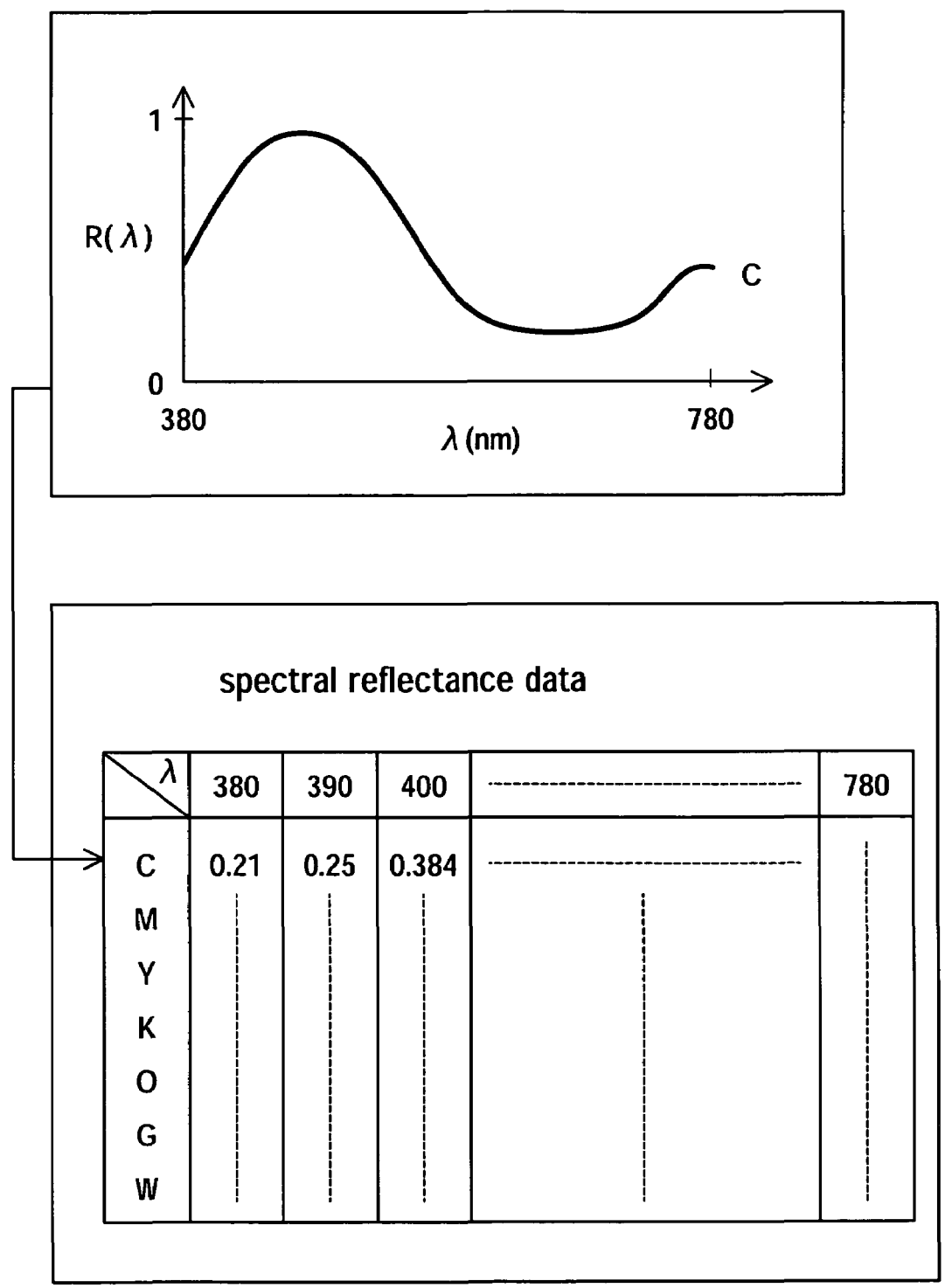
FIG. 8 shows an example of spectral reflectance data.

In Step S120, spectral reflectance data is determined. Spectral reflectance data is data associating reflectance of a dot recorded on printing media with a plurality of wavelengths of light. FIG. 8 shows an example of spectral reflectance data. Spectral reflectance data is determined in advance for each color of ink used by a printer, and a state of no ink being recorded on printing media (W in FIG. 8). For example, at top in FIG. 8 is given the spectral reflectance ($R(\lambda)$) of C ink; such spectral reflectance was measured in advance, specifying reflectance at 10 nm intervals from 380 nm to 780 nm for use as spectral reflectance data. Spectral reflectance data also represents data associated with particular printing media given in the parameter data described hereinabove.

In this embodiment, a patch of predetermined size is printed at the maximum value of ink amount limit for the printing media, and spectral reflectance of the patch is measured instead of the dot. That is, spectral reflectance measured in this way is assumed to be the spectral reflectance of the dot. This method for deriving spectral reflectance is merely exemplary, and other arrangements could be employed, such as printing a patch at a predetermined ink recording rate, and then utilizing the ratio of dot area on the printing media to the area of portions having no dots recorded thereon, to calculate spectral reflectance for each color. In the present invention, it is sufficient to calculate color value (in this embodiment, lightness) on a subpixel-by-subpixel basis, and in this sense it is not essential to prepare data indicating spectral reflectance. For example, an arrangement employing data that represents color values for single colors and a color values for multiple superimposed colors is also possible.

In Steps S100-S120, once data required for the simulation has been prepared, the aforementioned halftone data is acquired in Step S125, and a subpixel plan for simulating a dot recording state is produced. Specifically, each pixel in the aforementioned halftone data is divided by the number of subpixels/pixel value given in the parameter data, and a plane in which to conduct the simulation is formed from the divided subpixels. The result is a dot matrix having higher resolution than the halftone data dot matrix. By way of a specific process, it would be possible to define an array whereby recording state data can be specified for each individual subpixel.

Figure 9:
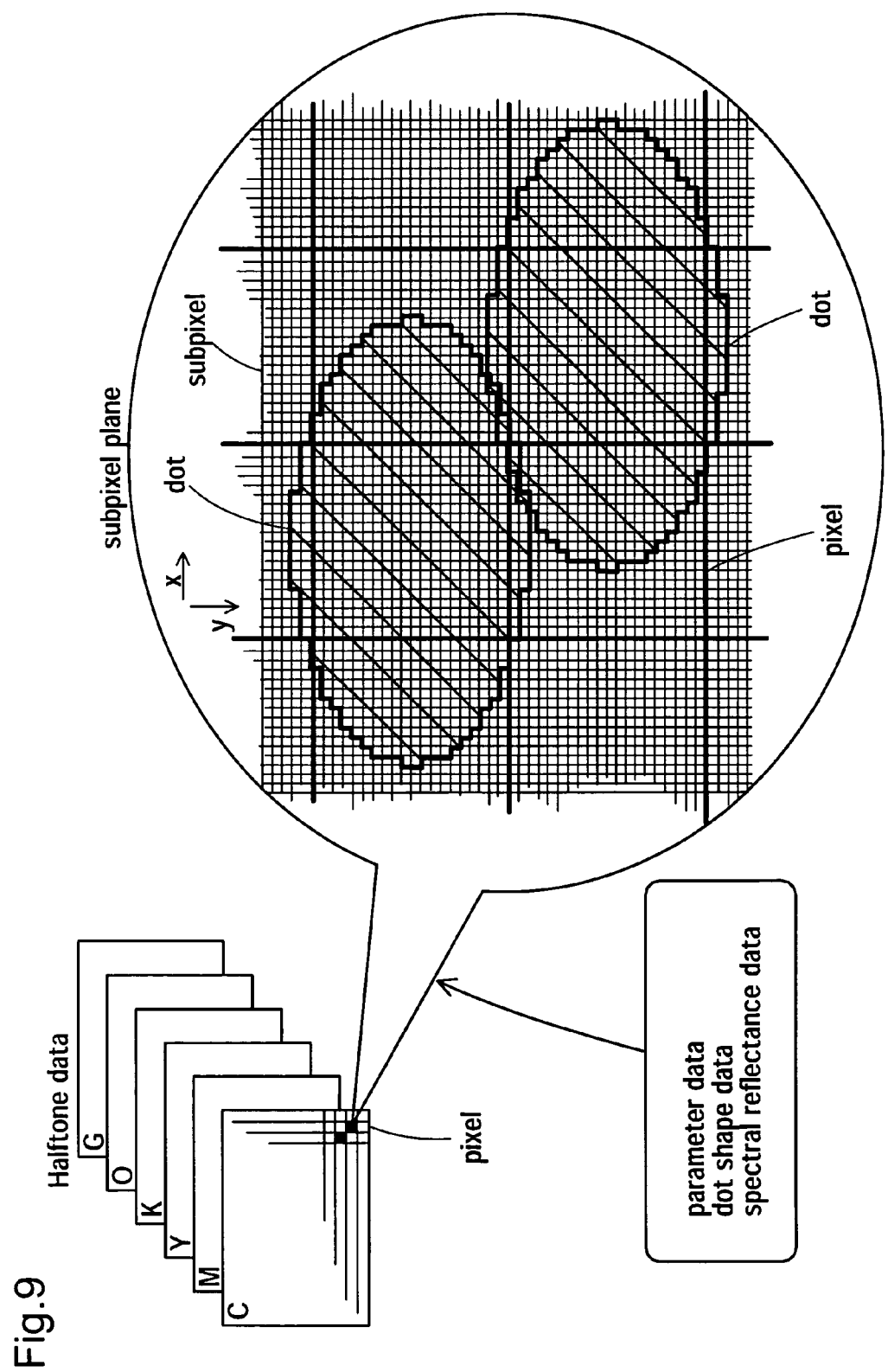
FIG. 9 is an illustration of a simulation process.

FIG. 9 is an illustration of a simulation process in the present embodiment. In the figure, halftone data after the halftone process is shown at upper left, and a subpixel plane is shown at center. That is, the subpixel plane contemplated here is a plane formed by rectangles smaller than the pixels, as shown at center. In FIG. 9, the upper left edge of the subpixel plane is assigned the coordinates (0, 0), the main scanning direction coordinate is designated x, and the sub-scanning direction coordinate is designated y. Once a subpixel plane has been formed, in Step S130, the image quality evaluation index calculator 1260 refers to the aforementioned dot shape data in order to simulate dot shape on this subpixel plane.

Specifically, in halftone data, dot on/off state for each pixel is indicated in two tones, so the decision as to whether to form a dot on subpixels corresponding to each pixel can be made from halftone data. Additionally, by specifying a control method for main scanning and sub-scanning performed in the printer targeted for simulation, it is possible to designate the nozzles for producing dots on pixels in the halftone data. Thus, by making reference to dot shape data, it becomes possible to specify in detail the shape of dots formed on subpixels corresponding to each pixel. Of course, data indicating the control method can also be created as parameter data described hereinabove.

In this embodiment, the center of each pixel is defined as the reference position, and dots are placed in such a way that the center of the aforementioned first dot coincides with this reference position. By performing this process for all pixels, dots can be formed on the subpixel plane as indicated by the hatching in FIG. 9. Once dot shape has been specified in detail, and dots formed on the subpixel plane in the above manner, a determination is made as to whether the process of forming dots has been completed for all of the colors given in the parameter data described hereinabove (Step S135), and until it is determined that the process has been completed for all colors, the process of Step S125 and subsequent is repeated. The data derived in this manner indicates dot recording state on a color-by-color basis, and will thus be referred to as recording state data herein.

Once recording state has been created for all colors of ink, in order to evaluate how dots produced by each color are perceived by the human eye, in Step S140 the image quality evaluation index calculator 1260 calculates lightness of each ink in the superimposed state. That is, assuming a predetermined light source, tristimulus values XYZ are calculated from the aforementioned spectral reflectance data and the spectral sensitivity of the human eye, and then L*a*b* values are calculated from the tristimulus values XYZ.

The L* value so obtained indicates lightness, lightness being specified for each coordinate on the subpixel plane (denoted as L(x, y)). Since (x, y) coordinates correspond to the same position in the subpixel plane of each ink color, where dots are formed at the same coordinates on subpixel planes of different colors, lightness can be calculated as superimposed spectral reflectance, by multiplying together spectral reflectance for each color. In the event that no dot is formed at (x,y) coordinates, lightness on the printing media (W in the spectral reflectance data described above) is L(x,y). Once L(x,y) is obtained, the image quality evaluation index calculator 1260 calculates GI based on this L(x,y) value, by a process according to the flowchart shown in FIG. 10.

Figure 10:
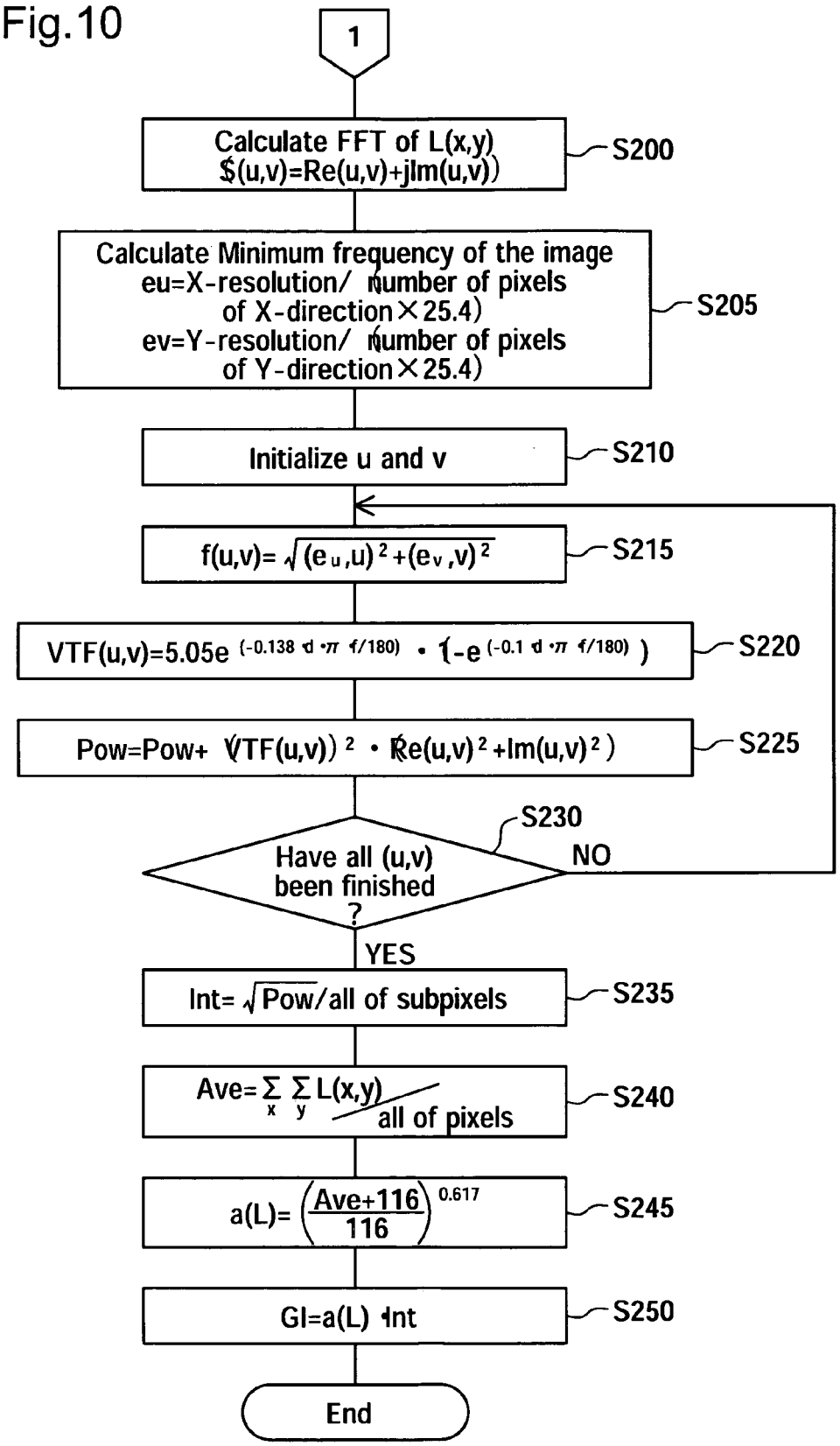
FIG. 10 is a flowchart showing a process for calculating GI.
Figure 11:
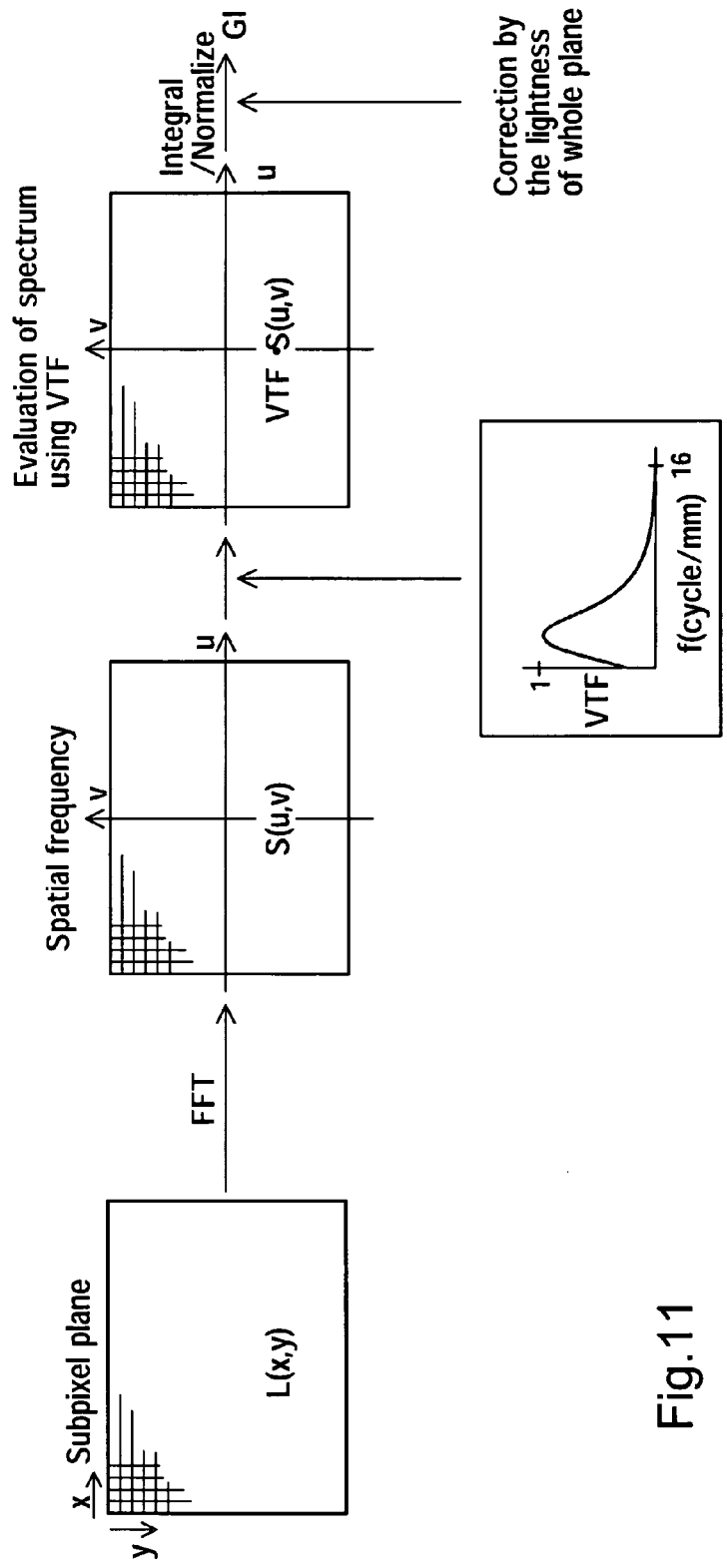
FIG. 11 is an illustration of calculation of GI.

FIG. 11 is an illustration showing calculation of GI. In this embodiment, GI evaluated image lightness by spatial frequency (cycle/mm). Thus, initially, lightness L(x,y) shown at the left edge of the figure is subject to FFT (Fast Fourier Transformation) (Step S200). In FIGS. 10 and 11 the spatial frequency spectrum so derived is designated as S(u,v). Spectrum S(u,v) comprises a real part Re(u,v) and an imaginary part IM(u,v), such that S(u,v)=Re(u,v)+jIM(u,v). This spectrum S(u,v) corresponds to the Wiener spectrum mentioned earlier.

Here, (u,v) has the dimensions of the inverse space of (x,y); in this embodiment, (x,y) are defined as coordinates, and to associate these with an actual length dimension would require consideration of resolution and the like. Accordingly, dimension conversion will be required when evaluating S(u,v) with spatial frequency dimension. Accordingly, first, in order to calculate the magnitude f(u,v) of spatial frequency corresponding to coordinates (u,v), the minimum frequency of the image targeted for simulation is calculated (Step S205). The minimum frequency of the image targeted for simulation is the single-oscillating frequency in the printed results printed in the halftone data targeted for simulation, and is defined for the main scanning direction (X direction) and sub-scanning direction (y direction) respectively.

Specifically, main scanning direction minimum frequency $e_u$ is defined as X resolution/(X direction pixel count×25.4), and sub-scanning direction minimum frequency $e_v$ as Y resolution/(Y direction pixel count×25.4). X resolution and Y resolution represent data specified in the parameter data described earlier. Here, 1 inch is calculated as 25.4 mm. Once minimum frequency $e_u$, $e_v$ has been calculated for each scanning direction, it is now possible to calculate magnitude f(u,v) of spatial frequency at any (u,v) coordinates as $(e_u \cdot u)^2 + (e_v \cdot v)^2)^{1/2}$.

The human eye, on the other hand, has different sensitivity to lightness depending on spatial frequency magnitude f(u,v); visual spatial frequency characteristics are, for example, like the VTF(f) curve shown at center bottom in FIG. 11. VTF(f) in FIG. 11 is given by: VTF(f)=5.05×exp(−0.138·d·π·f/180)× (1−exp(−0.1·d·π·f/180). Here, d is distance from the printout to the eye, and f is magnitude f of the aforementioned spatial frequency. Since f is expressed as a function of the aforementioned (u,v), visual spatial frequency characteristics VTF can be expressed as a function of (u,v), i.e. VTF(u,v).

By multiplying this VTF(u,v) by the aforementioned spectrum S(u,v), it becomes possible to evaluate spectrum S(u,v) under conditions that take into consideration visual spatial frequency characteristics. Performing integration on the evaluation enables evaluation of spatial frequency for an entire subpixel plane. Accordingly, in the example, processes up to and including an integration process are performed in Steps S210-S230, first initializing both (u,v) to "0" (Step S210), and calculating spatial frequency f(u,v) at a selected (u,v) (Step S215). VTF at spatial frequency f is then calculated (Step S220).

Once the VTF has been derived, the square of the VTF is multiplied by the square of spectrum S(u,v), and a sum with a variable Pow for substituting in integration results is calculated (Step S225). Specifically, since spectrum S(u,v) includes a real part Re(u,v) and an imaginary part IM(u,v), in order to evaluate its magnitude, first, integration is carried out by means of the square of the VTF and the square of spectrum S(u,v). It is then determined whether the above process has been performed on all coordinates (u,v); in the event it is determined that the process has not been completed for all coordinates (u,v), the unprocessed coordinates (u,v) are extracted, and the process of Step S215 and subsequent performed. As shown in FIG. 11, as spatial frequency increases, VTF declines sharply to reach close to "0", so by limiting the value range for coordinates (u,v) to below a predetermined value, calculations can be performed within the required range.

Once integration has been completed, $Pow^{1/2}$/total number of subpixels is calculated (Step S235). That is, the magnitude of dimension of spectrum S(u,v) is restored by means of the square root of the variable Pow, normalization is carried out through division by the total number of subpixels. By means of this normalization, an objective index (Int in FIG. 10) that is not dependent on the number of pixels in the original halftone data is calculated. Of course, since it is here sufficient simply to perform normalization, normalization may be carried out through division by the number of pixels in the halftone data as well. Through normalization it is possible to evaluate graininess irrespective of image size, but where graininess is being evaluated for halftone data whose number of pixels is always the same, normalization is not necessarily required.

In this embodiment, correction is performed in consideration of the effects of lightness of the overall print, to arrive at GI. That is, in this embodiment, correction is performed on the assumption that, even where their spatial frequency spectra are identical, a print having an overall light cast and one have an overall dark cast will present different impressions to the human eye, and graininess will tend to be more apparent in that with the lighter overall cast. Thus, first, lightness L(x,y) for all pixels is summed and divided by the total number of pixels to calculate the average Ave of lightness of the entire image (Step S240).

Next, a correction coefficient $a(L)=((Ave+16/116)^{0.8}$ based on lightness of the entire image is defined, and this correction coefficient a(L) is then calculated (Step S245) and multiplied by the aforementioned Int to give GI (Step S250). Correction coefficient a(L) is equivalent to the lightness correction term $a_L$ described earlier. As the correction coefficient there may be employed any function that increases or decreases the value of the coefficient by means of average lightness; various other functions may be employed for this purpose. Of course, the component for evaluating GI is not limited to lightness, it being possible to evaluate spatial frequency in consideration of the hue or saturation component; as color values, the lightness component, red-green component, and yellow-blue component could be calculated, each subjected to a Fourier transform, and each color component then multiplied by a predefined visual spatial frequency characteristic to calculate GI.

Once CII and GI have been calculated in the preceding manner, in Step S80 shown in FIG. 4, an evaluation index $EI_1$ is calculated using Equation (1). In Step S85, it is determined whether calculation of evaluation index $EI_1$ for all sample colors in the cell targeted for process has been completed. Steps S55-S85 are repeated in this manner to calculate evaluation index $EI_1$ for all sample colors in the cell. In Step S90, selector 130 selects from among the sample colors of the cell that sample having the best evaluation index $EI_1$, as the representative sample for the cell. As a result, a single representative sample is selected for each cell that contains at least one sample. Representative samples are hereinafter also referred to as "highly rated samples."

Of the plural cells divided up in Step S20, some cells will contain no sample colors whatsoever. Accordingly, the process of FIG. 4 is executed targeting only cells that contain at least one sample color, and excludes from the process cells that do not contain even one sample color. Once representative samples have been selected in the above manner, in Step S40, their CIELAB colorimetric values are associated with ink amounts to create an ink profile 142. This calorimetric value may be the colorimetric value calculated in Step S65 or S72, or a calorimetric value calculated to match the light source of the printing environment in which printing will take place using printer lookup table 180.

As noted, there are $16^3$ cells, and thus the number of representative samples selected in Step S35 will be $16^3$ or less. In the printer lookup table 180 used in a typical printer, specified ink quantity sample number and sample colors will not necessary be the same as the aforementioned representative samples. Accordingly, it is necessary to perform interpolation calculations for colorimetric values corresponding to arbitrary ink amounts, with reference to representative samples. Whether interpolation calculations are carried out through linear interpolation or nonlinear interpolation, if a representative sample is placed improperly in the CIELAB color space, the accuracy of interpolation will be poor. Poor accuracy in interpolation calculations will result also in poor accuracy of conversion when performing color conversion with printer lookup table 180, so that printing utilizing printer lookup table 180 will not give printed results of high quality.

Figure 12:
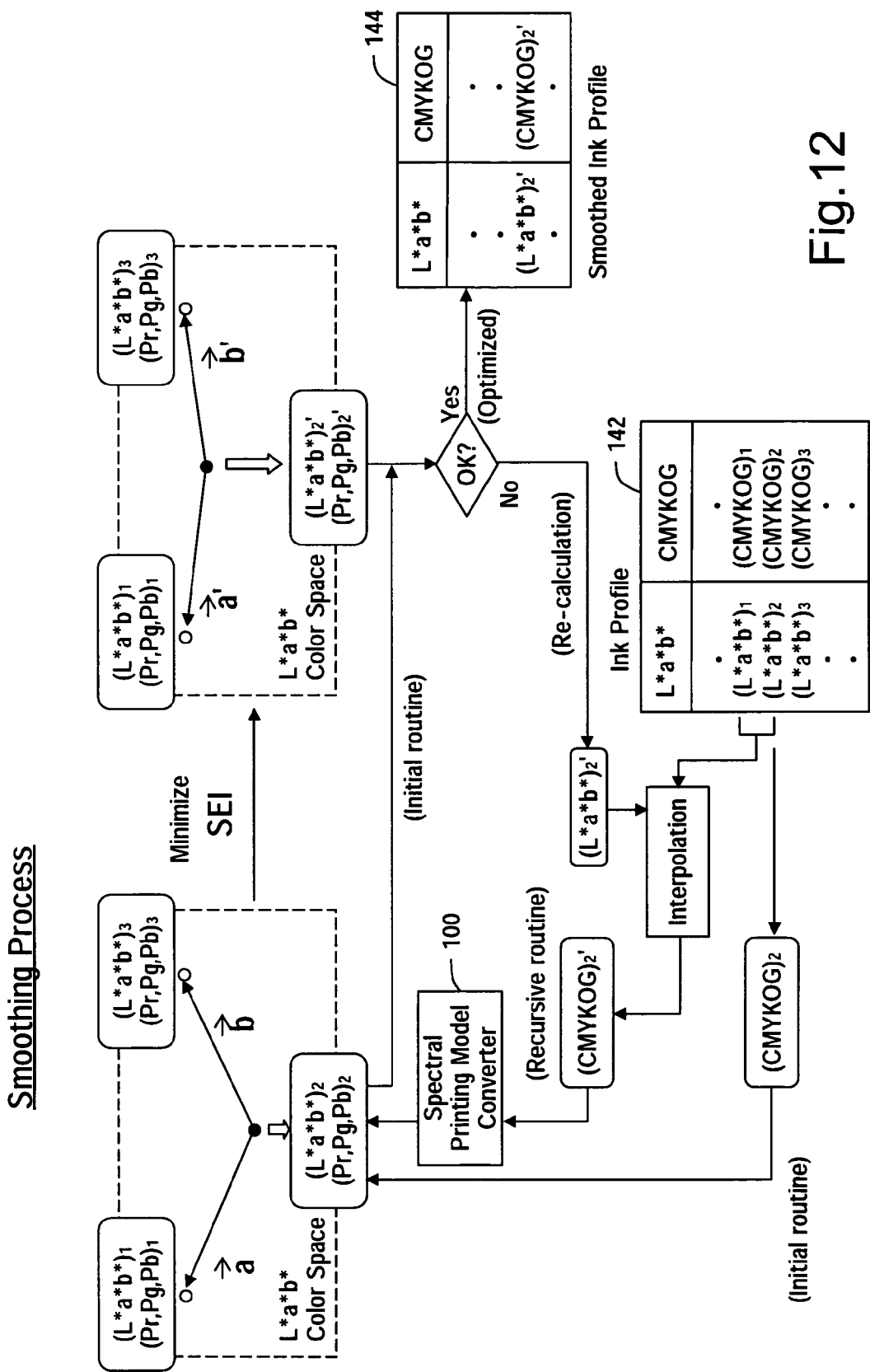
FIG. 12 is a block diagram illustrating a smoothing process.

Accordingly, in Step S45, a smoothing process is performed on ink profile 142, in which representative samples on which interpolation calculations may be performed with high accuracy are re-selected to create a smoothed ink profile 144. FIG. 12 is a block diagram illustrating the smoothing process in a example. In this example, the colorimetric values described in relation to ink profile 142 may be thought of as grid points in the CIELAB color space, and there is defined a smoothness evaluation index SEI for evaluating whether placement of these grid points in the CIELAB color space has been smoothed.

Here, smoothness of placement refers to the extent of distortion when a plurality of grid points is lined up in space. For example, where grid points in a color space are arrayed in a cubic grid, there is no distortion, but when grid points deviate from the cubic grid positions, there is appreciable deviation of the grid. Also, a more uniform arrangement of grid points within a color space may be said to have a higher degree of smoothness, while when a curve is imagined to connect adjacent grid points within a color space, the curve being drawn from one boundary to the other boundary of the gamut formed in the color space, the degree of smoothness may be said to be lower the higher the order of the function describing the curve.

Typically, with grid points arranged in regular manner within a color space, it is possible when calculating colors therebetween by means of interpolation, to carry out interpolation without large variations in interpolation accuracy by localized position in space. Accordingly, by optimizing grid point positions through smoothing, it is possible to increase interpolation accuracy during subsequent interpolation with reference to the ink profile. Grid points to be optimized through smoothing may also be referred to as optimization-targeted grid points.

In the SEI, it is sufficient for the value thereof to indicate the degree of smoothness in placement, with the evaluation being improved by bringing this value into approximation with a theoretical value. In the example shown in FIG. 12, position information indicating position of optimization-targeted colorimetric value grid points (optimization-targeted grid points) is defined, and the SEI is defined as a function having this position information as a variable. SEI is also defined as a function having a smaller value as the degree of smoothness in grid point placement increases. By defining SEI in this way, grid point placement can be optimized by means of searching for colorimetric values that minimize SEI. This search may be carried out by any of various methods. For example, a Quasi Newton method, steepest descent method, conjugate gradient method or other algorithm.

Figure 13:
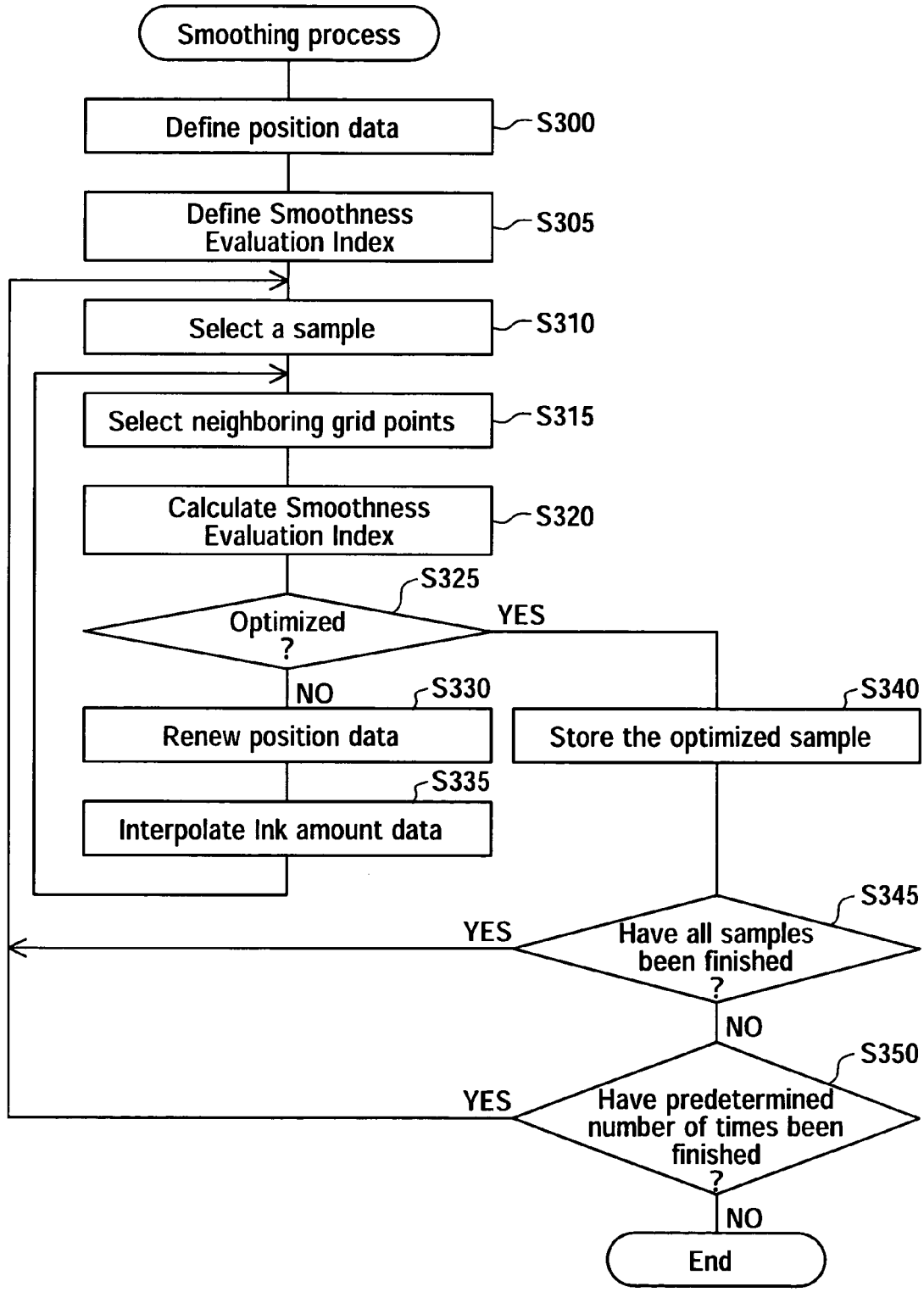
FIG. 13 is a flowchart of a smoothing process.
Figure 14:
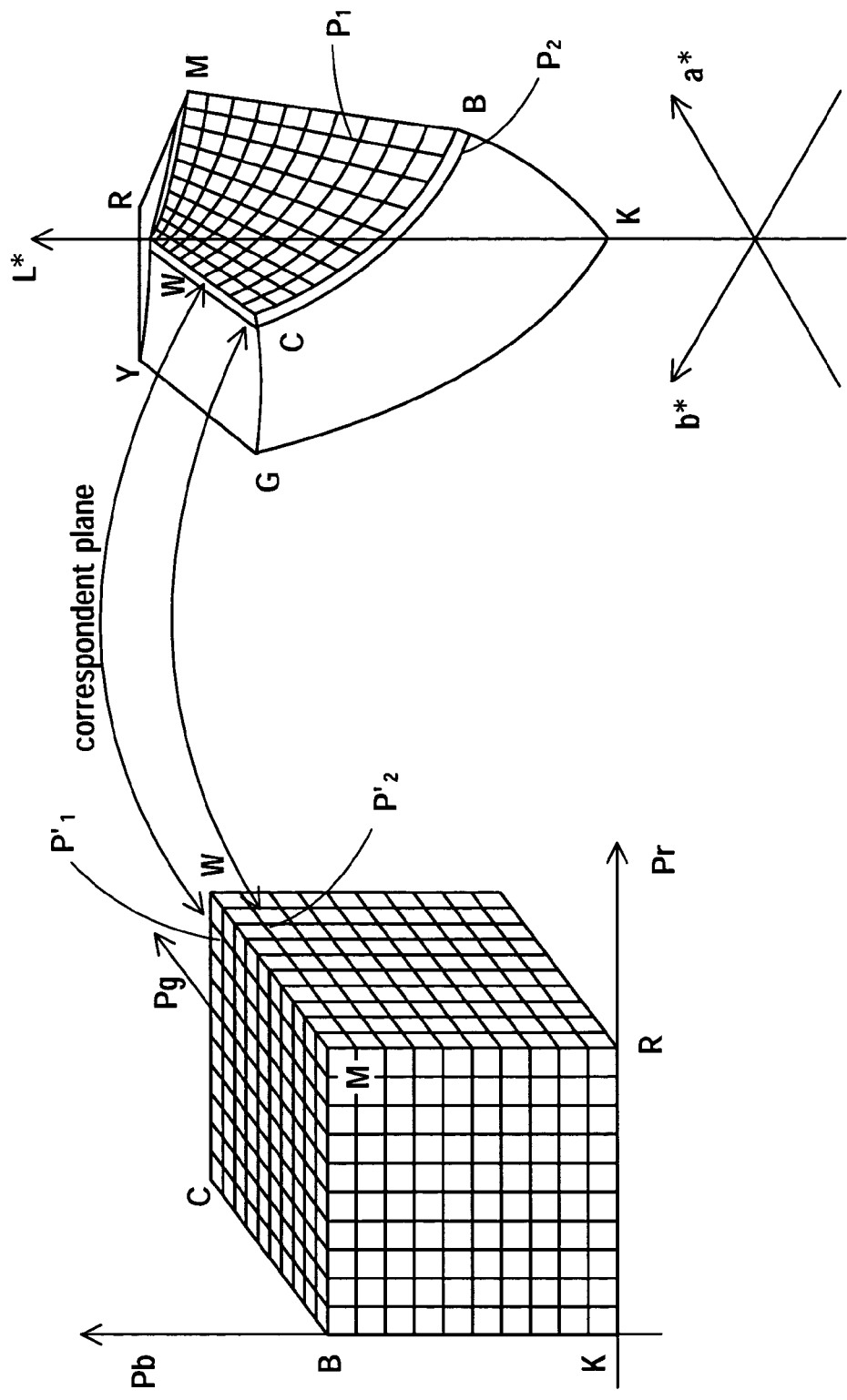
FIG. 14 is an illustration of selection of position information.

FIG. 13 is a flowchart of the process routine in this example. Profile generator 140, when performing the smoothing process, defines the aforementioned position information in Step S300. FIG. 14 gives an example of defining position information. A plurality of colorimetric values are described in ink profile 142; when these colorimetric values are plotted in the CIELAB color space, a gamut like that shown at right in FIG. 14 is produced. Also, calorimetric values are a collection of discrete values; FIG. 14 shows the exterior planes of the gamut formed by those grid points situated most outwardly among the plotted colorimetric values. Apices WKRGBCMY respectively indicate white, black, red, green, blue, cyan, magenta, and yellow, and for the achromatic colors W, K correspond to the maximum lightness and minimum lightness colors, or for the chromatic colors RGBCMY to the color of maximum saturation for each color.

Position information defines uniquely each grid point in the CIELAB color space, and in such a way that positional relationships with neighboring grid points can be ascertained. In the example, for three variables (Pr, Pg, Pb), there are defined a $0 \leq Pr \leq R$ direction grid point number $-1$, $0 \leq Pg \leq G$ direction grid point number $-1$, and $0 \leq Pb \leq B$ direction grid point number $-1$. Here, the R direction grid point number is the number of grid points positioned on the edge connecting black (K) and red (R) in the gamut shown at right in FIG. 14. Similarly, G direction grid point number is the number of grid points positioned on the edge connecting black (K) and green (G) in the gamut shown at right in FIG. 14, and B direction grid point number is the number of grid points positioned on the edge connecting black (K) and blue (B) in the gamut shown at right in FIG. 14.

Initial values for the three variables (Pr, Pg, Pb) are integers. Here, if position information (Pr, Pg, Pb) is plotted in three-dimensional orthogonal space, a generally cubic grid like that shown at left in FIG. 14 is produced. At left in FIG. 14, line intersections correspond to initial values of position information (Pr, Pg, Pb). The number of grid points in FIG. 14 is merely exemplary. Having defined position information in the above manner, by association with grid points in the CIELAB color space described above, it becomes possible to ascertain grid point positions and relative positional relationships with neighboring grid points.

Considering that the exterior plane of the generally cubic form shown at left in FIG. 14 corresponds to the exterior plane of the gamut shown at right in FIG. 14, position information is associated with grid points in the CIELAB color space. For example, exterior plane WMBC (exterior plane $P_1$) of the gamut corresponds to exterior plane $P_1'$ formed by holding position information Pb constant at the maximum value at left in FIG. 14, with arbitrary values for position information Pr and Pg. By associating inter alia the grid point corresponding to apex B on exterior plane Pi and the grid point corresponding to apex B on exterior plane $P_1'$ (Pb is at maximum value, Pr=Pg=0), grid points on exterior plane Pi are associated with position information on exterior plane $P_1'$.

In similar fashion, by positing a curving plane $P_2$ inward from exterior plane $P_1$ of the gamut, and deriving grid points in proximity to curving plane $P_2$, it is possible to associate these with position information on a plane $P_2'$ inside the cube shown at left in FIG. 14. All gamut grid points and position information can be associated in this manner. Where it is possible to associate grid points and position information in this way, the position of any grid point can be indicated by position information.

For example, where position information for two neighboring grid points is respectively ($Pr_0$, 0, 0) and ($Pr_1$, 0, 0), an arbitrary location between these grid points is express, by means of an arbitrary value $Pr_1$ between $Pr_0$ and $Pr_1$, as ($Pr_2$, 0, 0). Of course, the definition of position information given hereinabove is merely exemplary; any method that uniquely identifies each grid point in the CIELAB color space and enables relative positional relationships with neighboring grid points to be ascertained could be used to determine position information. The number of grid points present on a single plane may be given as: ((total number of calorimetric values described in ink profile $142)^{1/3})^2$, or by some other expression.

Once all grid points in a gamut have been associated with position information, in Step S305 the SEI is defined. In the example shown in FIG. 12, SEI is defined as a function that includes a relative value which is the sum of vectors of mutually opposite directions, the vectors being oriented from an optimization-targeted grid point towards neighboring points adjacent to the grid point. This SEI affords a function whose form is different for each location in the CIELAB color space to which the optimization-targeted grid point belongs. In the example, function form differs on a location-by-location basis of the gamut. A more specific example of the function will be described later.

Once SEI has been defined, an optimization process is carried out by the process of Steps S310-S350 in FIG. 13. In Step S310, a single optimization-targeted grid point is derived from a sample described in the aforementioned ink profile 142. In the initial routine, ink amount data described in ink profile 142, and the colorimetric value per se associated with this ink amount data, are selected for optimization. In Step S315, from the calorimetric values described in ink profile 142, there are derived a calorimetric values corresponding to grid points that are situated surrounding the aforementioned optimization-targeted Lab grid point, and that neighbor the grid point. The colorimetric values derived here are different from the SEI function, and will be described in detail later. Where neighboring grid points have already been optimized, colorimetric values for the optimized grid points are derived.

In Step S320, SEI is calculated using the aforementioned optimization-targeted grid point and neighboring grid points. The SEI variable is the position information described above. Accordingly, SEI can be calculated using the aforementioned optimization-targeted grid point and neighboring grid point position information. Since SEI is a function whose value is smaller in association with smoother placement of the optimization-targeted grid point, it is possible to search for more optimal grid point position by means of updating optimization-targeted grid point position information and varying the optimization-targeted grid point position. Thus, in Step S325, it is determined whether the value of SEI has fallen below a certain predetermined threshold value. That is, when the value of SEI has fallen below a certain predetermined threshold value, the grid point position is determined to have been optimized (sufficiently smoothed).

In the event that in Step S325 it is determined that grid point position has not been optimized, position information is updated in Step S330. That is, using optimization-targeted grid point position information as a variable, position information that minimizes the SEI is calculated using a quasi Newton method, common slope method, etc., and the result is designated as new position information. Once position information has been updated, in Step S335 ink data corresponding to the new position information is calculated with reference to ink profile 142. That is, calorimetric values are calculated from updated position information, and ink amount data corresponding to these colorimetric values is calculated from ink profile 142.

Once calorimetric values and ink amount data for updated position information have been calculated in this manner, the process beginning at Step S315 repeats. In this repeat process, colorimetric values updated in Step S330 and the updated position information may be associated, and the process beginning at Step S315 then repeated; or, as shown in FIG. 12, ink amount data may input to the aforementioned converter 100, colorimetric values calculated from the result, these colorimetric values associated with updated position information, and the process beginning at Step S315 repeated. During updating in Step S330, since ink amount data is calculated with reference to ink profile 142, this ink amount data preserves the low CII and GI described above. Thus, when printing is performed using the updated ink amount data, the qualities of minimal difference in color appearance and inconspicuous graininess are preserved.

The rectangles indicated by broken lines in FIG. 12 indicate the status of optimization processing for SEI of a given functional form. The rectangle at left indicates pre-optimization, and the rectangle at right indicates post-optimization. In each rectangle, the optimization-targeted grid point is indicated by a black circle, and neighboring grid points by white circles. In the illustrated example, colorimetric values of the neighboring grid points are respectively $(L*a*b*)_1$, $(L*a*b*)_3$, and position information therefor is respectively $(Pr, Pg, Pb)_1$, $(Pr, Pg, Pb)_3$. The colorimetric value of the optimization-targeted grid point is $(L*a*b*)_2$, and its position information is $(Pr, Pg, Pb)_2$.

By using position information, it is possible to define vectors of mutually opposite directions, the vectors being oriented from the optimization-targeted grid point towards neighboring points adjacent to the grid point, like vector a and vector b shown in FIG. 12. The absolute value of the sum of the vectors is the SEI. Where SEI is minimized in the manner described previously, position information is updated to give $(Pr, Pg, Pb)_2'$. If, with updating, SEI is not yet below a predetermined threshold value (i.e. not yet optimized), the process is repeated. That is, a colorimetric value $(L*a*b*)_2'$ corresponding to position information $(Pr, Pg, Pb)_2'$ is calculated, and if not optimized by this calorimetric value, then re-calculated.

In the example shown in FIG. 12, ink amount data $(CMYKOG)_2'$ corresponding to calorimetric value $(L*a*b*)_2'$ is calculated from the corresponding relationship between the ink profile 142-derived calorimetric value $(L*a*b*)_1$ and ink amount data $(CMYKOG)_1$, and the corresponding relationship between colorimetric value $(L*a*b*)_2$ and ink amount data $(CMYKOG)_2$. Of course, interpolation is shown in abridged form; in actual practice, interpolation calculations are performed deriving from ink profile 142 4 or more calorimetric values having values close to the updated calorimetric values. Once ink amount data $(CMYKOG)_2'$ has been calculated, this value is input to converter 100, and the colorimetric value thereof is calculated. The optimization process described above is then repeated with the resultant colorimetric value. In other words, calculations are performed recursively.

In Step S325 in the flow chart shown in FIG. 13, when it is determined that grid point position has been optimized, in Step S340 the optimized sample data is stored in the smoothed ink profile 144. In the example shown in FIG. 12, the colorimetric value $(L*a*b*)_2'$ at the point in time that a determination of optimized is made, and the ink amount data $(CMYKOG)_2'$ corresponding to this colorimetric value, are stored in ink profile 144.

In Step S345, a determination is made as to whether optimization has been completed for all ink amount data described in ink profile 142. The process beginning at Step S310 is then repeated until it is determined that optimization has been completed for all ink amount data. In the flowchart in FIG. 13, in Step S350, the process beginning at Step S310 is additionally performed until it is determined that a predetermined number of correction iterations have been performed. That is, the results of the optimization process are deemed to be a true solution by means of performing a predetermined number of correction iterations.

Of course, since it is sufficient for grid point placement to be adequately optimized over the entire gamut, it would be acceptable also to determine in Step S350 whether SEI values for all ink amounts and the average value thereof are below a predetermined threshold value. It is also acceptable to conclude that adequate optimization has occurred when the average value of SEI values is substantially unchanged between the (n−1) correction iteration and the (n) correction iteration; various arrangements are possible. Once grid point placement has been smoothed in the manner described above, the process of smoothing for colorimetric values described in the aforementioned ink profile 144 is complete.

Figure 15:
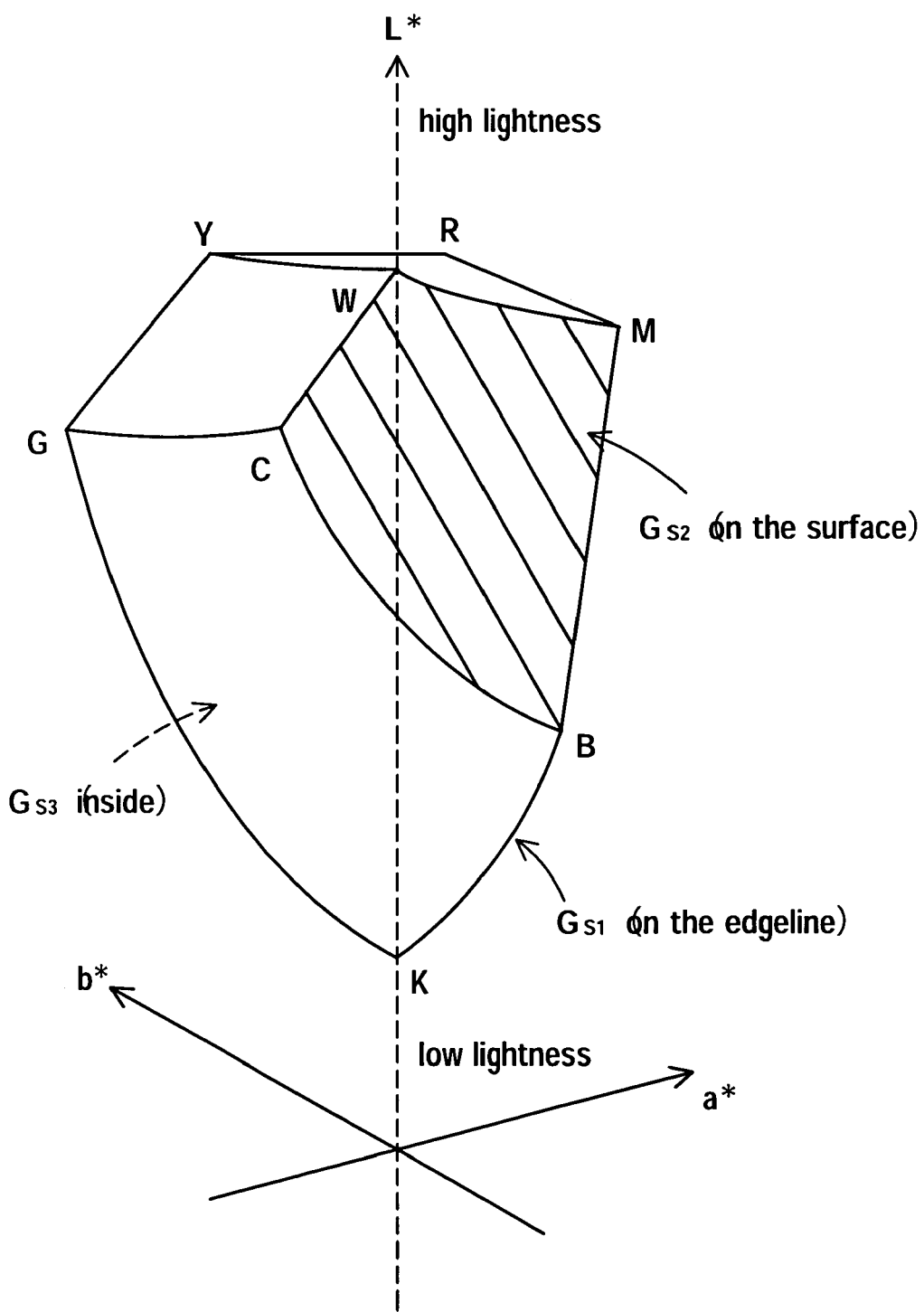
FIG. 15 is a schematic diagram showing the gamut of a printer.

Next, an example of an optimization process by SEI in Steps S315-S335 will be described in detail. FIG. 15 is a schematic diagram showing the gamut formed by colorimetric values described in ink profile 142. As shown in the figure, the gamut has an irregular shape in the CIELAB color space. While this gamut is of irregular shape, the gamut boundaries can easily be associated with the boundaries of a cube formed by the position information (Pr, Pg, Pb) described earlier. That is, the boundaries of the cube, namely, the 12 edgelines and 6 exterior faces defining the exterior surfaces of the cube, constitute in the gamut shown in FIG. 15 the 12 edgelines and 6 exterior faces situated at the boundaries thereof. More specifically, where only the Pb component is a variable that can become larger than 0 along the Pb axis edgeline from position information (0,0,0), with the Pr and Pg components held constant at minimum value, the grid point corresponding to this position information, shown as $G_{s1}$ in FIG. 15, will be located on the edgeline.

Similarly, colors of the apices on the uppermost surface in the cube formed by position information are BWCM respectively. Position information on this surface may be represented by holding only the Pb component constant at maximum value, and varying the other components.

Color on this plane is on the surface labeled $G_{s2}$ in the gamut shown in FIG. 15. Accordingly, where even one of the aforementioned position information is held constant at maximum value or minimum value, the color thereof will be located on a gamut boundary. When performing optimization for such a color on a gamut boundary, freedom to move within the CIELAB color space would pose the risk that adequate size of the gamut may not be maintainable. Accordingly, to ensure that gamut size is maintained, there is acquired an SEI whose function form differs between the 12 edgelines and 6 outer surfaces the form the gamut boundaries, and the gamut interior.

FIG. 16 illustrates an SEI (SI$_1$) for optimizing grid point on an edgeline formed at a gamut boundary in the CIELAB color space. In the figure, the curve represented by the broken line indicates the edgeline formed at a gamut boundary. The optimization-targeted grid point is represented by a black circle, and surrounding grid points by white circles. In order to preserve gamut size, it is necessary for optimization-targeted grid point represented by a black circle to be present on the edgeline represented by the broken line. Accordingly, in this embodiment, in Step S310, when grid points present on the broken line edgeline have been derived as optimization targets as shown in FIG. 16, in Step S315, there are derived grid points neighboring the optimization-targeted grid point, and present on edgelines represented by broken lines.

In the figure, the optimization-targeted grid point is denoted as vector $L_p$, and grid points derived as neighboring grid points are denoted as vector $L_{a1}$ and vector $L_{a2}$. Here, vector $L_p$ is calculated according to Equation (5) below, with the aforementioned position information (Pr, Pg, Pb) represented as the variable.

$$\vec{L_p} = f(Pr, Pg, Pb) \quad (5)$$

Here, f in the equation is a function for calculating vector $L_p$ from position information (Pr, Pg, Pb), function f being an equation used when calculating a calorimetric value corresponding to position information (Pr, Pg, Pb). That is, position information indicating an optimization-targeted grid point is the variable, and position information for neighboring grid points is fixed. Since colorimetric values for grid points corresponding to fixed position information are known, a colorimetric value corresponding to the variable position information can be interpolated from the relative relationship of the fixed position information and the variable position information. f is a function representing this relationship.

Using this vector $L_p$, vector $L_{a1}$, and vector $L_{a2}$, SEI is calculated according to Equation (6).

$$Si_1 = |(\vec{L_{a1}} - \vec{L_p}) + (\vec{L_{a2}} - \vec{L_p})| \quad (6)$$

That is, the function is such that value of the function is smallest when neighboring grid points to either side of the optimization-targeted grid point are at equal distances from it, and facing in directly opposite directions, and largest when there is an appreciable difference between these distances, and orientation deviates from directly opposite.

Where grid points are positioned uniformly, grid point positioning tends to be smooth, so by minimizing SI$_1$ in Equation 6 it is possible to derive a vector L'$_p$ in which the grid point position of vector $L_p$ has been optimized, as shown at right in FIG. 16. While vector $L_p$, vector $L_{a1}$, and vector $L_{a2}$ are represented by position information (Pr, Pg, Pb), in SI$_1$ position information giving vector $L_{a1}$ and vector $L_{a2}$ is fixed, while of position information (Pr, Pg, Pb) giving vector $L_p$, only one thereof is variable, with the other two held constant at minimum value or maximum value. For example, the color on the broken line edgeline shown in FIG. 16 is between B and K, and the position information Pr, Pg identifying the grid point that corresponds to this color are at their minimum values, while position information Pb is any value. Accordingly, in order to move a grid point in the CIELAB color space on this edgeline, Pb is varied while holding position information Pr, Pg constant.

The same is true of the other edgelines of the gamut boundaries: where the optimization-targeted grid point is present on a gamut boundary on the edgeline from K to R, Pr is variable while holding position information Pg, Pb constant at minimum value. Where the optimization-targeted grid point is present on a gamut boundary on the edgeline from K to G, Pg is variable while holding position information Pr, Pb constant at minimum value. Where the optimization-targeted grid point is present on a gamut boundary on the edgeline from W to C, Pr is variable while holding position information Pg, Pb constant at maximum value; where the optimization-targeted grid point is present on a gamut boundary on the edgeline from W to M, Pg is variable while holding position information Pr, Pb constant at maximum value; and where the optimization-targeted grid point is present on a gamut boundary on the edgeline from W to Y, Pb is variable while holding position information Pr, Pg constant at maximum value.

Additionally, where the optimization-targeted grid point is present on a gamut boundary on the edgeline from M to R, Pb is variable while holding position information Pr constant at maximum value and Pg constant at minimum value; where the optimization-targeted grid point is present on a gamut boundary on the edgeline from M to B, Pr is variable while holding position information Pb constant at maximum value and Pg constant at minimum value; where the optimization-targeted grid point is present on a gamut boundary on the edgeline from C to G, Pb is variable while holding position information Pg constant at maximum value and Pr constant at minimum value; and where the optimization-targeted grid point is present on a gamut boundary on the edgeline from C to B, Pg is variable while holding position information Pb constant at maximum value and Pr constant at minimum value.

Where the optimization-targeted grid point is present on a gamut boundary on the edgeline from Y to R, Pg is variable while holding position information Pr constant at maximum value and Pb constant at minimum value; and where the optimization-targeted grid point is present on a gamut boundary on the edgeline from Y to G, Pr is variable while holding position information Pg constant at maximum value and Pr constant at minimum value. By minimizing SEI through appropriate change of position information, which varies depending on the position of the optimization-targeted grid point, position information that minimizes SI$_1$ can be calculated at that time, and by repeating this process, it is possible to derive a vector L'$_p$ that optimizes grid point position.

Figure 17:
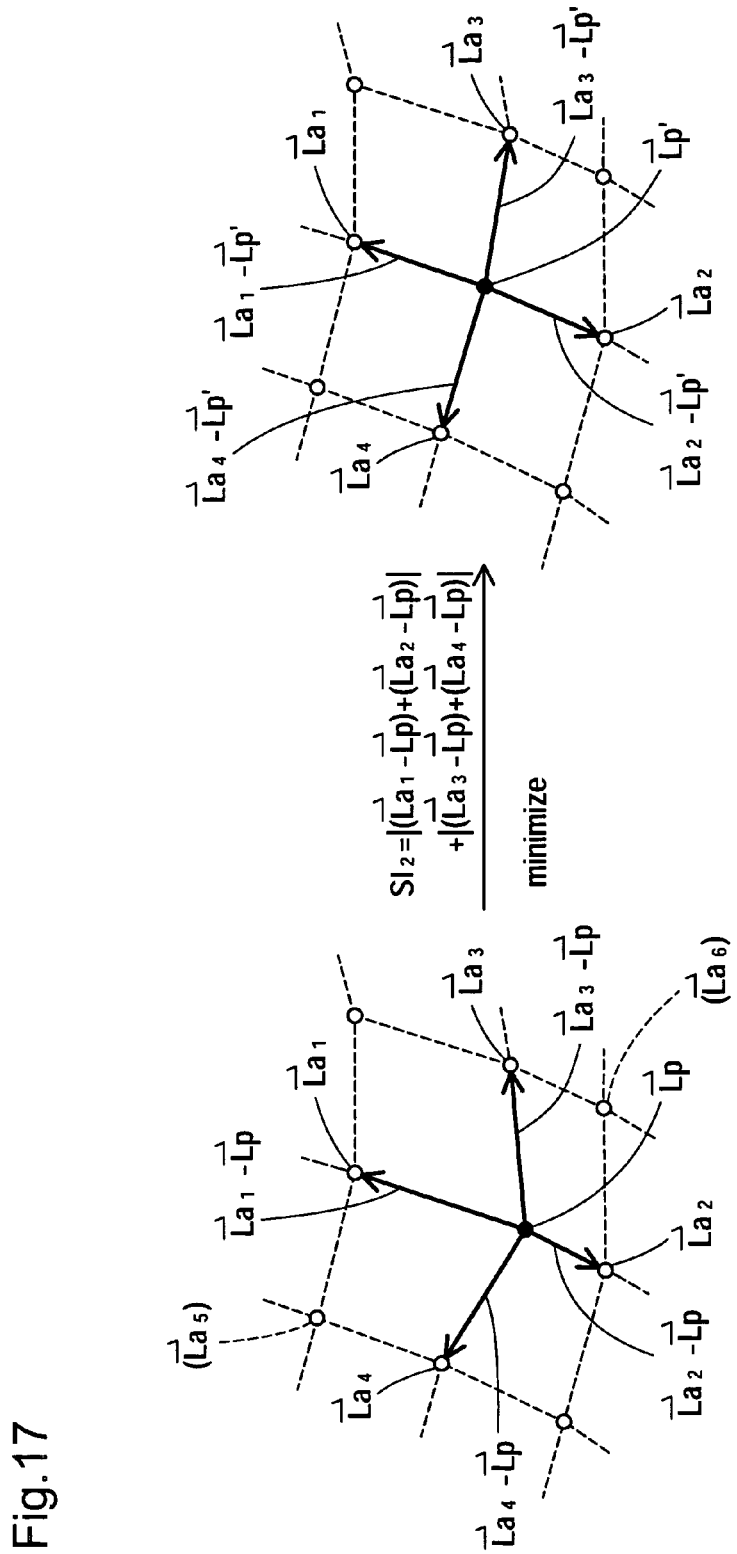
FIG. 17 is an illustration of an SEI for optimizing a point on a surface.

FIG. 17 is an illustration of an SEI (SI$_1$) for optimizing a grid point on an exterior surface formed at a boundary of the gamut in the CIELAB color space. In the figure, grid points are interconnected by broken lines. Since these grid points are present on an exterior face of a gamut boundary, the other grid points are present only rearward or forward of the plane of the paper. The optimization-targeted grid point is indicated by a black circle, and surrounding grid points by white circles. In order to preserve gamut size, any appreciable movement is prohibited on the part of the optimization-targeted grid point in the perpendicular direction relative to the exterior face in which the white circles and black circle are present. Accordingly, in the present embodiment, when a grid point, represented by the black circle in FIG. 17, present on an exterior face of a gamut boundary is derived as a target for optimization in Step S310, in Step S315, four grid points neighboring the optimization-targeted grid point to four sides thereof and situated on the exterior face of the gamut boundary are also derived.

In the figure, the optimization-targeted grid point is denoted as vector $L_p$, and grid points derived as neighboring grid points are denoted as vector $L_{a1}$-vector $L_{a4}$. Here, vector $L_p$ is calculated according to Equation (5) given previously, with the aforementioned position information (Pr, Pg, Pb) represented as the variable. Using vector $L_p$ and vector $L_{a1}$- vector $L_{a4}$, an SEI that will optimize the grid point situated on the exterior face of the gamut boundary is represented by Equation (7) below.

$$SI_2 = |(\vec{L_{a1}} - \vec{L_p}) + (\vec{L_{a2}} - \vec{L_p})| + |(\vec{L_{a3}} - \vec{L_p}) + (\vec{L_{a4}} - \vec{L_p})| \quad (7)$$

That is, SEI is smallest when distances from the optimization-targeted grid point to vectors facing in mutually opposite directions are equal, and vector orientation approximates directly opposite.

To the extent that lines connecting neighboring grid points (lines passing through grid points indicating vector $L_{a1}$-vector $L_p$-vector $L_{a4}$ in FIG. 17) approximate straight lines and grid points are positioned uniformly, grid point positioning tends to be smooth, so by minimizing $SI_2$ in Equation 7 it is possible to derive a vector $L'_p$ in which the grid point position of vector $L_p$ has been optimized, as shown at right in FIG. 17.

While vector $L_p$ and vector $L_{a1}$-vector $L_{a4}$ are represented by position information (Pr, Pg, Pb), in $SI_2$ position information (Pr, Pg, Pb) giving vector $L_p$, only two thereof are variable, with the other one held constant at minimum value or maximum value. For example, the position information Pf for a grid point corresponding to the color on the WMBC exterior face on the gamut boundary represented by hatching in FIG. 15 is at maximum value, while position information Pr, Pg are any values. Accordingly, in order to move a grid point in the CIELAB color space over the WMBC exterior face, position information Pb is held constant at maximum value, while varying Pr and Pg.

The same is true of the other exterior faces of gamut boundaries: in order to move a grid point in the CIELAB color space over the MRKB exterior face of a gamut boundary, position information Pg is held constant at minimum value, while varying Pr and Pb. In order to move a grid point over the RYGK exterior face of a gamut boundary, position information Pb is held constant at minimum value, while varying Pr and Pg.

Additionally, in order to move a grid point over the YWCG exterior face of a gamut boundary, position information Pg is held constant at maximum value, while varying Pr and Pb. In order to move a grid point over the WYRM exterior face of a gamut boundary, position information Pr is held constant at maximum value, while varying Pg and Pb. In this way, by minimizing $SI_2$ by selecting position information that varies depending on the position of the optimization-targeted grid point, position information that minimizes SEI at that point in time can be calculated, and by repeating this process, a vector $L'_p$ that optimizes this grid point position can be derived.

Figure 18:
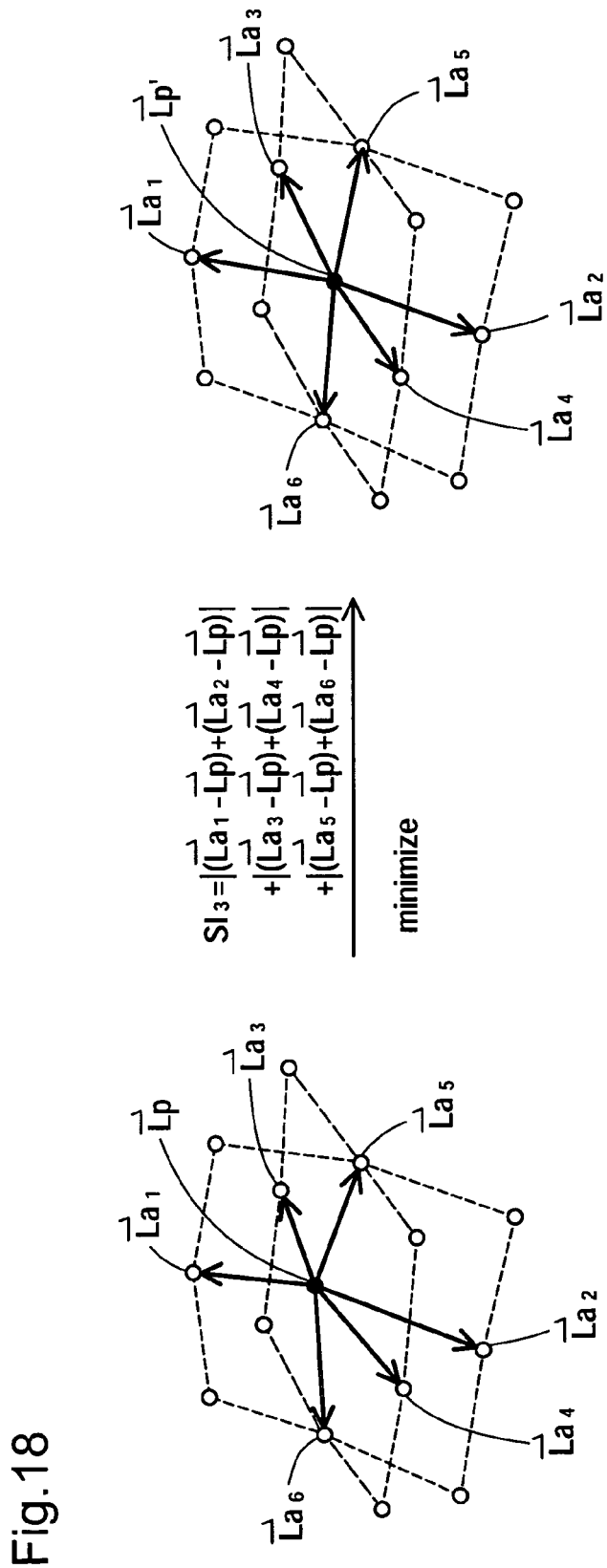
FIG. 18 is an illustration of an SEI for optimizing a point on the inside of a gamut.

FIG. 18 is an illustration of an SEI ($SI_3$) for optimizing a grid point situated in the interior of the CIELAB color space, rather than at a gamut boundary. In the figure, broken lines represent straight lines interconnecting a plurality of grid points present in a plane formed by cutting the gamut in two directions. The optimization-targeted grid point is represented by a black circle, and surrounding grid points by white circles. In this embodiment, grid points in the gamut interior can move freely without imposing any conditions for preserving gamut size. Accordingly, in this embodiment, when a grid point present in the gamut interior, represented by the black circle in FIG. 18, is derived as a target for optimization in Step S310, there are derived in Step S315 six grid points that neighbor the optimization-targeted grid point to six sides thereof.

In the figure, the optimization-targeted grid point is denoted as vector $L_p$, and grid points derived as neighboring grid points are denoted as vector $L_{a1}$-vector $L_{a6}$. Here, vector $L_p$ is calculated according to Equation (5) given previously, with the aforementioned position information (Pr, Pg, Pb) represented as the variable. Using vector $L_p$ and vector $L_{a1}$-vector $L_{a6}$, an SEI that will optimize the grid point situated in the gamut interior is represented by Equation (8) below.

$$SI_3 = |(\vec{L_{a1}} - \vec{L_p}) + (\vec{L_{a2}} - \vec{L_p})| + \\ |(\vec{L_{a3}} - \vec{L_p}) + (\vec{L_{a4}} - \vec{L_p})| + \\ |(\vec{L_{a5}} - \vec{L_p}) + (\vec{L_{a6}} - \vec{L_p})| \quad (8)$$

That is, SEI is smallest when distances from the optimization-targeted grid point to vectors facing in mutually opposite directions are equal, and vector orientation approximates directly opposite.

To the extent that lines connecting neighboring grid points (lines passing through grid points indicating vector $L_{a1}$-vector $L_p$-vector $L_{a2}$ in FIG. 18) approximate straight lines and grid points are positioned uniformly, grid point positioning tends to be smooth, so by minimizing $SI_3$ in Equation (8) it is possible to derive a vector $L'_p$ in which the grid point position of vector $L_p$ has been optimized, as shown at right in FIG. 18.

While vector $L_p$ and vector $L_{a1}$-vector $L_{a6}$ are represented by position information (Pr, Pg, Pb), in $SI_3$ all position information (Pr, Pg, Pb) giving vector $L_p$ is variable. In this way, by minimizing $SI_3$ by varying the position information, position information that minimizes SEI at that point in time can be calculated, and by repeating this process, a vector $L'_p$ that optimizes this grid point position can be derived.

Once the smoothed ink profile 144 has been created by ink profile generator 140, a regularly spaced lookup table is created to facilitate the interpolation process when creating the aforementioned printer lookup table 180. That is, in the smoothed ink profile 144, while Lab grid point positioning has been smoothed, the grid points per se are not necessarily spaced regularly apart. Where spacing among grid points is not regular, it becomes difficult to search for a grid point for interpolating an interpolated point during creation of printer lookup table 180. The interpolation calculations per se become complicated as well.

Figure 19A:
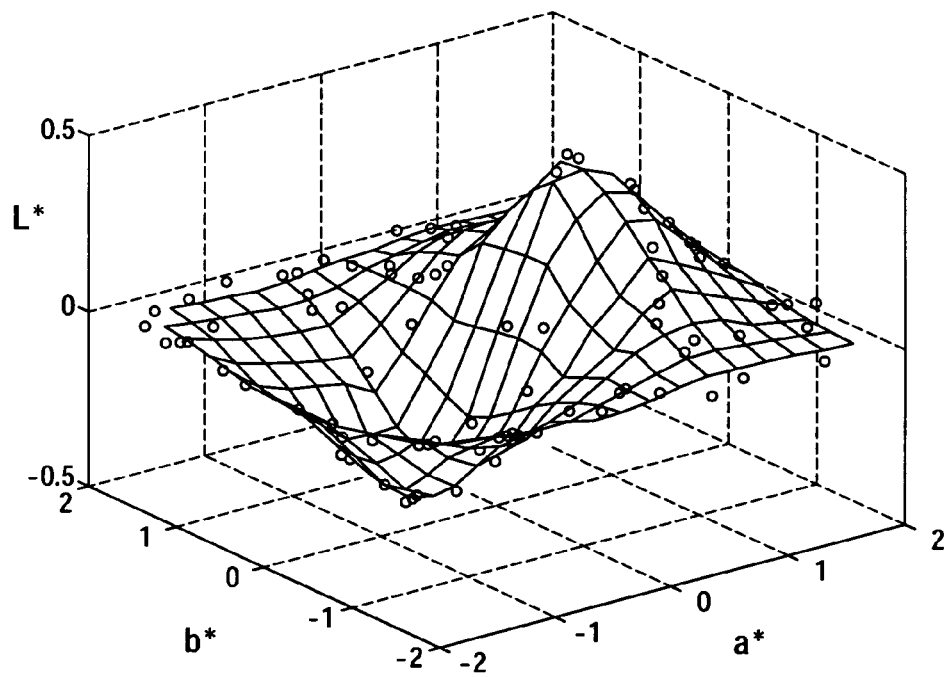
FIGS. 19(A)-19(C) show nonuniform interpolation in Step S45.
Figure 19B:
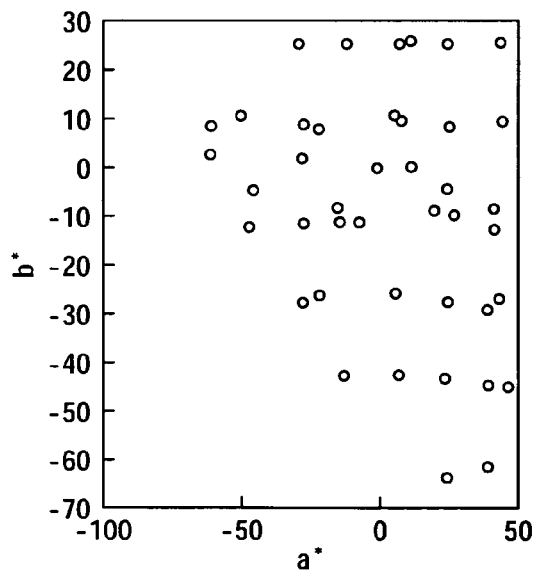
Figure 19C:
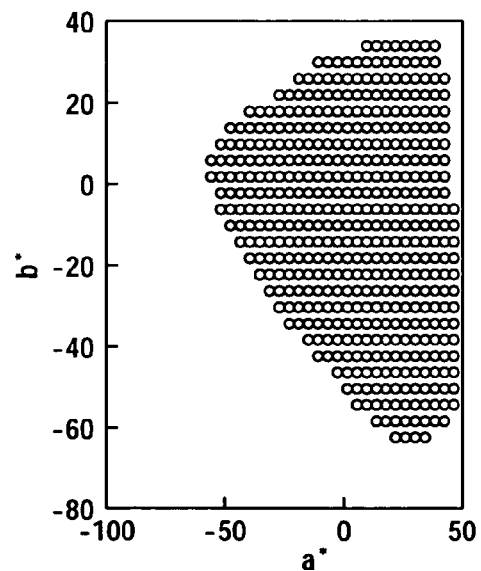

Accordingly, in this embodiment, grid point spacing is rendered equidistant by performing interpolation calculations for smoothed ink profile 144. FIGS. 19(A)-19(C) show an example of nonuniform interpolation. FIG. 19(A) shows the CIELAB color space; the circles in the figure indicates positions of grid points after smoothing, and the web pattern indicates a fine cell grid. Through interpolation in this manner, it is possible to calculate ink amounts corresponding to regularly spaced Lab grid points. In FIGS. 19(B) and 19(C), there are shown examples of Lab grid points before and after interpolation at L*=23.8. This nonuniform interpolation may be carried out using the MATLAB™ (MathWorks Inc.) grid-data function, for example. Either nonlinear interpolation or linear interpolation may be employed for the nonuniform interpolation. Typically, nonlinear interpolation tends to be more accurate than linear interpolation, but processing speed slower.

Once a regularly spaced profile defining correspondence relationships for equidistant Lab grid points and ink amounts has been created in this way, in Step S350 shown in FIG. 2, gamut mapping processor 160 (FIG. 1) performs gamut mapping on the basis of the aforementioned regularly spaced profile and sRGB profile 162 to create a printer lookup table 180. The reason for performing gamut mapping is a difference between the gamut of the color space realizable in the printer (also termed "ink color space") and the gamut of the color space realizable in the input color space (in this embodiment, the sRGB color space). The gamut of the ink color space is defined by the aforementioned regularly spaced profile, while the gamut of the input color space is defined by sRGB profile 162. Since there are typically discrepancies between the input color space and the ink color space, it is necessary to map the gamut of the input color space to the gamut of the ink color space.

Figure 20A:
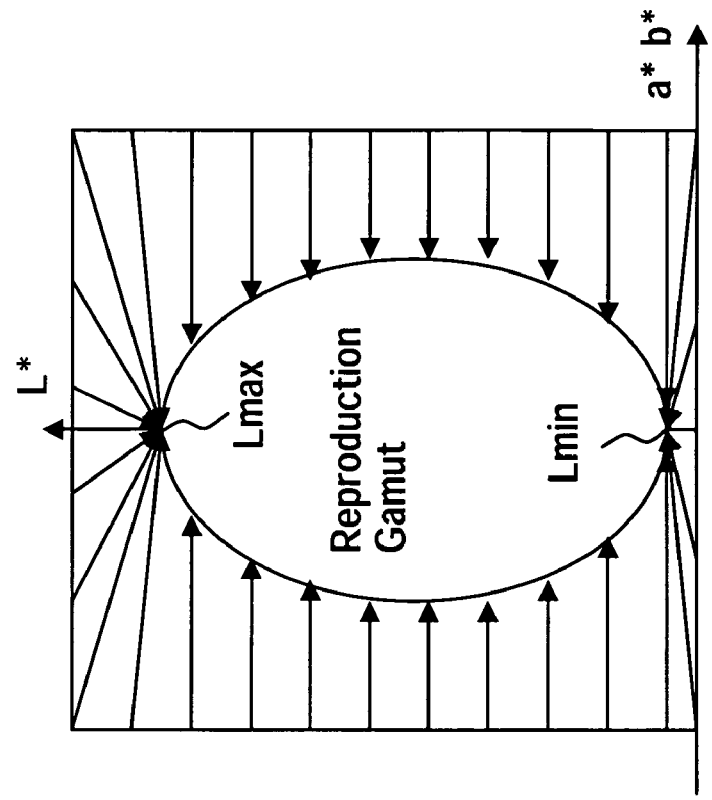
FIGS. 20(A) and 20(B) show gamut mapping in Step S50.
Figure 20B:
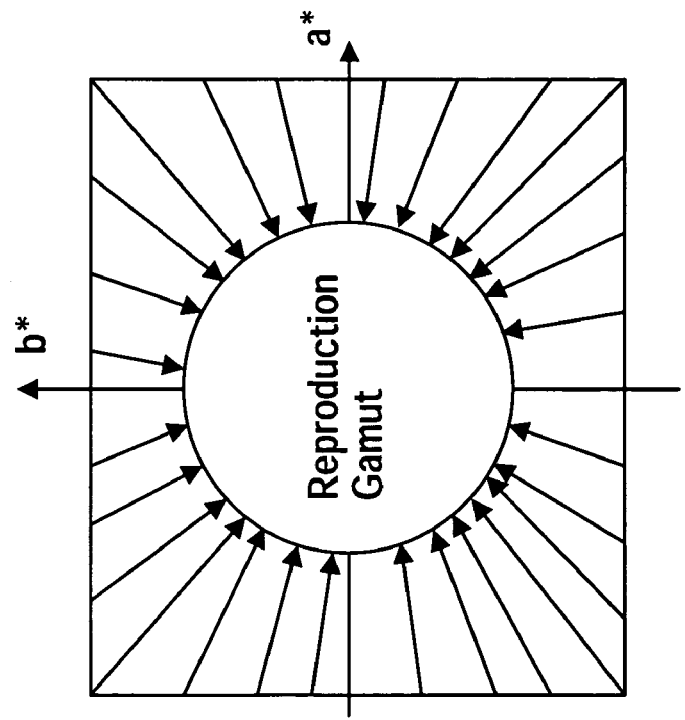

FIGS. 20(A) and 20(B) show an example of gamut mapping. Here, a method termed gamut clipping is employed. Specifically, as shown in FIG. 20(A), colors in the sRGB color space lying outside the gamut of the ink color space are mapped so as to reduce chroma while preserving hue. As regards lightness L*, for colors within the lightness range of the ink color space, lightness is preserved as-is. Colors having lightness greater than the maximum value for lightness Lmax of the ink color space are mapped to the maximum value Lmax. On the other hand, colors having lightness smaller than the minimum value for lightness Lmin are mapped to the minimum value Lmin. Various methods for gamut mapping are known to date, and any of these methods may be employed.

Once gamut mapping has been performed in this way, the final printer lookup table 180 is complete. This lookup table 180 inputs sRGB data and outputs ink amounts for six types of ink. By installing lookup table 180 in a printer, it is possible to produce printed output having high color constancy (i.e. little change in color appearance under different viewing conditions). It is also possible to reduce the graininess visible to the human eye in printed output. Additionally, as a result of the smoothing process described above, it is possible to produce printed output of high quality free from sharp tone.

Although printer lookup table 180 is produced as a profile defining correspondence between sRGB data and CMYKOG ink data in the above Embodiment 1, other types of profiles can be also prepared according to the present invention. For example, the present invention may be applied to production of a media profile for converting device-independent color data to device-dependent color data, which will be used with a source profile for converting device-dependent color data to device-independent color data prior to the conversion by the media profile. Media profiles can be made through performing non-uniform interpolation on the smoothed ink profile 144 to obtain regularly spaced grid points, and performing gamut mapping in Lab space. The regularly spaced grid profile obtained from the smoothed ink profile 144 defines a gamut of the printer, and grid points outside this printer gamut in CIELAB space are mapped to grid points on the outer surface or inside of the printer gamut. Media profile thus prepared can convert any CIELAB value obtained from the source profile to CMYKOG data.

B. EMBODIMENT 2

Figure 21:
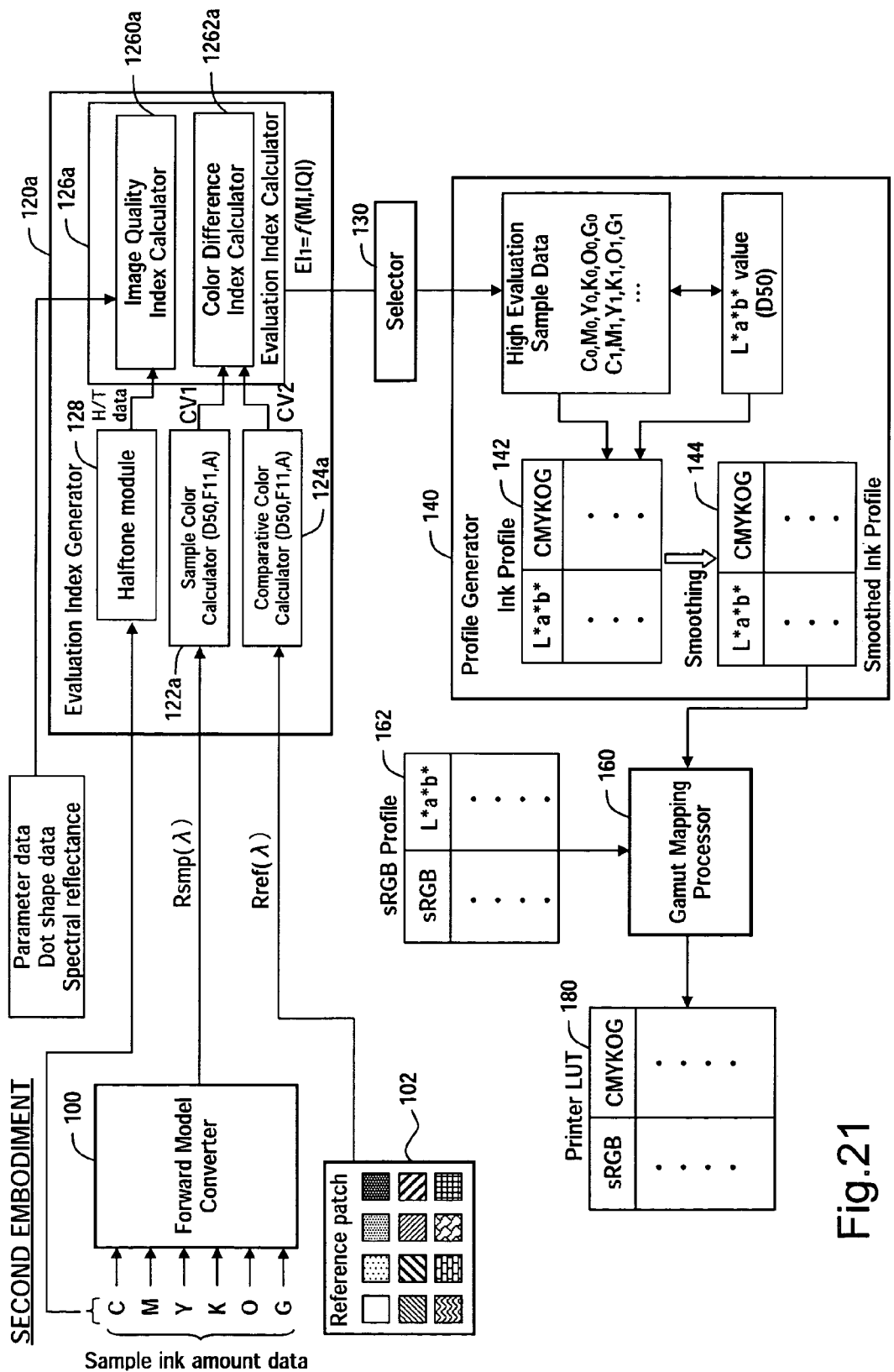
FIG. 21 is a block diagram showing system arrangement in Embodiment 2 of the invention.

FIG. 21 is a block diagram showing system arrangement in Embodiment 2 of the invention. The differences from the system of Embodiment 1 in FIG. 1 include the use of reference color patches 102, and the use of an index including a metamerism index (described later) rather than a color inconstancy index (CII) as an evaluation index EI.

Figure 22:
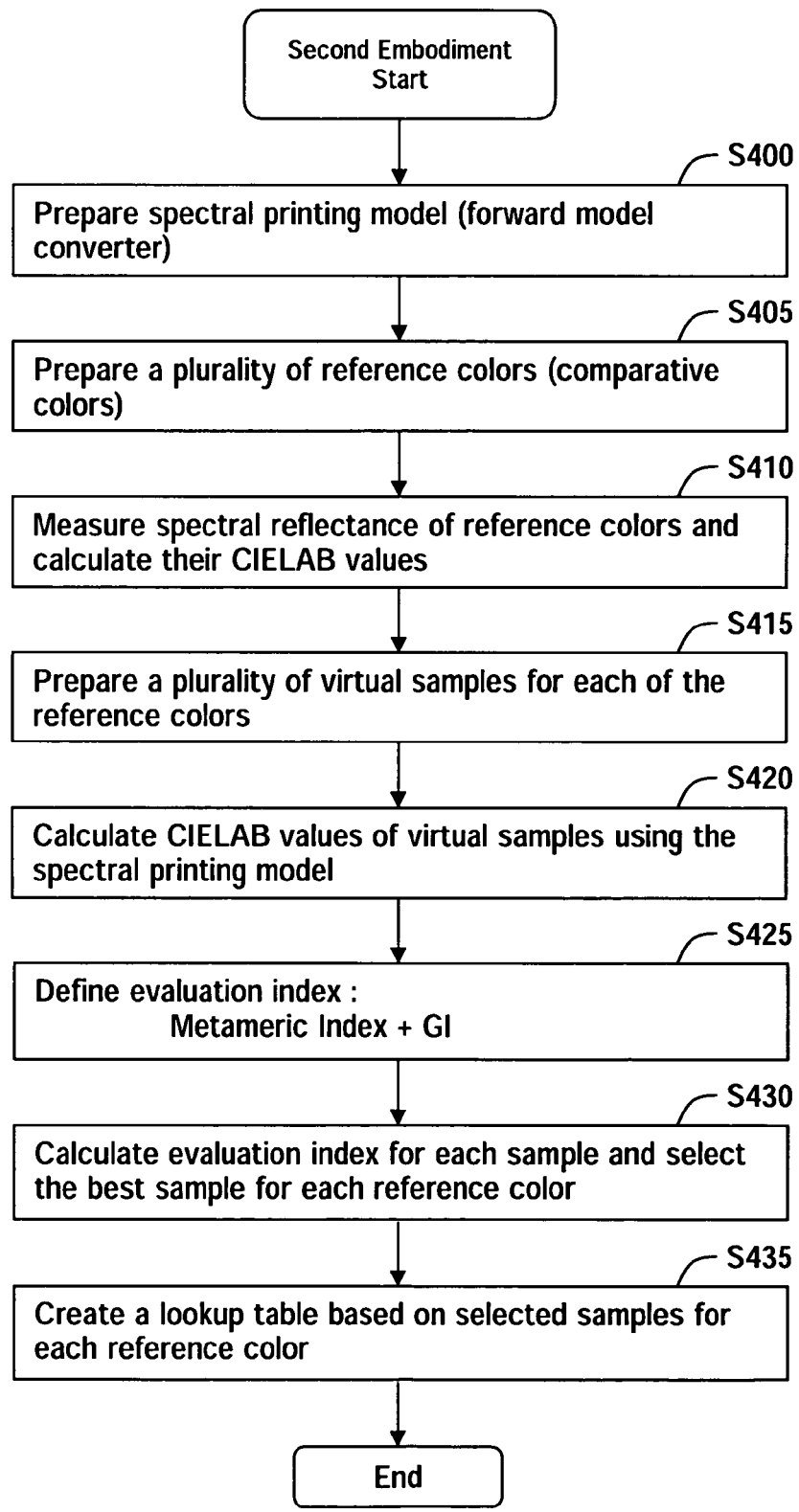
FIG. 22 is a flowchart illustrating process flow in Embodiment 2.

FIG. 22 is a flowchart illustrating process flow in Embodiment 2. In Step S400, a spectral printing model is determined and a converter 100 is created. This step is identical to Step S10 in FIG. 2. In Step S405, plural comparative colors are prepared. In the example of FIG. 21, reference color patches 102 are prepared by way of originals providing plural comparative colors; spectral reflectance Rsmp($\lambda$) of these reference color patches 102 are measured by a spectral reflectance meter, not shown. The reference color patches 102 are original patches including plural color patches. However, plural comparative colors could instead be acquired from a picture, for example, rather than from reference color patches 102. Colors acquired from reference color patches 102 or from a picture are also termed "reference colors." In Step S410, comparative color calculator 124a uses spectral reflectance Rsmp($\lambda$) of reference colors (comparative colors) to calculate calorimetric values CV2 under plural viewing conditions. In this embodiment, three types of illuminant D50, F11, and A are used as the plural viewing conditions.

In Step S415, a plurality of virtual samples (sample ink amount data) likely to have a high degree of metamerism with the comparative color are prepared for each comparative color. Here, degree of metamerism refers to stability of metamerism of a pair of subject colors (a sample color and a comparative color) observed under a plurality of different illuminants (so-called illuminant metamerism). In Step S420, calorimetric values CV1 are calculated for these virtual samples. Specifically, in the same manner as in Embodiment 1, ink amount data for each virtual sample is converted to spectral reflectance Rsmp($\lambda$) by spectral printing model converter 100, and this spectral reflectance Rsmp($\lambda$) is used to calculate calorimetric values CV1 under the same plurality of viewing conditions as those used for the comparative color.

In Step S425, an evaluation index $EI_2$ represented by Equation (9) below is defined.

$$EI_2 = f(MI, IQI) = k \cdot \mathrm{ave}(MI_i) + GI \qquad (9)$$

Here, the operator ave means an operation of taking the average of the expression inside the parentheses; MIi is the metamerism index under the i-th viewing condition (i.e. under the i-th illuminant); and k is a coefficient. By means of coefficient k, the extent of contribution of metamerism index MI and graininess index GI to the evaluation index $EI_2$ can be adjusted. Of course, the value of coefficient k may be changed on a sample-by-sample basis. In Equation (9), MI is the aforementioned color difference evaluation index CDI, and GI is the aforementioned image quality evaluation index IQI. Evaluation index $EI_2$ is not limited to that given by Equation (9); another evaluation index a may be appended.

MIi is given by the following equation (10), for example.

$$MI_i = \left[ \left( \frac{\Delta L^*}{2S_L} \right)^2 + \left( \frac{\Delta C^*_{ab}}{2S_C} \right)^2 + \left( \frac{\Delta H^*_{ab}}{S_H} \right)^2 \right]^{1/2} \qquad (10)$$

This metamerism index MIi represents the color difference between sample color and comparative color under the i-th illuminant. Specifically, $\Delta L^*$, $\Delta C^*_{ab}$, and $\Delta H^*_{ab}$ denote a lightness difference, a chroma difference, and a hue difference between sample color and comparative color under the i-th illuminant, respectively. The color difference is taken after a parameric correction is applied to match the sample and comparative color under the reference viewing conditions. The first right-hand term in Equation (9) can be understood as an index representing a degree of illuminant metamerism. Regarding metamerism index, see Billmeyer and Saltzman's Principles of Color Technology, 3rd edition, John Wiley & Sons Inc. 2000, p. 127, and p. 211-213 which is herein incorporated by reference in its entirety.

As will be apparent from comparison of Equation (2) given earlier with Equation (10), the same color difference equation as that giving CII can be used as the equation giving MI. The difference between MI and CII is that the former represents difference in color of two subject colors observed under the same viewing condition, whereas the latter represents difference in color of one subject color observed under different viewing conditions. Equations other than Equation (10) can be used as the color difference equation for calculating MI.

In Step S340, evaluation index generator 120a calculates an evaluation index $EI_2$ for each sample. The method for calculating GI is the same as those illustrated previously in FIG. 5 and FIG. 10. Once an evaluation index $EI_2$ has been calculated, selector 130 selects the best sample for each reference color with reference to evaluation index $EI_2$. In Step S435, the sample selected for each reference color is used to generate smoothed ink profile 144 and printer lookup table 180. This step S435 is a process substantially identical to that of Steps S40-S50 in FIG. 2. As a lookup table for faithfully reproducing a picture, it would also be possible to create a table having, for example, the color numbers of the picture colors as input, and ink amounts as output. In this case, the smoothing process of Step S45 and the gamut mapping of Step S50 may be dispensed with.

In this way, in Embodiment 2, using an evaluation index $EI_2$ that includes a metamerism index MI, highly rated data is selected from among sample ink amount data, and an ink profile is created on the basis of the selected sample ink amount data. As a result, it is possible to create a color conversion profile able to produce a printout of color having little color difference from a reference color under various different viewing conditions. Additionally, since the evaluation index includes a GI, perceptible graininess in printed output can be reduced. As a result of the aforementioned smoothing process, it is possible to produce printed output of high quality free from sharp tone. This second embodiment is particularly useful in producing a color conversion profile for faithfully reproducing an original painting. Quality of a printout reproduced with the profile thus prepared may be evaluated by means of an index representing differences between spectral reflectance values, such as RMS. RMS is the root mean square of the difference between the two spectral reflectance values. The difference between the two spectral reflectance values is calculated on a predetermined wavelength band-by-wavelength band basis (e.g., every 5 nm or 10 nm). The color inconstancy index CII used in Embodiment 1 also represents color difference between different viewing conditions, and the metamerism index MI used in Embodiment 2 also represents color difference. Accordingly, the evaluation indices EI used in Embodiments 1 and 2 may each be understood to include an index representing color difference.

C. EMBODIMENT 3

Figure 23:
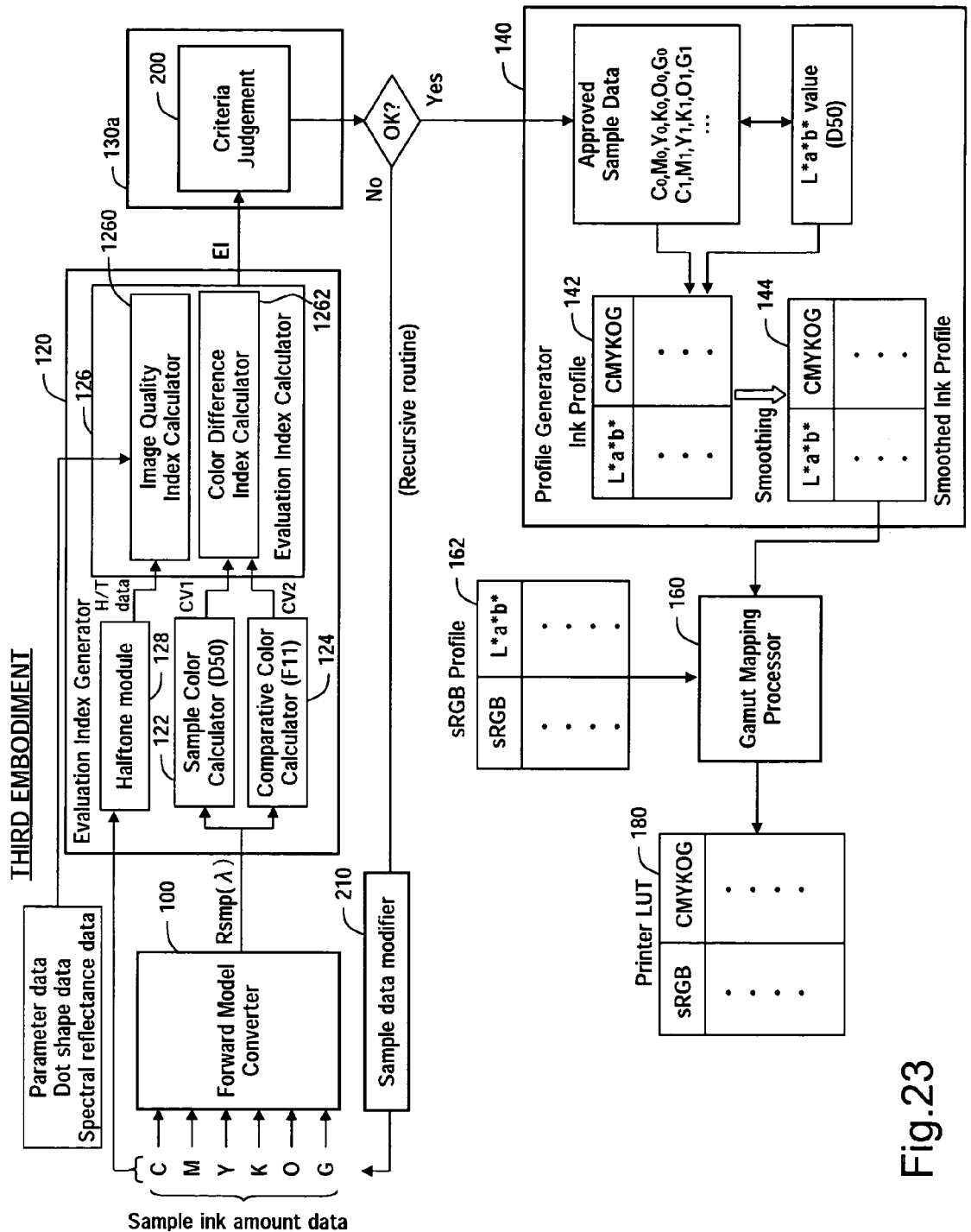
FIG. 23 is a block diagram showing system arrangement in Embodiment 3 of the invention.

FIG. 23 is a block diagram showing system arrangement in Embodiment 3 of the invention. The difference from the system of Embodiment 1 shown in FIG. 1 are that selector 130a includes a criteria judgment section 200, and a sample data modifier 210 has been added. In Embodiment 3, in the event that a certain sample does not meet predetermined evaluation criteria, the sample data modifier 210 modifies the sample ink amount data, and recalculates an evaluation index EI for the modified sample ink color amount data. A color conversion profile is then created using samples that meet the evaluation criteria.

Figure 24:
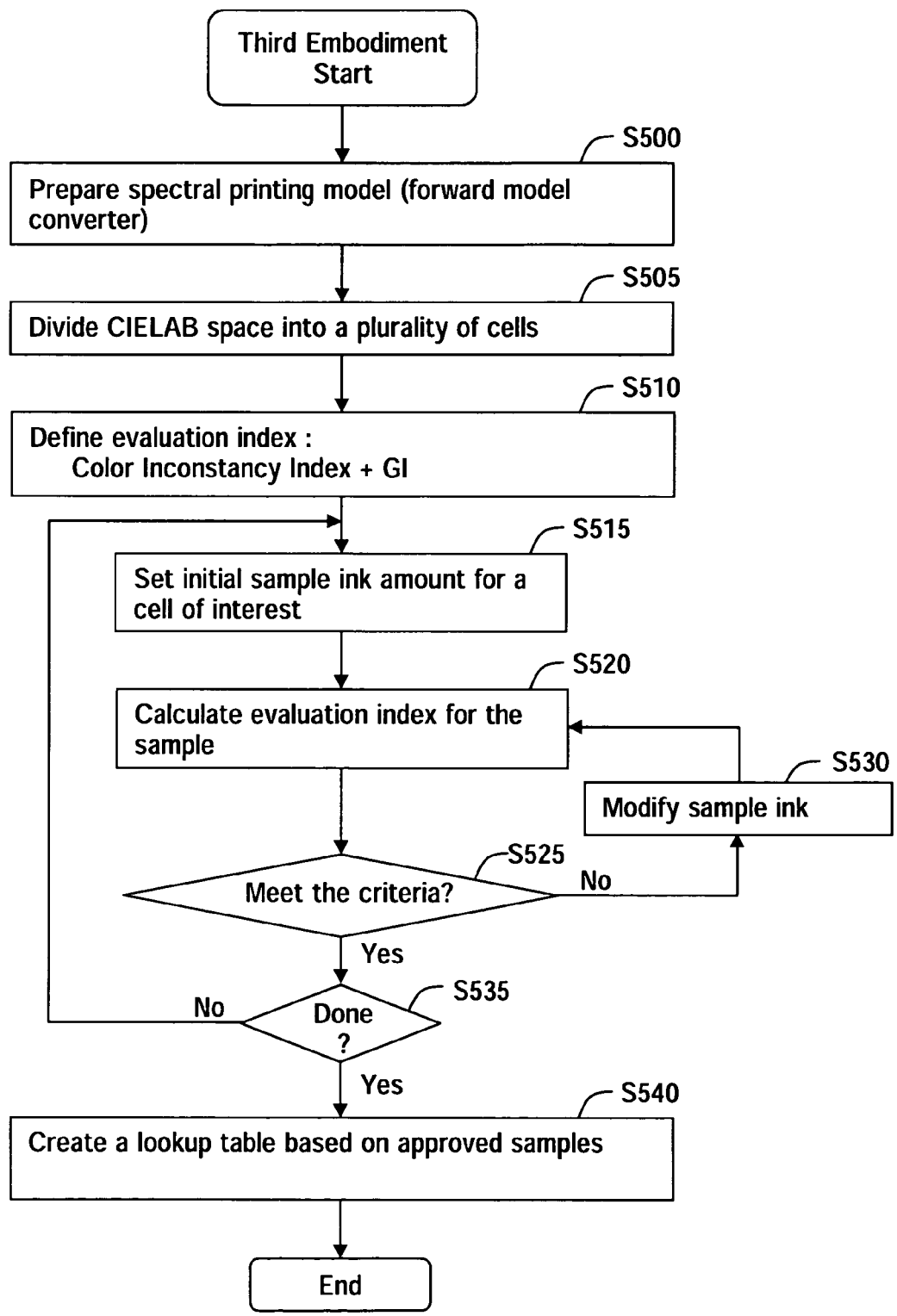
FIG. 24 is a flowchart illustrating process flow in Embodiment 3.

FIG. 24 is a flowchart illustrating process flow in Embodiment 3. In Step S500, a spectral printing model is prepared. This Step S500 is the same as Step S10 in FIG. 2. In Step S505, the CIELAB color space is divided into a plurality of cells. Here, the same 16×16×16 cell division as used in Step S25 in Embodiment 1 may be employed.

In Step S510, an evaluation index EI for determining quality of a sample is defined. Embodiment 3 employs the evaluation index $EI_1 = f(CII, GI)$ of Embodiment 1. However, the evaluation index $EI_2 = f(MI, GI)$ of Embodiment 2 could be used instead.

Steps S515-S530 are a recursive routine for selecting one representative sample for each cell. In Step S515, one cell in the CIELAB color space is selected as the target for processing (target cell), and initial sample ink amount data is set for the target cell. For this initial sample ink amount data, the measured value (L*a*b* value) of the sample color printed out in response to the ink amount data is within in the target cell. The measured value of the sample color is calculated under a first viewing condition (for example, illuminant D50 and CIE 1931 2° Standard Observer). In the event that the measured value of the set initial sample ink amount data is not inside the target cell, the initial sample ink amount data is modified until the measured value is within the target cell.

Depending on the cell, in some instances, there may be no ink amount data that gives a measured value within the cell. For example, the color of a cell having high lightness or low lightness and high chroma may not be reproducible. In such an instance, the cell is excluded as a target for processing, so as to be excluded from subsequent processing.

In Step S520, evaluation index generator 120 calculates an evaluation index EI for the initial sample ink amount data. This evaluation index EI is calculated according to Equation (2) given earlier, for example. In Step S520, criteria judgment section 200 judges whether the evaluation index EI meets predetermined evaluation criteria. Evaluation criteria may be given by the following Equation (11), for example.

$$EI \leq \delta \quad (11)$$

Here, $\delta$ is the upper permissible limit for evaluation index EI.

Where Equation (11) is used, criteria is judged to be met when evaluation index EI does not exceed the upper permissible limit $\delta$. Alternatively, rather than using a single evaluation index EI, a plurality of evaluation indices could be calculated for a single set of sample ink amount data, and the sample ink amount data judged to meet the evaluation criteria when all of the evaluation indices meet the criteria.

In the event that initial sample ink amount data does not meet evaluation criteria, in Step S530, sample data modifier 210 modifies the initial sample ink color data. In practice, several restrictive conditions such as the following will be imposed as regards the modified sample ink amount data.

(Restrictive condition 1): the calorimetric value given by the sample ink amount data subsequent to modification shall be within the target cell.

(Restrictive condition 2): the ink amount represented by sample ink amount data subsequent to modification shall meet the ink duty limit.

Restrictive condition 1 is a condition required in order to calculate a representative sample for a target cell. Restrictive condition 2 ensures that the modified sample ink amount data represents an ink amount that can be used in actual printing. Ink duty limit refers to an amount of ink ejectable onto a print medium, per unit of surface area thereof, and is predetermined with reference to type of print medium, based on consideration of ink bleed. A typical ink duty limit value will include a maximum value of ink amount for each ink, and a maximum value of total ink amount for all inks. Additional restrictive conditions besides the aforementioned Restrictive conditions 1, 2 may be imposed as well.

Once sample ink amount data has been modified in the above manner, the process of Steps S520, S525 is again executed using the modified sample ink amount data. In this way, the processes of Steps S520-S530 are executed recursively, and the sample meeting the evaluation criteria is selected as the representative sample for the target cell. It is conceivable that a sample meeting the evaluation criteria may be impossible to obtain even when recursive processes are carried out a predetermined number of times for a given target cell. In such an instance, from among the plurality of samples examined in relation to the particular target cell, the sample that comes closest to meeting the evaluation criteria (sample with the best rating index) may be selected as the representative sample. Alternatively, no representative sample may be selected for the target cell.

In Step S535, it is determined whether processing has been completed for all cells, and if not completed the routine returns to Step S515, and initiates processing for the next cell. When processing for all cells has been completed in this way, in Step S540, the selected representative samples are used to create smoothed ink profile 144 and printer lookup table 180. The process of Step S540 is the same as that of Steps S40-S50 in FIG. 2.

In Embodiment 3 described hereinabove, the color space of predetermined colorimetric values (in the preceding example, the CIELAB color space) is divided into a plurality of cells, a representative sample that meets certain evaluation criteria is searched for recursively, on a cell-by-cell basis, and the representative samples are used to create a profile and lookup table. Accordingly, the number of cells including not even one sample can be reduced, as compared to Embodiment 1. As a result, it is possible to obtain a printer lookup table 180 having a wider gamut. It is also possible to obtain a printer lookup table 180 that is superior in terms of color reproduction characteristics as well.

D. EMBODIMENT 4

As noted previously, the evaluation index is not limited to the color difference evaluation index CDI and image quality evaluation index IQI only; other evaluation indices may be appended. For example, an evaluation index for evaluating ink amounts, such as that given by Equation (12) below, may be appended.

$$EI_1 = k_1 \cdot CII + k_2 \cdot GI + k_3 \cdot T_{ink} \quad (12)$$

Here, $k_1$-$k_3$ are coefficients for adjusting the extent of contribution of CII, GI and Tink to the evaluation index. Tink is the total value of ink amount used by the sample. For example, where ink amount for all six types of ink is set to 20%, the value of Tink/6 is 120%=1.2. Total ink amount Tink is used here to minimize total ink for cost savings. Accordingly, where CII and GI values are substantially the same, Equation (12) gives a better (i.e. smaller) evaluation index $EI_1$ the smaller the value of total ink amount Tink.

E. EMBODIMENT 5

The SI index for evaluating degree of smoothness of grid points is not limited to an arrangement in which it is calculated separately from evaluation index $EI_1$ as described hereinabove. That is, it is possible to employ an arrangement in which smoothness evaluation index SI is a part of evaluation index $EI_1$.

$$EI_1 = k_1 \cdot CII + k_2 \cdot GI + k_3 \cdot SI \quad (13a)$$

Here, $k_1$-$k_3$ are coefficients for adjusting the extent of contribution of CII, GI and SI to the evaluation index. SI is an index for evaluating the degree of smoothness of a sample, and has a lower value the smoother the sample. Accordingly, where CII and GI values are substantially the same, Equation (13a) is gives a better (i.e. smaller) evaluation index $EI_1$ the smoother the sample.

Figure 25:
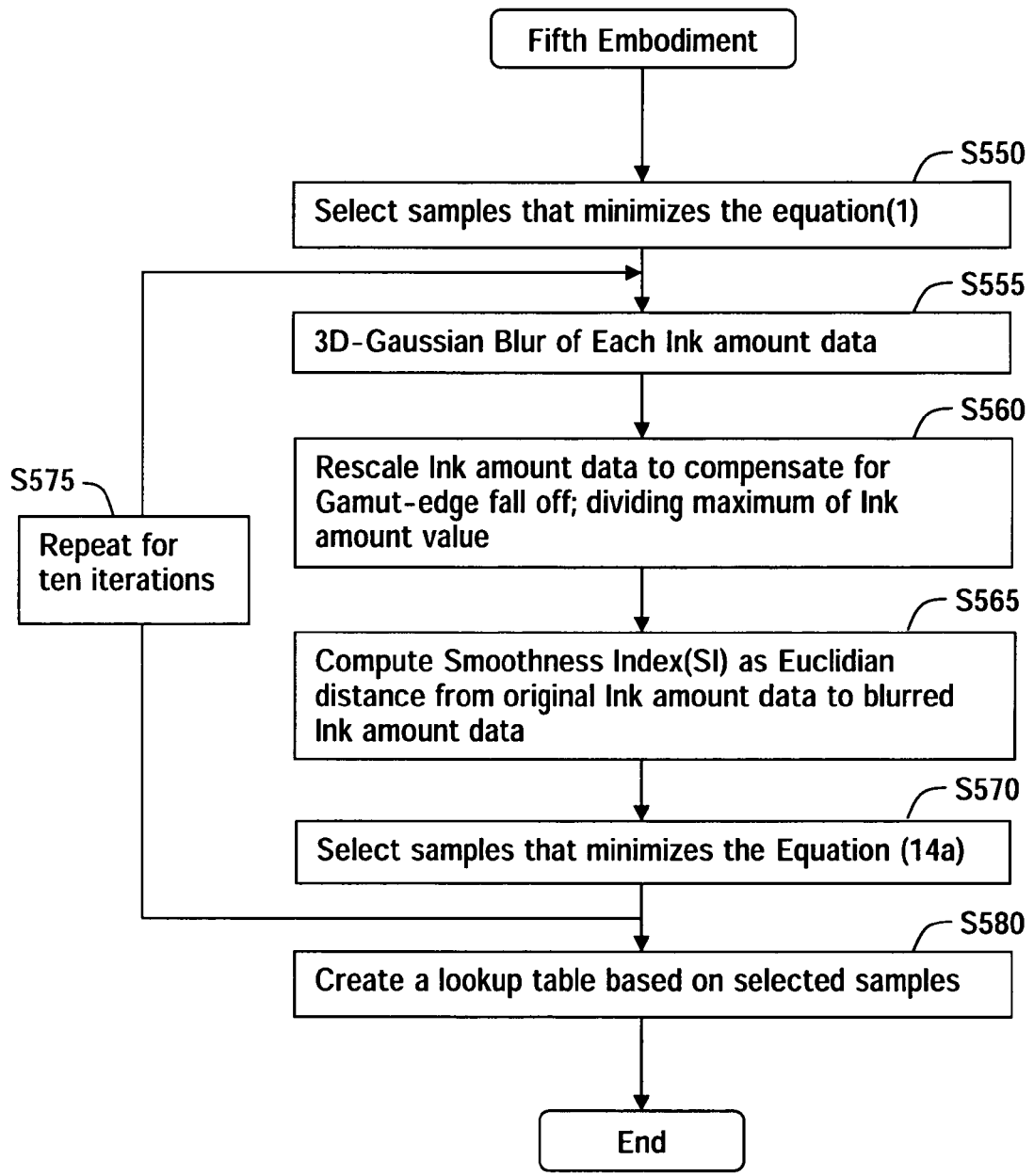
FIG. 25 is a flowchart illustrating process flow in Embodiment 5.

While this embodiment can be realized by means of an arrangement identical to that of Embodiment 1 shown in FIG. 1, the smoothing process is executed by evaluation index calculator 126, with no smoothing being performed in the profile generator 140. In the example, prior to evaluating SI by means of Equation (13a), an initial sample set is selected by means of the first and second terms in Equation (13a), and a smoothed sample set is selected based on the initial sample set using index $EI_1$ including SI. This process is shown in FIG. 25. Specifically, in step S550, evaluation index calculator 126 calculates an evaluation index according to Equation (1) by means of a process similar to that in Embodiment 1, and selector 130 selects an initial sample set having the minimum evaluation index in each cell. In step S555, the initial sample set is then subject to the first smoothing process in the routine. In this embodiment, blurring is carried out by means of a three-dimensional Gaussian function in CIELAB space. Gaussian function provides weight coefficients to sample ink amounts of the sample of interest and other samples close to it in CIELAB space. The products of ink amount and weight coefficient are summed up and normalized by the weight sum to obtain a smoothed sample ink amount for the sample of interest. In step S560, resealing is performed to compensate for the falloff to zeros outside the gamut boundary. More specifically, the ink amount data for each ink is divided the maximum of ink amount value of each ink. This resealing is carried out to prevent the SI from promoting reduced ink amounts within the gamut at each iteration of the smoothing.

In step S565, a distance between each non-blurred sample points and the blurred sample point is calculated to arrive at SI according to Equation (13b).

$$SI = \sqrt{\sum_{ink=1}^{ink=6} (A_{ink} - A_{ink,blurred})^2} \quad (13b)$$

Sample point is a point in six dimensional ink amount space. In Equation (13b), the suffix "ink" denotes ink color, $A_{ink}$ denotes ink amount data for a non-blurred sample, and $A_{ink,blurred}$ denotes ink amount data for the blurred sample. SI is calculated for each of the non-blurred samples. SI indicates variation of ink amount caused by the selection of ink combination, and the smaller the value of SI, the smaller the variation is. Thus, samples having smaller SI values will show small ink amount fluctuations. In step S570, evaluation index calculator 126 calculates the aforementioned CII, GI and SI for each of the samples, and calculates the evaluation index using the aforementioned Equation (13a). This step thus selects a sample ink amount data in each cell which has small values for CII, GI, and SI.

The routine of steps S555 through S570 in FIG. 25 is repeated (S575). In this repetition, ink amount data selected by the Equation (13a) are blurred by means of the three-dimensional Gaussian function. Selector 130 then selects for each cell the sample having the smallest evaluation index as smoothed sample according to Equation (13a) after the repetition. On the basis of samples so selected, profile generator 140 calculates ink profile 142, whereupon gamut mapping processor 160 uses this ink profile 142 and the prepared sRGB profile 162 to produce the printer lookup table 180.

According to this embodiment, a smoothed profile can be produced without performing recursive calculation in profile generator 140. When producing the printer lookup table 180 from the ink profile 142, the number of samples may be increased. In this case, profile generator 140 produces a preliminary ink profile by means of non-uniform interpolation on the basis of representative samples. This preliminary ink profile is a color conversion lookup table for converting CIELAB calorimetric values to ink amounts. The prefix "preliminary" means that the profile relates to the relatively rough cells divided in Step S25. Non-uniform interpolation may be carried out using the MATLAB™ (MathWorks Inc.) griddata function, for example. In the example, the preliminary profile is created with about 64×64×64 grid points in the CIELAB space.

Profile generator 140 then creates the final ink profile 142 by means of linear interpolation of the preliminary profile. This final ink profile 142 has as input finer cell grid points than does the preliminary profile. In the example, the final profile is created with input of 256×256×256 grid points in the CIELAB space. As noted, the preliminary profile has as input 64×64×64 grid points in the CIELAB space, and it is therefore a simple matter to produce the final ink profile 142 by means of linear interpolation.

By generating a profile with input of 256×256×256 grid points of the CIELAB color space as the final ink profile 142, it is possible to quickly derive ink amounts corresponding to all CIELAB input values. Accordingly, the processing time required to subsequently create the lookup table can be reduced. However, it would also be possible to create the printer lookup table 180, described later, using the preliminary profile rather than final ink profile 142. While the present embodiment describes the use of CII as the CDI, the CDI is not limited to CII, and could be MI instead.

F. Example of Spectral Printing Model

The cellular Yule-Nielsen spectral Neugebauer model, an exemplary spectral printing model, is now described. This model is based on the well-known spectral Neugebauer model and Yule-Nielsen model. The following description assumes a model that employs the three inks CMY, but the model could readily be expanded to one using an arbitrary plurality of inks. The cellular Yule-Nielsen spectral Neugebauer model is described by Wyble and Berns, Color Res. Appl. 25, 4-19, 2000, and R Balasubramanian, Optimization of the spectral Neugebauer model for printer characterization, J. Electronic Imaging 8(2), 156-166 (1999), the disclosures of which are incorporated herein by reference for all purposes.

Figure 26A:
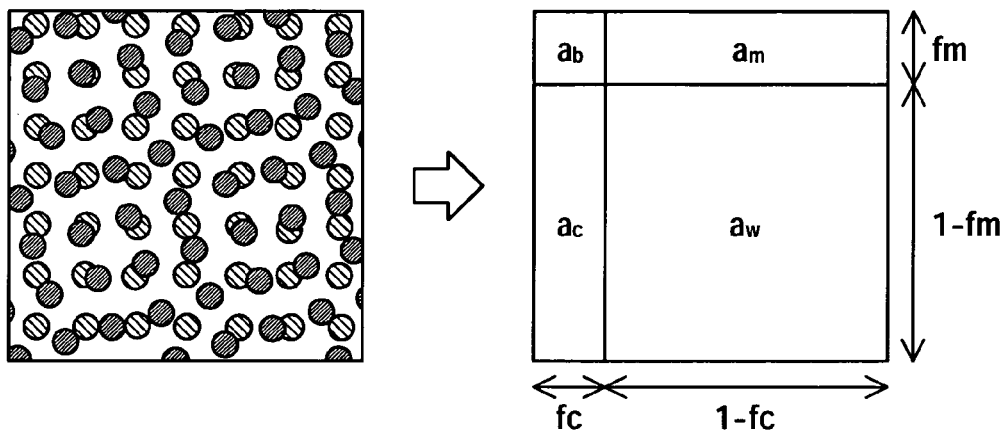
FIGS. 26(A) and 26(B) illustrate the spectral Neugebauer model.

FIG. 26 illustrates the spectral Neugebauer model. In the spectral Neugebauer model, spectral reflectance $R(\lambda)$ of any printout is given by Equation (14) below.

$$R(\lambda)=a_w R_w(\lambda)+a_c R_c(\lambda)+a_m R_m(\lambda)+a_y R_y(\lambda)+a_r R_r(\lambda)+a_g R_g(\lambda)+a_b R_b(\lambda)+a_k R_k(\lambda) \quad (14)$$

$$a_w=(1-f_c)(1-f_m)(1-f_y)$$

$$a_c=f_c(1-f_m)(1-f_y)$$

$$a_m=(1-f_c)f_m(1-f_y)$$

$$a_y=(1-f_c)(1-f_m)f_y$$

$$a_r=(1-f_c)f_m f_y$$

$$a_g=f_c(1-f_m)f_y$$

$$a_b=f_c f_m(1-f_y)$$

$$a_k=f_c f_m f_y$$

Here, $a_i$ is the planar area percentage of the i-th area, and $R_i(\lambda)$ is spectral reflectance of the i-th area. The subscript i denotes respectively an area of no ink (w), an area of cyan ink only (c), an area of magenta ink only (m), an area of yellow ink only (y), an area onto which magenta ink and yellow ink have been ejected (r), an area onto which yellow ink and cyan ink have been ejected (g), an area onto which cyan ink and magenta ink have been ejected (b), and an area onto which all three inks CMY have been ejected (k). fc, fm, and fy denote the percentage of area covered by ink (termed "ink area coverage") when only one of the CMY inks is ejected. Spectral reflectance $R_i(\lambda)$ can be acquired by measuring a color patch with a spectral reflectance meter.

Figure 26B:
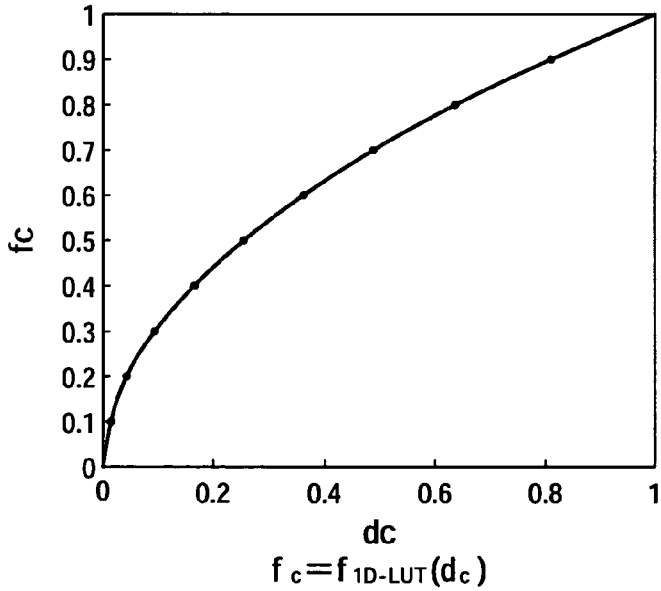

Ink area coverage fc, fm, fy is given by the Murray-Davies model shown in FIG. 26(B). In the Murray-Davies model, ink area coverage fc of cyan ink, for example, is a nonlinear function of the cyan ink ejection amount dc, and is given by a one-dimensional lookup table. The reason that ink area coverage is a nonlinear function of ink ejection amount is that when a small amount of ink is ejected onto a unit of planar area, there is ample ink spread, whereas when a large amount is ejected, the ink overlaps so that there is not much increase in the covered area.

Where the Yule-Nielsen model is applied in relation to spectral reflectance, Equation (14) above can be rewritten as Equation (15a) or Equation (15b) below.

$$R(\lambda)^{1/n}=a_w R_w(\lambda)^{1/n}+a_c R_c(\lambda)^{1/n}+a_m R_m(\lambda)^{1/n}+a_y R_y(\lambda)^{1/n}+a_r R_r(\lambda)^{1/n}+a_g R_g(\lambda)^{1/n}+a_b R_b(\lambda)^{1/n}+a_k R_k(\lambda)^{1/n} \quad (15a)$$

$$R(\lambda)=(a_w R_w(\lambda)^{1/n}+a_c R_c(\lambda)^{1/n}+a_m R_m(\lambda)^{1/n}+a_y R_y(\lambda)^{1/n}+a_r R_r(\lambda)^{1/n}+a_g R_g(\lambda)^{1/n}+a_b R_b(\lambda)^{1/n}+a_k R_k(\lambda)^{1/n})^n \quad (15b)$$

Here, n is a predetermined coefficient equal to 1 or greater, e.g. n=10. Equation (15a) and Equation (15b) are equations representing the cellular Yule-Nielsen spectral Neugebauer model.

The cellular Yule-Nielsen spectral Neugebauer model is obtained by dividing the ink color space of the Yule-Nielsen spectral Neugebauer model described above into a plurality of cells.

Figure 27A:
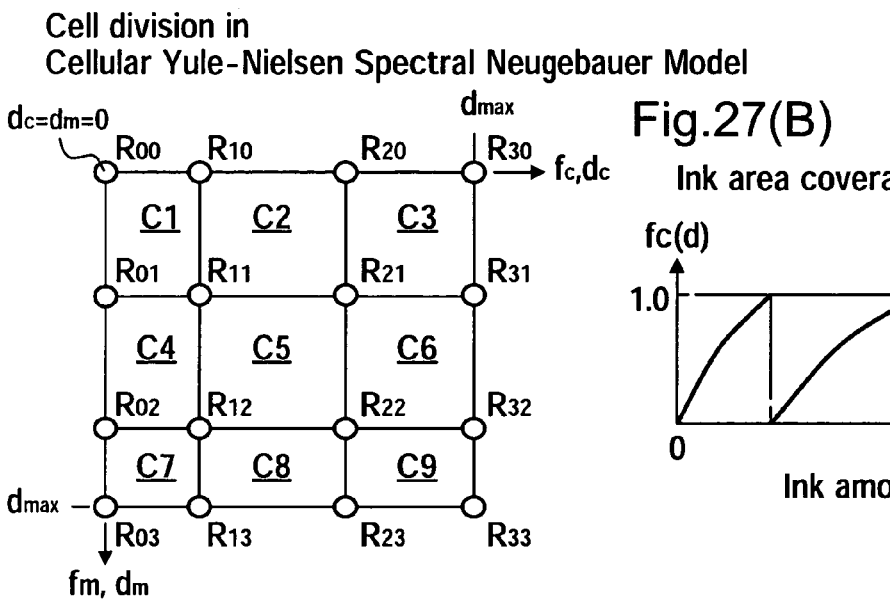
FIGS. 27(A)-27(C) illustrate the Cellular Yule-Nielsen Spectral Neugebauer model.

FIG. 27(A) shows an example of cell division in the cellular Yule-Nielsen spectral Neugebauer model. Here, for simplicity, cell division is portrayed in a two-dimensional space including two axes, namely, for cyan ink area coverage fc and magenta ink area coverage fm. These axes fc, fm may also be thought of as axes representing ink ejection amounts dc, dm. The white circles denote grid points (termed "nodes"); the two-dimensional space is divided into nine cells $C_1$-$C_9$. Spectral reflectance R00, R10, R20, R30, R01, R11 . . . R33 is predetermined for the printout (color patch) at each of the 16 nodes.

Figure 27B:
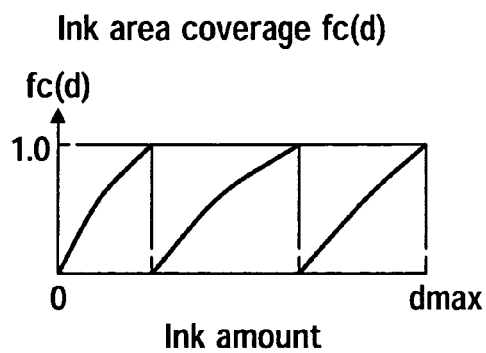

FIG. 27(B) shows ink area coverage fc(d) corresponding to this cell division. Here, the ink amount range for a single ink 0-dmax is divided into three intervals; ink area coverage fc(d) is represented by a curve that increases monotonically from 0 to 1 in each interval.

Figure 27C:
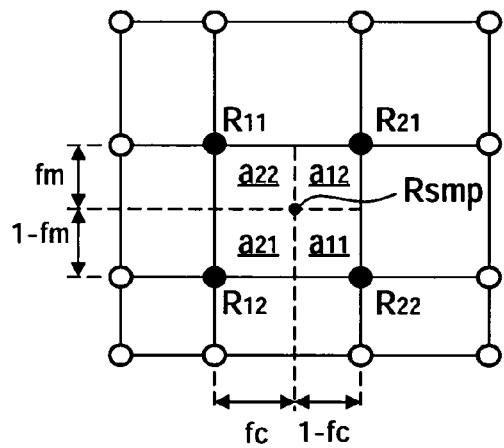

FIG. 27(C) shows calculation of spectral reflectance Rsmp ($\lambda$) for the sample in cell C5 located at center in FIG. 27(A).

Spectral reflectance Rsmp(λ) is given by Equation (16) below.

$$R_{smp}(\lambda) = (\Sigma a_i R_i(\lambda)^{1/n})^n = (a_{11} R_{11}(\lambda)^{1/n} + a_{12} R_{12}(\lambda)^{1/n} + a_{21} R_{21}(\lambda)^{1/n} + a_{22} R_{22}(\lambda)^{1/n})^n \quad (16)$$

$$a_{11} = (1-f_c)(1-f_m)$$

$$a_{12} = (1-f_c)f_m$$

$$a_{21} = f_c(1-f_m)$$

$$a_{22} = f_c f_m$$

Here, ink area coverage fc, fm are values given by the graph in FIG. 27(C) and defined within cell C5. Spectral reflectance R11(λ), R12(λ), R21(λ), R22(λ) at the four apices of cell C5 are adjusted according to Equation (16) so as to correctly give sample spectral reflectance Rsmp(λ).

By dividing the ink color space into a plurality of cells in this way, spectral reflectance Rsmp(λ) of a sample can be calculated more precisely as compared to the case where it is not so divided. FIG. 28 shows node values for cell division employed in one example. As shown in this example, node values for cell division are defined independently on an ink-by-ink basis.

Figure 29:
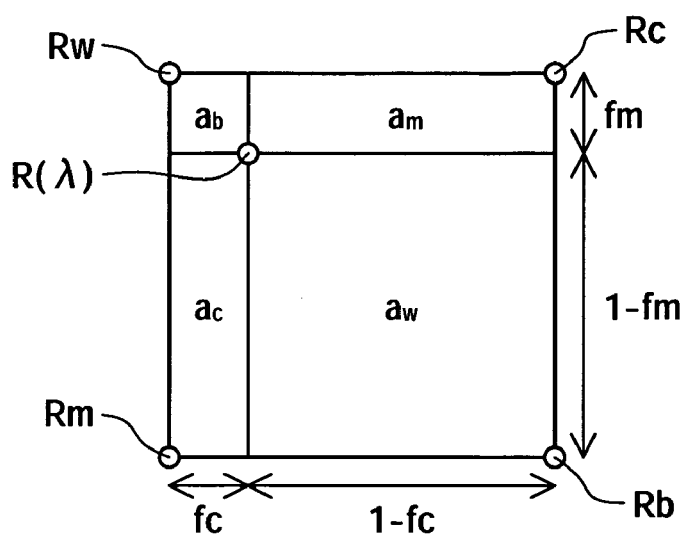
FIG. 29 shows a method of calculating non-measurable spectral reflectance in the Cellular Yule-Nielsen Spectral Neugebauer model.

In the model shown in FIG. 27(A), it is normal that spectral reflectance at all nodes cannot be derived through color patch measurement. The reason is that when a large amount of ink ejected, bleeding occurs so that it is not possible to print a color patch of uniform color. FIG. 29 shows a method of calculating spectral reflectance. This example pertains to a case where only two inks, namely, cyan and magenta, are used. Spectral reflectance R(λ) of any color patch printed with the two inks cyan and magenta is given by Equation (17) below.

$$R(\lambda)^{1/n} = a_w R_w(\lambda)^{1/n} + a_c R_c(\lambda)^{1/n} + a_m R_m(\lambda)^{1/n} + a_b R_b(\lambda)^{1/n} \quad (17)$$

$$a_w = (1-f_c)(1-f_m)$$

$$a_c = f_c(1-f_m)$$

$$a_m = (1-f_c)f_m$$

$$a_b = f_c f_m$$

Let it be assumed that, of the plural parameters included in Equation (17), the only unknown is spectral reflectance Rb(λ) with both cyan ink and magenta ink at 100% ejection amount; values for all other parameters are known. Here, modifying Equation (17) gives Equation (18).

$$R_b(\lambda) = \left\{ \frac{R(\lambda)^{1/n} - a_w R_w(\lambda)^{1/n} - a_c R_c(\lambda)^{1/n} - a_m R_m(\lambda)^{1/n}}{a_b} \right\}^n \quad (18)$$

As noted, all of the right-hand terms are known. Accordingly, by solving Equation (18), it is possible to calculate the unknown spectral reflectance Rb(λ). Regarding estimation of the spectra of nonprintable colors, see R Balasubramanian, "Optimization of the spectral Neugebauer model for printer characterization", J. Electronic Imaging 8(2), 156-166 (1999), the disclosure of which is incorporated herein by reference for all purposes.

Spectral reflectance of second order colors other than cyan+magenta could be calculated in the same manner. Additionally, where a plurality of second order color spectral reflectance values are calculated, a plurality of third order color spectral reflectance values could be calculated in the same manner. By sequentially calculating spectral reflectance of higher order colors in this way, it is possible to calculate spectral reflectance at each node in a cellular ink color space.

The spectral printing converter 100 shown in FIG. 1 may be designed to have spectral reflectance at each node in a cellular ink color space like that in FIG. 27(A), and one-dimensional lookup tables indicating and ink area coverage values as shown in FIG. 27(C), these being used to calculate spectral reflectance Rsmp(λ) corresponding to any set of sample ink amount data.

Typically, the spectral reflectance of a printed color patch is dependent upon ink set and the printing medium. Accordingly, a spectral printing model converter 100 like that in FIG. 1 may be created for each combination of ink set and printing medium. Likewise, ink profiles 142 and printer lookup tables 180 may be created for each combination of ink set and printing medium.

G. VARIANT EXAMPLES

G1. Variant Example 1

In the embodiments described hereinabove, six inks, namely, CMYKOG, are used as the inks, but ink types are not limited to these, it being possible to use any plural number of inks. However, the use of inks having colors, such as orange ink, green ink, red ink, blue ink or any other spot color ink, that provides the advantage of a greater degree of freedom as to the shape of spectral reflectance that can be reproduced.

G2. Variant Example 2

In Embodiments 1 to 3, the color space of calorimetric values is divided into plural cells, and a representative sample which has the best evaluation index EI within a cell is selected, whereas in Embodiment 3, a representative sample is determined by optimizing a sample for each cell until evaluation index EI meets evaluation criteria. However, the method of selecting a plurality of representative samples for use in creating a color conversion profile is not limited to the above-described methods; generally, selection of a plurality of representative samples on the basis of an evaluation index EI is possible. For example, it would be possible to select a plurality of representative samples without dividing the color space of calorimetric values into plural cells. Specifically, a plurality of grid points (nodes) could be defined within the color space of colorimetric values, and samples meeting predetermined evaluation criteria in proximity to the nodes selected as representative samples for the nodes.

G3. Variant Example 3

When calculating the aforementioned GI, the shape produced when ink ejected from nozzles is recorded onto printing media was simulated by means of dot shape data; however, it would be possible to conduct the simulation while adding an ink ejection characteristic that reflects behavior of ink ejected from a nozzle on the carriage. For example, by providing as prepared data the distance by which ink ejected from a nozzle deviates from standard dot position, it becomes possible to fine tune dot formation position with reference to error in positions at which ink drops are recorded, and create recording status data.

Figure 30:
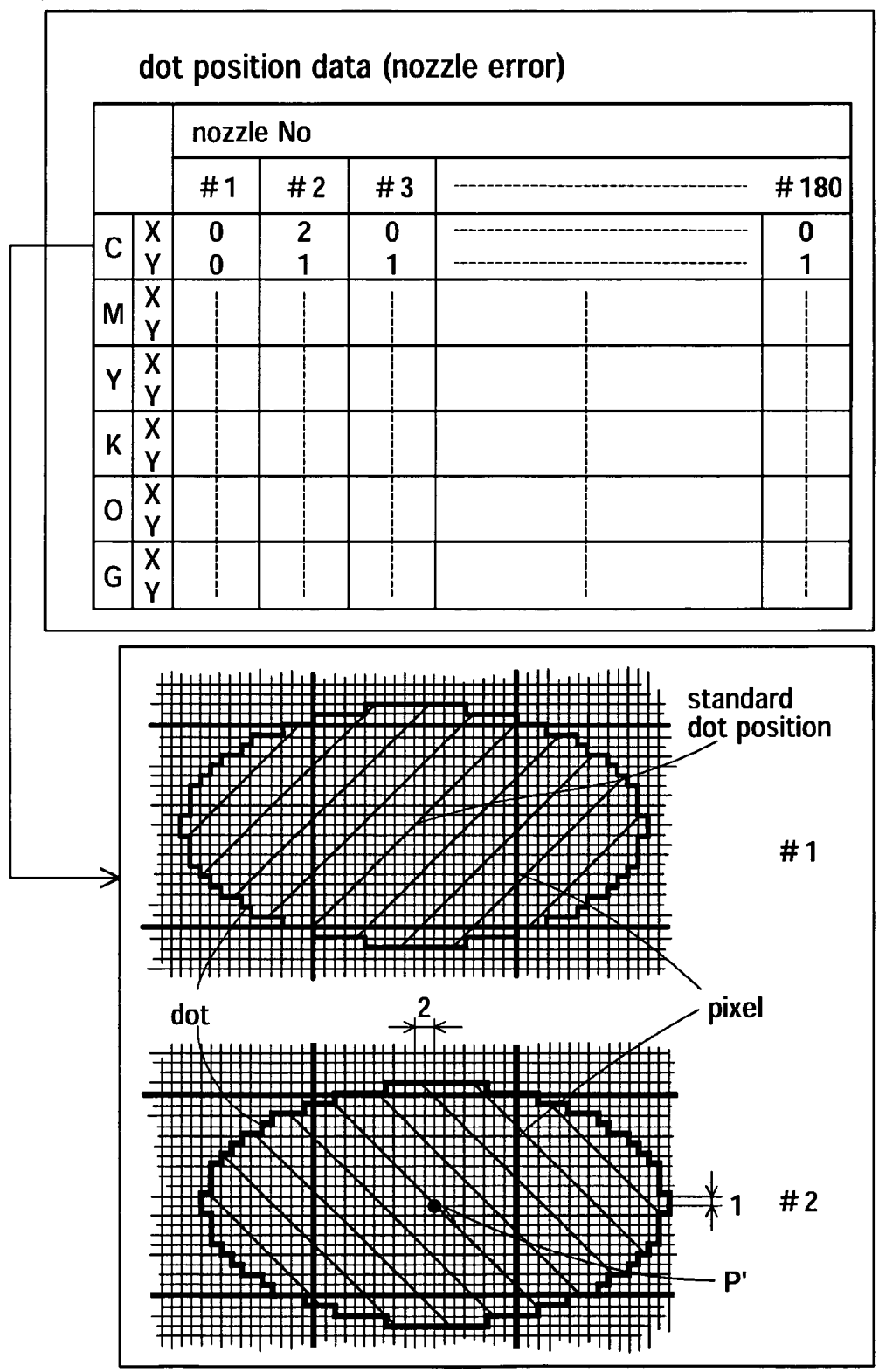
FIG. 30 is an illustration of an example of dot position data.

FIG. 30 is an illustration of an example of such data. The dot position data shown in FIG. 30 describes deviation from standard dot position in subpixel units, for each of a plurality of nozzles on the carriage.

That is, even where ink drops are ejected under the same conditions, errors in ink drop recording position will occur among the plurality of nozzles. Accordingly, ink is ejected from each nozzle of the printer, and the recording positions are measured, to create data indicating amount of deviation. At this time, the recording position of a certain nozzle is designated as the standard dot position, and the nozzle that forms the dot at this standard dot position is deemed to have main scanning direction deviation (λ) and sub-scanning direction deviation (Y) that are both "0". In the example shown in FIG. 30, the center of the aforementioned pixel is the standard dot position.

When deviation from standard dot position occurs, the amount of deviation, given in subpixels, in the main scanning direction and sub-scanning direction is described by way of dot position data. Since dot position data is described on a nozzle-by-nozzle basis, deviation is described on an ink color-by-color basis. The arrangement and process flow by which a simulation process would be carried out using such dot position data is substantially the same as in FIGS. 5 and 10; however, the process in Step S130 would be different.

Specifically, in Step S130, dot shape to be formed by each nozzle would be identified with reference to the aforementioned dot shape data, and dot position would be adjusted with reference to the aforementioned dot position data. Taking the example of the data shown in FIG. 30, since nozzle #1 has main scanning direction deviation (λ) and sub-scanning direction deviation (Y) that are both "0", ink ejected from nozzle #1 will form a dot at the standard dot position, as shown at bottom in FIG. 30.

Nozzle #2 has main scanning direction deviation (λ) of "2" and sub-scanning direction deviation (Y) of "1." Accordingly, a dot from nozzle #2 will be formed at position P, deviating in the main scanning direction by 2 subpixels from the standard dot position at the pixel center, and in the sub-scanning direction by 1 subpixel. By identifying dot recording status to include error among nozzles and calculating GI on the basis thereof, it becomes possible to include error among nozzles in evaluation of print quality.

G4: Variant Example 4

Figure 31:
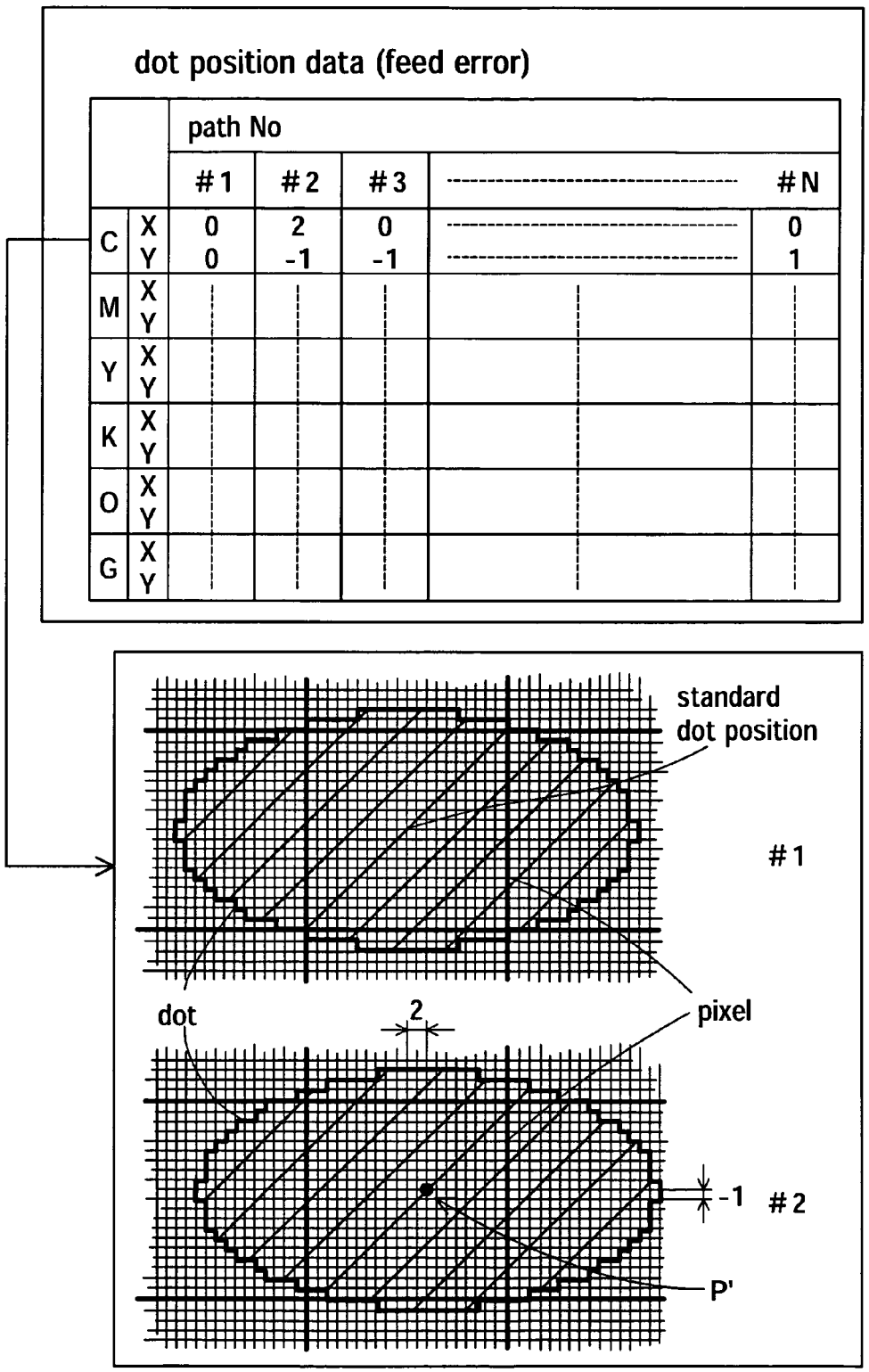
FIG. 31 is an illustration of an example of dot position data.

Ink ejection characteristics which may be taken into consideration in the present invention are not limited to error among nozzles as described above. It is possible, for example, to take into account other types of drive error such as carriage feed error. FIG. 31 illustrates an example of dot position data that takes feed error into consideration. The dot position data shown in FIG. 31 describes, in subpixel units, deviation from standard position in each main scan iteration (pass). That is, since the carriage records dots during repeated main scans and sub-scans, drive errors as the carriage is driven in the main scanning direction, or feed error by the paper feed rollers, can result in errors in dot recording position. Accordingly, ink is ejected from each nozzle in the printer, and recording positions are measured to arrive at data indicating amounts of deviation. Recording position during a certain pass is designated as a standard dot position, and the pass in which a dot is formed on this standard dot position is deemed to have main scanning direction deviation (X) and sub-scanning direction deviation (Y) that are both "0". In the example shown in FIG. 31, the center of the aforementioned pixel is deemed the standard dot position.

When deviation from standard dot position occurs, the amount of deviation, given in subpixels, in the main scanning direction and sub-scanning direction is described by way of dot position data. This dot position data describes deviation from standard dot position occurring in each pass, on an ink color-by-color basis. The upper limit for the number of passes (#N in FIG. 31) is not critical, but in practice will correspond to the largest size of printing media printable in the printer. For example, the upper limit for the number of passes may be set to the number required to print the entire surface of A4 size printing media.

Figure 5:
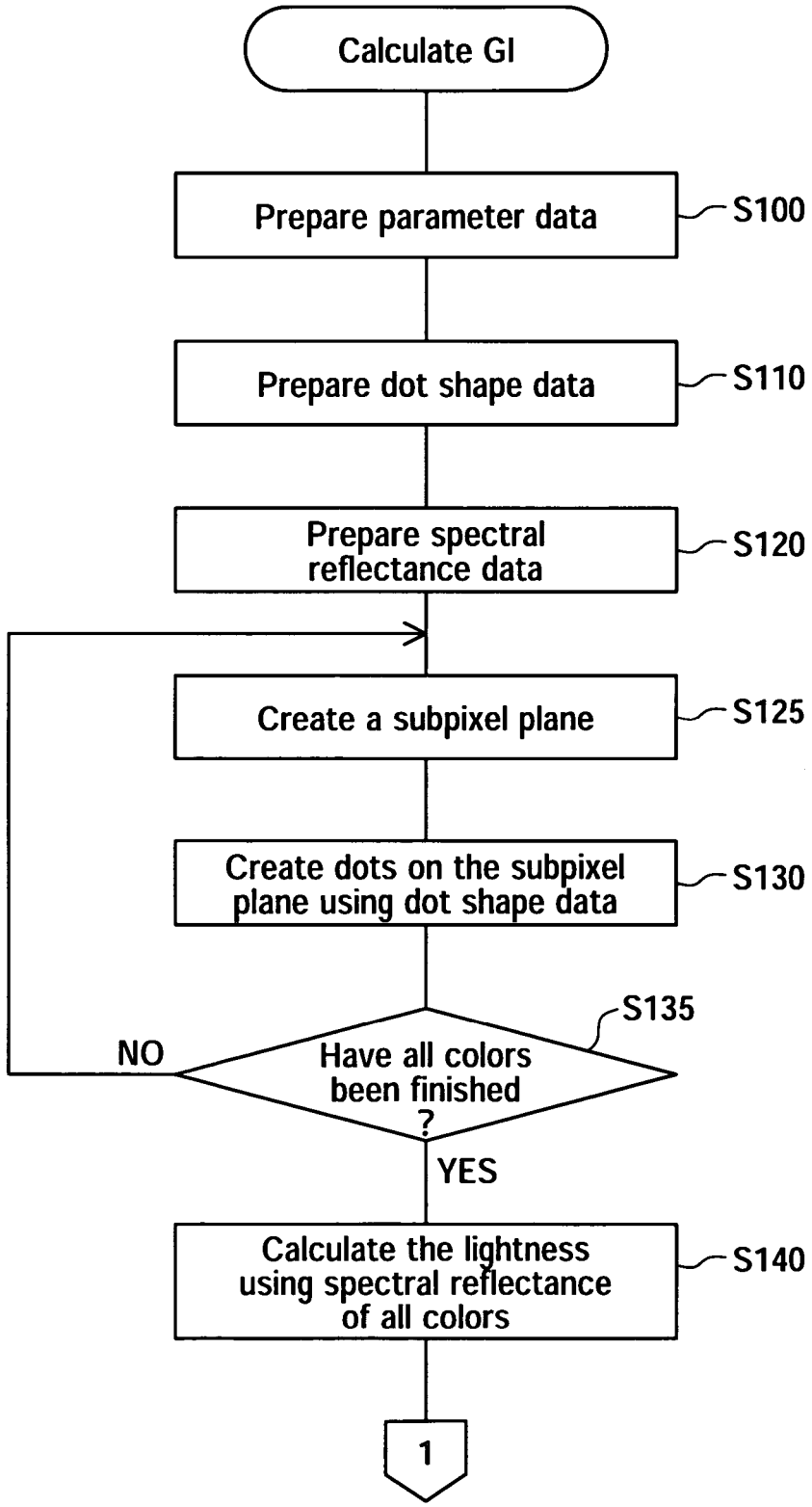
FIG. 5 is a flowchart illustrating a process for calculating GI.

The arrangement and process flow by which a simulation process would be carried out using such dot position data is substantially the same as in FIGS. 5 and 10; however, the process in Step S130 would be different. In Step S130, dot shape to be formed by each nozzle would be identified with reference to the aforementioned dot shape data, and dot position would be adjusted with reference to the aforementioned dot position data. Taking the example of the data shown in FIG. 31, since in pass #1 main scanning direction deviation (X) and sub-scanning direction deviation (Y) are both "0", ink ejected during pass #1 will form a dot at the standard dot position, as shown at bottom in FIG. 31.

In pass #2, main scanning direction deviation (X) is "2" and sub-scanning direction deviation (Y) is "−1." Accordingly, a dot in pass #2 is formed at position P', deviating in the main scanning direction by 2 subpixels from the standard dot position at the pixel center, and in the reverse of the sub-scanning direction by 1 subpixel. By identifying dot recording status to include error among passes and calculating GI on the basis thereof, it becomes possible to include error among passes in evaluation of print quality.

It is possible that both error among nozzles and feed error occur at the same time. It is accordingly possible to provide an arrangement in which both the dot position data in FIG. 30 and that in FIG. 31 are created in advance, and both sets of dot position data are included with standard dot position in Step S130, to adjust dot position. In the examples shown in FIGS. 30 and 31, since deviation is expressed in subpixel units, it is necessary to correspond with the number of divisions for division into subpixels and with resolution, etc., and if there is a change in any of these parameters, to refer to dot data corresponding to the changed parameter. Of course, this arrangement is merely exemplary; an arrangement wherein the amount of deviation measured in the above manner is instead be described in units of length, and amount of deviation in subpixel units is calculated depending on resolution or number of pixel divisions.

G5. Variant Example 5

In the embodiments described hereinabove, the printer is assumed to drive the carriage and paper feed rollers by a specific main scanning and sub-scanning control method; however, the invention is applicable in printers that drive the carriage and paper feed rollers according to any of various control methods. That is, where control method differs, for a given pixel in halftone data, the nozzle and pass forming a dot on the pixel will differ as well. Accordingly, an arrangement wherein nozzles can be designated on the basis of control method is employed.

Figure 32:
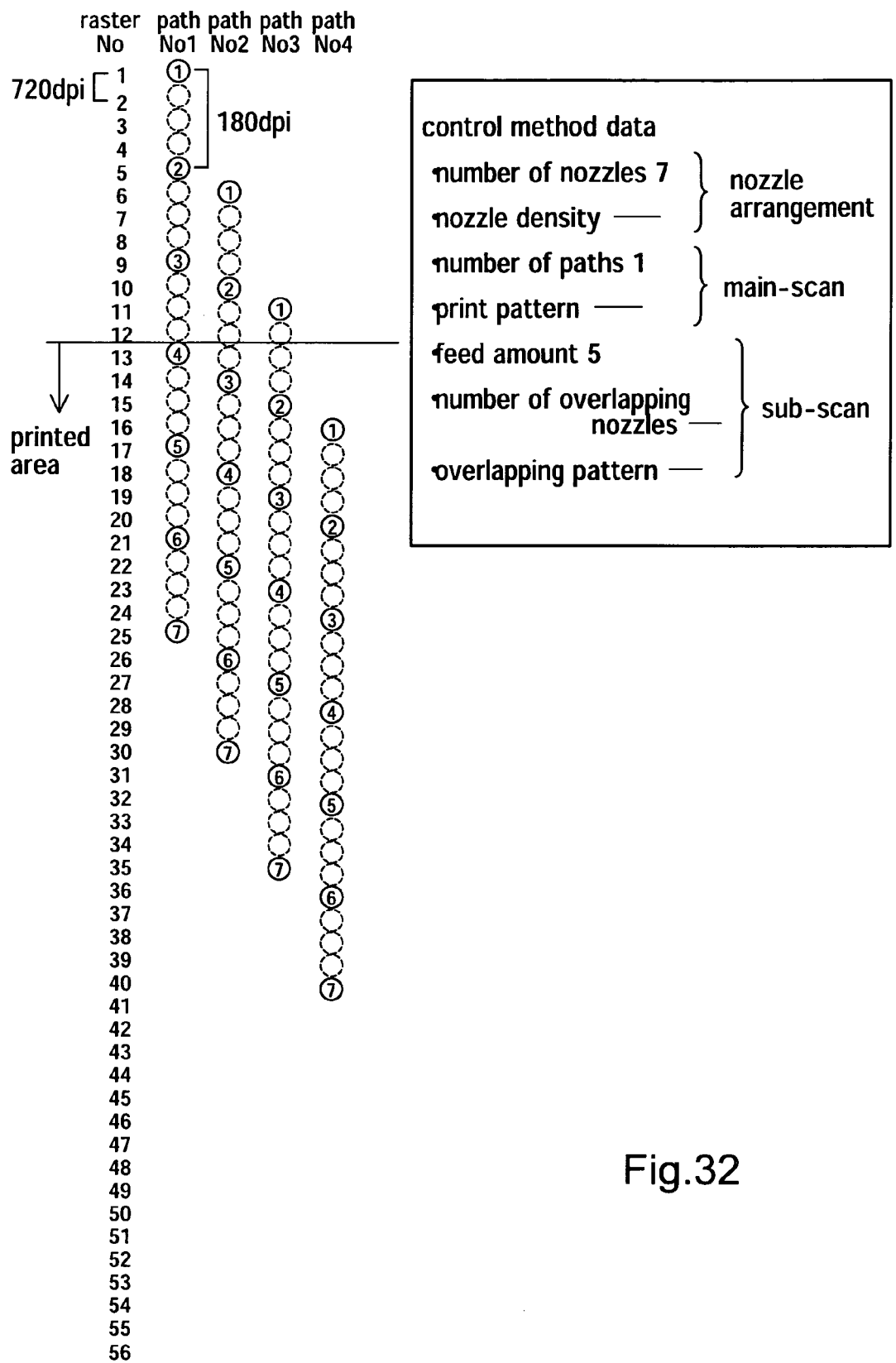
FIG. 32 is an illustration of an example of control method data.

FIG. 32 illustrates an example of control method data indicating a main scanning and sub-scanning control method and the arrangement of a plurality of nozzles formed on the carriage. The control method data in the figure describes nozzle arrangement in terms of number of nozzles and nozzle density. Number of nozzles indicates the number of nozzles arrayed in the sub-scanning direction on the carriage; in FIG. 32, for simplicity, a nozzle number of 7 is used, but typically there would be a much larger number of nozzles, such as 180. Nozzle density indicates density of nozzles arrayed in the sub-scanning direction, expressed in dpi units. That is, density is given as the number of nozzles per inch in the sub-scanning direction. In the example shown in FIG. 32, no nozzle density is given, but if nozzle density were needed to identify nozzles, the data would be described here.

Number of passes and print pattern may also be described by way of main scanning control method. Number of passes indicates how may passes are required to produce one line (raster) in the main scanning direction; print pattern indicates which pass neighboring dots are recorded in, in the case where one raster is completed in the course of two or more passes. For example, defining "0" as the former pass and "1" as the latter pass, a print pattern of "01011010" makes it possible to specify the pass in which each dot is recorded. In the example in FIG. 32, pass number is "1", so no print pattern is described.

As the sub-scanning control method, it is possible to described feed amount, number of overlapping nozzles, and overlapping pattern. Feed amount is data indicating feed amount during sub-scanning, expressed in raster units. That is, since the length of one raster is ascertained from the aforementioned Y resolution (for example, 1/720 inch where Y resolution is 720 dpi), actual sub-scan feed distance per scan is ascertained by indicating feed amount in terms of number of rasters. Number of overlapping nozzles is data indicating the number of nozzles overlapping when controlled in such a way that a given pass is overlapped by plurality of nozzles at the upper edge and lower edge in the sub-scanning direction. Overlap pattern is data indicating in which position on either the upper edge or lower edge in a given raster a dot will be formed. In the example in FIG. 32, it is assumed that overlap control is not performed, so number of overlapping nozzles and overlapping pattern are not described.

At left in FIG. 32 is shown an example of control in accordance with the control method data given in the same figure. Here, rasters are single lines in the main scanning direction, with raster numbers assigned sequentially beginning at the top. That is, the sideways direction in the plane of a paper corresponds to the main scanning direction, and the vertical direction to the sub-scanning direction. Pass number indicates the number of passes; below each pass number positions of nozzles in the pass are shown by solid circles, assigned nozzle numbers of 1-7 in sequence from the top. In this example, is it assumed that sub-scanning direction resolution is 720 dpi and sub-scanning direction nozzle density is 180 dpi, so the distance between nozzles corresponds to four rasters.

In the control method data, since the feed amount is "5", advance by five raster lines takes place in pass #2. With repeated feed by this feed distance, beginning at raster #13, a nozzle recording a dot is present over the numbered raster. Accordingly, where control is performed according to control method data, no dots are recorded above raster #12, whereas dots are recorded below raster #13. Thus, in the uppermost raster in the aforementioned halftone data, a dot is formed by nozzle #4.

By utilizing control method data in the manner described above, it is possible to specify nozzles for forming dots on each raster; thus, in Step S130 mentioned earlier, nozzles are specified with reference to the aforementioned control method data, and dot shape with reference to the aforementioned dot shape data. As a result, it is possible to calculate GI readily for a control method, even where fairly complicated control is performed. Additionally, since by referring to the aforementioned control method data it is possible to determine pass number (i.e. to specify the number of main scan passes) as shown at left in FIG. 32, feed error can be taken into consideration by referring to the dot position data mentioned previously. Of course, error among nozzles can also be taken into consideration by referring to the dot position data mentioned previously.

While omitted in FIG. 32, where the number of passes is 2, data indicating print pattern can be used to specify nozzles; and when performing overlap control, data indicating the number of overlapping nozzles and overlapping pattern can be used to specify nozzles. Of course, where the carriage and paper feed rollers are driven by some other control method, other parameters can be described in the control method data, and dot and pass for forming each dot specified in the control method. Where other nozzle arrangements are employed, for example, a plurality of nozzles arrayed in the sub-scanning direction to form a nozzle array, with a plurality of this nozzle array arrayed in the main scanning direction and ejecting the same color of ink, the control data may describe data indicating the nozzle arrangement, with the dot and pass for forming each dot being specified by means of this data together with data indicating the control method.

G6. Variant Example 6

Figure 33:
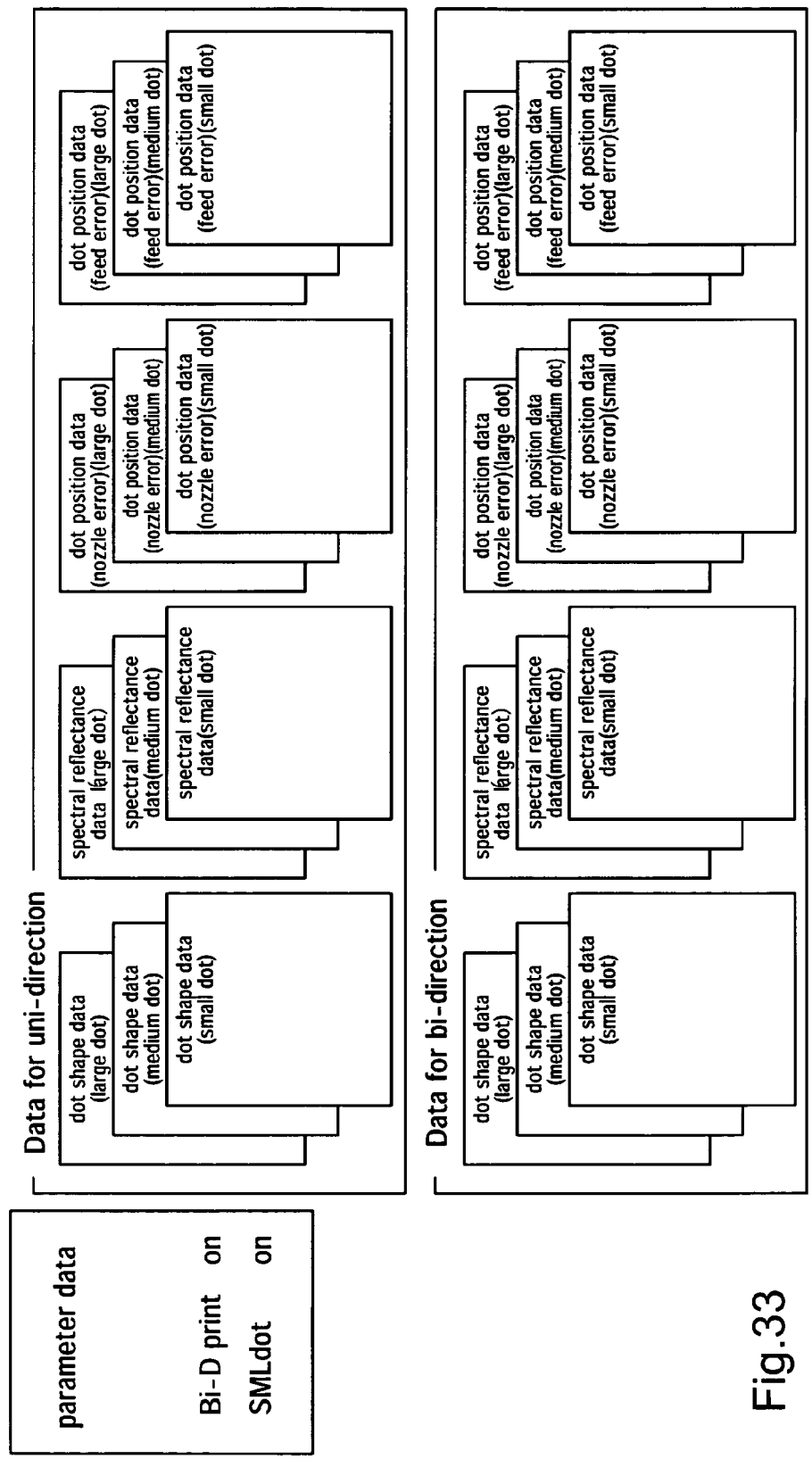
FIG. 33 is an illustration of an example of data in the case of bidirectional printing, using small, medium and large dots.

The invention is also applicable to printers capable of bi-directional (Bi-D) printing and printers that allow adjustment of one-time ink ejection quantity. FIG. 33 illustrates data prepared for use in such instances. Here, the aforementioned parameter data includes, in addition to the parameters described previously, data indicating whether bi-directional printing will be performed, and data indicating whether one-time ink ejection quantity will be adjusted. In this example, one-time ink ejection quantity is adjustable to three levels (small, medium, large).

In bi-directional printing, ink is ejected in both the forward and reverse passes in the main scanning direction, whereas in uni-directional printing ink is ejected during either the forward or reverse pass. Accordingly, the dot shape data, spectral reflectance data, and dot position data described previously will differ between bi-directional and uni-directional printing. Therefore, both data for bi-directional and data for uni-directional use are prepared in advance. With such an arrangement in place, the recording status data described above can be calculated for either bidirectional or uni-directional printing.

For ink drops of each of the three sizes small, medium, and large, recorded dot shape, spectral reflectance data, and dot position due to error will differ, and therefore the dot shape data, spectral reflectance data, and dot position data described previously are prepared in advance for each of the dot sizes of small, medium, and large. In this case, the halftone data will indicate, for each dot size of small, medium, and large, whether a dot will be recorded, and there will be three sets of halftone data for each ink color.

When creating the recording status data, by acquiring the halftone data and referring to the dot shape data, spectral reflectance data, and dot position data for each size of dot, it is possible to calculate recording status data in which dots of each ink color and size are overlapped. By then calculating GI based on recording status data so calculated, it becomes possible to evaluate graininess during bi-directional printing, or to evaluate graininess when using ink drops of the three sizes small, medium, and large. This method for adjusting ink ejection quantity is merely exemplary, and other arrangements could be employed, such as ink drops of different sizes can be ejected from different nozzles.

G7: Variant Example 7

The smoothing process described hereinabove is merely exemplary, and provided that a profile capable of color conversion with a high degree of accuracy can be produced through the smoothing process, various other arrangements may be adopted instead. With regard to the aforementioned SEI, a function that gives a larger value when the degree of smoothness of grid point positioning in the CIELAB space could be employed, or any of various other functions besides that described above could be used. For example, with regard to $SI_2$ and $SI_3$, with grid points assumed to form a cubic grid, only grid points with orthogonal vectors are derived as grid points neighboring the target for optimization, but this method of selection is not mandatory, it being possible, for example, for the SEI to include grid points situated at opposing corner positions where the grid points form a cubic grid, such as vector $L_{a5}$ and vector $L_{a6}$ in FIG. 17. Grid points situated at opposing corners are also situated at opposing corner positions in grid points formed by position information, and in particular the gray axis connecting KW of the cube produced by the position information described earlier corresponds to diagonal direction of the grid points. Accordingly, for grid points at opposing corner positions as well, improving the degree of smoothness of positioning can prevent the occurrence of sharp tone during monochrome output.

G8: Variant Example 8

In the embodiments hereinabove, the sum of vectors facing in mutually opposite directions is taken in order to have the value of SEI decrease with a higher degree of smoothness in grid point positioning, but some other arrangement could be employed instead. For example, a function for evaluating whether relative positional relationships among grid points are similar could be used. Specifically, in FIG. 17, taking the difference between vector $L_{a5}$-vector $L_{a4}$ and vector $L_{a1}$-vector $L_p$ gives a differential vector for the two vectors, i.e. (vector $L_{a5}$-vector $L_{a4}$)-(vector $L_{a1}$-vector $L_p$), and it may be said that the smaller the value of the differential vector, the more similar are positional relationships among grid points. Accordingly, it would be possible to derive an SEI for evaluating the degree of smoothness in positioning, by means of summing differences between vector$_{a1}$-vector$L_p$ and neighboring vectors among grids.

G9: Variant Example 9

In calculating the SEI described hereinabove, differences are taken among vectors facing in mutually opposite directions centered on an optimization-targeted grid point, and the differences added together. That is, a state of uniform distribution of all grid points in the CIELAB space is considered ideal. However, where grid points formed by colorimetric values described in ink profile 142 are inherently nonuniform, or where it is deliberately intended to produce nonuniform grid point spacing in the CIELAB space, the SEI may be modified accordingly. As an example suitable when it is desired to make grid points nonuniform, a treatment in which the SEI is provided with weighting factors, as in Equation (19), may be employed.

$$SI_1 = |W_1(\vec{L_{a1}} - \vec{L_p}) + W_2(\vec{L_{a2}} - \vec{L_p})| \tag{19}$$

Here, $W_1$ and $W_2$ are weighting factors.

If, in Equation (19), $W_1 > W_2$, it becomes possible to make the value of $SI_1$ smaller where the magnitude of differential vector $L_{a1}$-vector $L_p$ is smaller than that of vector $L_{a2}$-vector $L_p$, and to have an optimized state in which the optimization-targeted grid point is closer to one of the grid points. Weighting factors may take various forms; where non-uniform spacing of grid point positioning is desired, factors may be determined using Equation (20), for example.

$$\begin{cases} W_1 = \dfrac{D_2}{D_1 + D_2} \\ W_2 = \dfrac{D_1}{D_1 + D_2} \end{cases} \tag{20}$$

Here, $D_1$ and $D_2$ are distances between grid points specified by position information in the space formed by the position information. That is, $D_1$ denotes distance from the grid point in position information that gives vector $L_{ai}$ to the grid point in position information that gives vector $L_p$, and $D_2$ denotes distance from the grid point in position information that gives vector $L_{a2}$ to the grid point in position information that gives vector $L_p$. Of course, Equation (20) is merely exemplary; by designing other SEIs having other weights, it is possible to control grid point spacing in the CIELAB space, or to increase localized density of grid points in the CIELAB space according to a specific intention. Additionally, by weighting in the same manner as with $SI_2$ and $SI_3$ above, it is possible to readily control grid point spacing.

Arrangements wherein grid point spacing in the CIELAB space is controlled through design of weighted SEI are particularly useful where grid point spacing is to be made non-uniform depending on ink characteristics, i.e., where grid points are increased in number at low ink recording rates in consideration of the ink characteristic whereby the extent of change in density declines at higher ink recording rates. An arrangement wherein localized grid point density in the CIELAB space is increased through design of weighted SEI is particularly useful where localized high accuracy of color conversion is desired.

G10. Variant Example 10

In the embodiments hereinabove, individual neighboring grid points are derived region-by-region in the gamut of the CIELAB space to effect smoothing of positioning of optimization-targeted grid points, and thus there is no connection among grid points optimized by means of $SI_1$-$SI_3$ respectively. However it would also be acceptable, while optimizing grid points with individual SEIs on a region-by-region basis, to perform weighting calculations such that the degree of smoothness in positioning is high even at the boundaries of each region.

With $SI_1$ and $SI_2$ described hereinabove, one or two components of position information (Pr, Pg, Pb) are held constant; however, with $SI_3$ all three components of position information (Pr, Pg, Pb) are allowed to vary, and thus binding conditions differ sharply in proximity to gamut boundaries. Even among gamut boundaries, binding conditions differ markedly between edgelines and exterior surfaces constituting gamut boundaries. If binding conditions vary sharply, the degree freedom when moving grid points in order to effect smoothing of grid point positioning and the degree of freedom as regards the direction of motion will differ completely, posing the risk of discontinuity in the degree of smoothness of grid point positioning. In order to prevent sharp variations in binding conditions, there is added to the SEI a term that has been weighted in such a way that position information becomes more resistant to variation in closer proximity to gamut boundaries. An SEI like that given by Equation (21) may be employed for such an arrangement.

$$SI_1|W_1(\vec{L_{a1}}-\vec{L_p})+W_2(\vec{L_{a2}}-\vec{L_p})|+W_r(Pr_0-Pr)^2 \quad (21)$$

Here, $W_r$ is a weight used when position information Pr is variable; $Pr_0$ is current position information. Similarly, $W_g$ and $W_b$ can be defined as weights used respectively when position information $P_g$ or $P_g$ is variable. Each weight has a small value in proximity to the center of the gamut, increasing in value in proximity to gamut boundaries. In Equation (21), the position information takes into consideration the area around gamut boundaries in the case that only Pr is variable; by means of the second term of Equation (21), position information Pr is made more resistant to change the closer a grid point is to a gamut boundary (in this case, the edge of an edgeline formed on a gamut boundary).

That is, in the aforementioned second term, the value of weighting factor $W_r$ increases as a gamut boundary is approached; and the second term becomes greater as position information Pr becomes further away from current position $Pr_0$. Thus, in an optimization process that minimizes $SI_1$, the closer together the values of position information Pr, $Pr_0$ are, and the closer to gamut boundaries, the closer together the values of the two items position information become. Under this same concept, a second term can also be appended to $SI_1$ where only position information Pg is allowed to vary, or only position information Pb is allowed to vary. Of course, the concept is analogous for $SI_2$ and $SI_3$: for $SI_2$, since two components of position information are variable, two terms are appended to SEI; and for $SI_3$, since three components of position information are variable, three terms are appended to SEI.

G11. Variant Example 11

In the smoothing process described above, the degree of smoothness of grid point positioning in the CIELAB space is verified using colorimetric values described in ink profile 142, but smoothing may be carried out in a different color space instead. For example, by positing positions of grid points corresponding to ink amount data points in an ink amount space, and calculating an evaluation index for evaluating smoothness of grid point positions, smoothing may be effected in an ink amount space.

G12. Variant Example 12

Additionally, in the smoothing process described above, smoothing is performed using $16^3$ or fewer representative samples selected in Step S35; however, using these representative samples, the number of representative samples could be increased or decreased, or grid point positions of the representative samples could be adjusted for the smoothing process. For example, through non-uniform interpolation on the basis of representative samples, there are calculated about $64^3$ grid points in the CIELAB space and ink amounts corresponding to these, which are used for smoothing. In this case, degree of smoothness of positioning is evaluated for grid points that are closer together than is the case where smoothing is performed with $16^3$ samples, making it easy to improve the degree of smoothness. An arrangement wherein, through non-uniform interpolation on the basis of representative samples, grid points positioned as uniformly as possible in the CIELAB space are derived for smoothing is also possible. Here, since there is minimal distortion in initial grid point positioning, it becomes difficult to reach local minimum in the calculation process, thus facilitating the smoothing process. Also, position information Pr, Pg, Pb and Lab values can be associated more simply.

G13. Variant Example 13

In Embodiment 4, Tink is employed as an evaluation index for appending CDI and IQI; however, an evaluation index for evaluating gamut size, such as that given by Equation (22), could also be appended.

$$EI_1=k_1 \cdot CII+k_2 \cdot GI-k_3 \cdot C^*I \quad (22)$$

Here, $k_1$-$k_3$ are coefficients for adjusting the extent of contribution of CII, GI and $C^*I$ to the evaluation index. $C^*I$ denotes chroma saturation $((a^{*2}+b^{*2})^{1/2})$ calculated from colorimetric values corresponding to each ink amount. That is, in evaluation index $EI_1$, since coefficient $k_3$ in the third term has a minus sign, higher chroma contributes to a smaller value of evaluation index $EI_1$. Accordingly, by selecting samples that minimize the value of Equation (22), it becomes possible to select samples having high chroma saturation (i.e. large gamut). Of course, the third term in Equation (22) could be appended in Embodiment 5 as well.

G14. Variant Example 14

Figure 34:
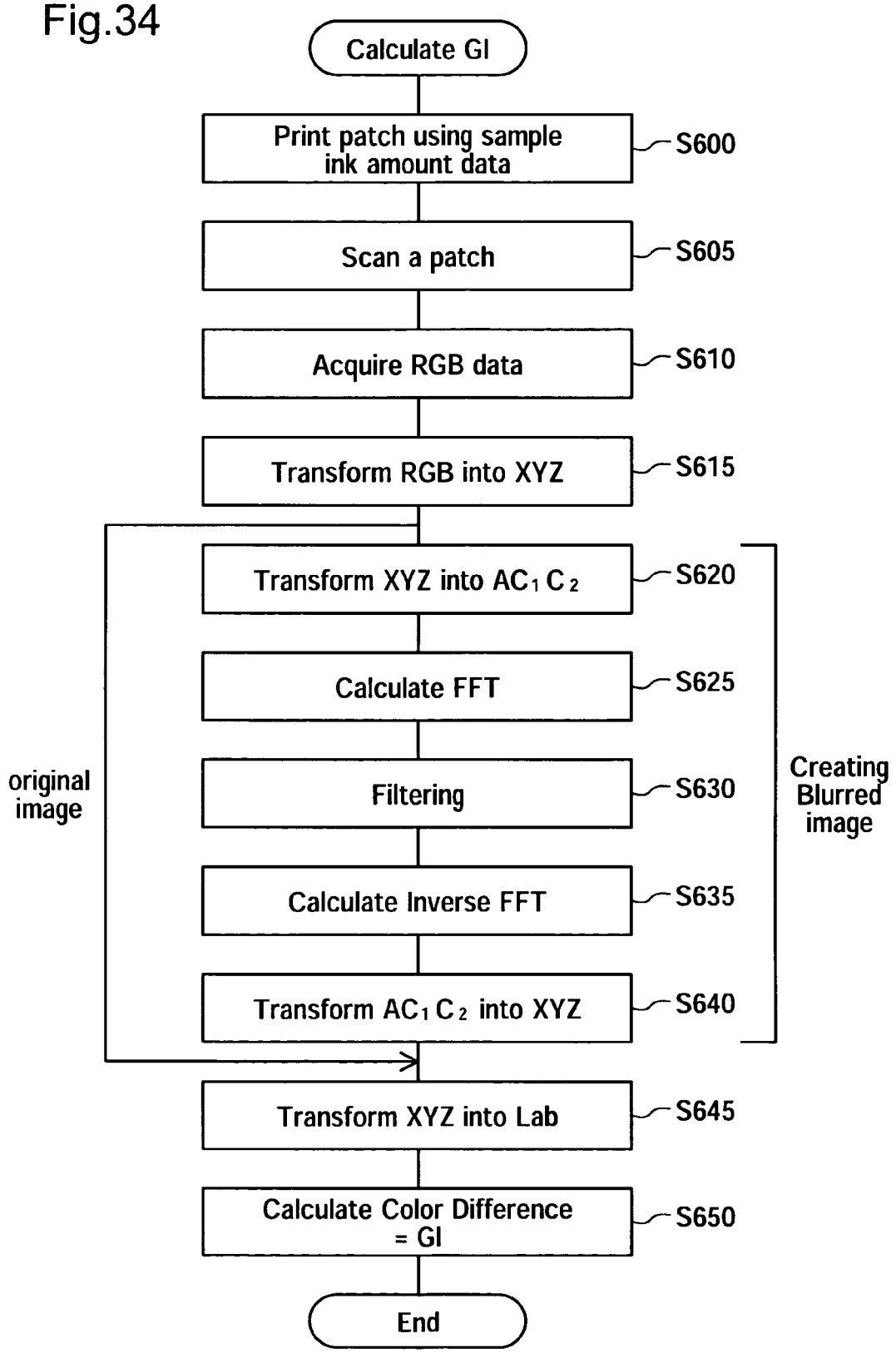
FIG. 34 is a flow chart of a processing routine for calculating GI in a variant example of the invention.

In the embodiments hereinabove, GI is calculated by grouping a plurality of pixels of color indicated ink amount data to produce a virtual sample patch of predetermined area for use in simulation; but instead, the virtual patch could be actually printed out, and subjected to colorimetric measurement to calculate GI. While such an arrangement may be realized by arrangements substantially identical to those in the embodiments hereinabove, the process in the image quality evaluation index calculator will differ from that in the embodiments hereinabove. FIG. 34 is a flowchart illustrating a process for actually printing out a virtual sample patch, performing colorimetric measurement, and calculating GI. In this process, the virtual sample patch is printed, and the printed result subjected to colorimetric measurement to calculate the difference between a blurred image of the patch and the original image, designating this difference as the GI. This embodiment of the GI is based on the image color appearance model, iCAM, as described by M. D. Fairchild and G. M. Johnson, "Meet iCAM: and Image Color Appearance Model," IS&T/SID 10th Color Imaging Conference, Scottsdale, (2002), and G. M. Johnson and M. D. Fairchild, "Rendering HDR Images," IS*T/SID 11th Color Imaging Conference, Scottsdale, (2003), the disclosures of which are incorporated herein by reference for all purposes.

In Step S600, a virtual sample patch is created using the aforementioned sample ink amount data, and this virtual sample patch is then printed out. In Step S605, the printed sample patch is scanned. Here, it is sufficient to acquire colorimetric values in a device-independent color space using the scanned results; for this purpose, a commercially available scanner or calorimeter, or various other devices may be used. Since the sample patch will be evaluated for graininess, it will preferably be scanned at higher resolution than the sample patch print resolution.

FIG. 34 shows an example using an RGB scanner. Specifically, scan results are acquired in Step S605, and RGB data for the printed sample patch in Step S610. Since this RGB data belongs to a device-dependent color space, in Step S615, scanner characterization is performed to convert the data into the device-independent XYZ color space.

In Steps S620-S640, a blurred image is created. For this purpose, in Step S620, the XYZ color space is converted to the opponent colors space. That is, as is it possible to define, for each channel in the opponent colors space, an experimentally-derived, contrast sensitivity function (csf) of the human eye in terms of a frequency space, conversion is performed so that this csf can be utilized.

The conversion may be calculated by means of Equation (23), for example.

$$\begin{bmatrix} A \\ C_1 \\ C_2 \end{bmatrix} = \begin{bmatrix} 0.297 & 0.72 & -0.107 \\ -0.449 & 0.29 & -0.077 \\ 0.086 & -0.59 & 0.501 \end{bmatrix} \cdot \begin{bmatrix} X \\ Y \\ Z \end{bmatrix} \quad (23)$$

Here, $A$, $C_1$, $C_2$ are opponent channels, A being a luminance channel, and $C_1$, $C_2$ being chrominance channels.

Since the csf is defined in terms of a frequency space, in Step S625, each opponent channel is subjected to a Fourier transform. In Step S630, filtering is performed on each opponent channel, using the csf That is, the csf is multiplied by each component. In one example, the following Equation (24) is used on the luminance channel, and the following Equation (25) on the chrominance channels.

$$csf_{lum}^{\mathcal{F}} = af^c e^{-bf} \quad (24)$$

$$csf_{chrom}^{\mathcal{F}} = a_1 e^{-b_1 f^{c_1}} + a_2^c e^{-b_2 f^{c_2}} \quad (25)$$

Here, f is frequency, $csf_{lum}$ is a luminance contrast sensitivity function, and $csf_{chrom}$ is a chrominance contrast sensitivity function. a, b and c can be calculated empirically. While various values could be used as coefficients in Equation (25), in the example, the following values are used.

| Parameter | Red-Green | Blue-Yellow |
|---|---|---|
| a1 | 109.1413 | 7.0328 |
| b1 | −0.0004 | 0.0000 |
| c1 | 3.4244 | 4.2582 |
| a2 | 93.5971 | 40.6910 |
| b2 | −0.0037 | −0.1039 |
| c2 | 2.1677 | 1.6487 |

Once filtering has been carried out in the preceding manner, in Step S615, the post-filtering coefficients are subjected to inverse Fourier transform, and in Step S640 the opponent colors space is further converted back to the XYZ color space. This conversion may be calculated using Equation (26), for example.

$$\begin{bmatrix} X \\ Y \\ Z \end{bmatrix} = \begin{bmatrix} 0.979 & 1.189 & 1.232 \\ -1.535 & 0.764 & 1.163 \\ 0.445 & 0.135 & 2.079 \end{bmatrix} \cdot \begin{bmatrix} A \\ C_1 \\ C_2 \end{bmatrix} \quad (26)$$

By means of the above process, XZY values for a blurred image are calculated, and in the aforementioned Step S615 and XZY values of the original image have been calculated; now, in Step S645 CIELAB values for each image are calculated. Then, in Step S650, an average CIELAB value for the original image is calculated, and the color difference between the blurred image and the original image is calculated by means of the CIEDE2000 Color Difference Equation.

Once the image quality evaluation index calculator has calculated GI in the manner described above, a printer lookup table 180 is created by means of a similar process to that in the embodiments hereinabove. By performing actual printing using sample ink amount data in this way, it becomes possible to evaluate image quality and select ink amount data on the basis of an actual printout.

GI may also be calculated using the color difference calculated in Step S650. For example, GI may be determined in light of the fact that graininess is highly dependent on area coverage distribution on printing media. As a example in such as case, a six-dimensional ink amount space is divided by area coverage into about four cells, and the average color difference mentioned previously is calculated for all ink amount data in a cell. This average color difference may then be designated as the GI for all ink amount data in the cell.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of producing a profile defining correspondence between colorimetric value data and ink amount data representing a set of ink amounts of plural inks usable by a printer, comprising:
   (a) providing a spectral printing model converter configured to convert ink amount data to spectral reflectance of a color patch to be printed according to the ink amount data;
   (b) providing a plurality of sample ink amount data each representing a set of ink amounts of plural inks;
   (c) converting each sample ink amount data into spectral reflectance of a virtual sample patch to be printed with the ink amounts represented by the sample ink amount data using the spectral printing model converter;
   (d) calculating an evaluation index for each sample ink amount data, the evaluation index including a color difference index and an image quality index of the virtual sample patch to be printed according to the sample ink amount data, the color difference index representing a color difference between a sample color which is calculated from the spectral reflectance and a comparative color which is selected as a basis for comparison, the image quality index including an index indicating graininess of the virtual sample color patch to be printed according to the sample ink amount data;
   (e) selecting plural sample ink amount data based on the evaluation index; and
   (f) producing a profile defining correspondence between colorimetric value data and ink amount data based on the selected plural sample ink amount data.

2. A method according to claim 1, wherein the step (d) further comprises:
   simulating ink dot forming states on the virtual sample color patch to be printed according to the sample ink amount data; and
   calculating the graininess index using the simulation result.

3. A method according to claim 2, wherein the ink dot forming states are represented by detailed shapes and positions of plural ink dots.

4. A method according to claim 2, wherein the simulating further comprises:
  obtaining ink ejection characteristics for a plurality of ink ejection nozzles of a printer; and
  calculating the ink dot forming states using the ink ejection characteristics.

5. A method according to claim 4, wherein the ink ejection characteristics include a deviation of dot formation position due to a mechanical error of the printer.

6. A method according to claim 4, wherein ink drops of different sizes are ejected from the nozzles; and
  the ink ejection characteristics are defined for each ink sizes.

7. A method according to claim 2, wherein the step of simulating further comprises:
  performing halftone processing on a uniform image area that is assigned with identical sample ink amount data, thereby producing halftone data for the uniform image area; and
  calculating the ink dot forming states over the uniform image area using the halftone data.

8. A method according to claim 2, wherein the calculating the graininess index further comprises:
  calculating a lightness value distribution of the dot forming states;
  calculating spatial frequencies of the lightness value distribution; and
  calculating the graininess index from the spatial frequencies.

9. A method according to claim 1, wherein the image quality index includes an index representing a total ink amount per unit area.

10. A method according to claim 1, wherein the image quality index includes a medium dependent index that is selected from a plurality of medium dependent indices according to a printing medium to be used.

11. A method according to claim 1, wherein the image quality index includes an index for evaluating a gamut size, the gamut being formed by the virtual sample patch.

12. A method of producing a profile defining correspondence between colorimetric value data and ink amount data representing a set of ink amounts of plural inks usable by a printer, comprising:
  (a) providing a spectral printing model converter configured to convert ink amount data to spectral reflectance of a color patch to be printed according to the ink amount data;
  (b) providing a plurality of sample ink amount data each representing a set of ink amounts of plural inks;
  (c) converting each sample ink amount data into spectral reflectance of a virtual sample patch to be printed with the ink amounts represented by the sample ink amount data using the spectral printing model converter;
  (d) calculating an evaluation index for each sample ink amount data, the evaluation index including a color difference index and an image quality index of the virtual sample patch to be printed according to the sample ink amount data, the color difference index representing a color difference between a sample color which is calculated from the spectral reflectance and a comparative color which is selected as a basis for comparison;
  (e) selecting plural sample ink amount data based on the evaluation index; and
  (f) producing a profile defining correspondence between colorimetric value data and ink amount data based on the selected plural sample ink amount data, wherein the step (f) further includes
  defining a smoothness evaluation index representing smoothness of distribution of points in a specific color space, the smoothness evaluation index being a function of coordinates of a point;
  calculating a value of the smoothness evaluation index for the point in the specific color space corresponding to the selected sample ink amount data;
  judging whether the smoothness evaluation index value satisfies a predetermined criterion;
  when the smoothness evaluation index value does not satisfy the predetermined criterion, repeating (i) modifying the coordinates of the point in the specific color space, and (ii) calculating the smoothness evaluation index value for the point having the modified coordinates, until the smoothness evaluation index value satisfies the predetermined criterion;
  reselecting plural sample ink amount data corresponding to the modified coordinates of the point in the specific color space whose smoothness evaluation index value satisfies the predetermined criterion; and
  producing the profile defining correspondence between colorimetric value data and ink amount data based on the re-selected plural sample ink amount data.

13. A method according to claim 12, wherein the smoothness evaluation index has different functional formats at plural portions of the specific color space.

14. A method according to claim 12, wherein the smoothness evaluation index is a function of an absolute value of a combined vector of two vectors having substantially opposite directions that are oriented from a point of interest toward neighboring points.

15. A method according to claim 14, wherein
  when the point of interest is on an edge of a color gamut, the neighboring points are selected such that the neighboring points are located on the edge of the color gamut and on opposite sides across the point of interest.

16. A method according to claim 14, wherein
  when the point of interest is on an outer surface of a color gamut, the neighboring points are selected such that the neighboring points are located on the outer surface of the color gamut and on opposite sides across the point of interest.

17. A method according to claim 14, wherein
  when the point of interest is inside a color gamut, the neighboring points are selected such that the neighboring points are located inside the color gamut and on opposite sides across the point of interest.

18. A method of producing a profile defining correspondence between colorimetric value data and ink amount data representing a set of ink amounts of plural inks usable by a printer, comprising:
  (a) providing a spectral printing model converter configured to convert ink amount data to spectral reflectance of a color patch to be printed according to the ink amount data;
  (b) providing a plurality of sample ink amount data each representing a set of ink amounts of plural inks;
  (c) converting each sample ink amount data into spectral reflectance of a virtual sample patch to be printed with the ink amounts represented by the sample ink amount data using the spectral printing model converter;
  (d) calculating an evaluation index for each sample ink amount data, the evaluation index including a color difference index and an image quality index of the virtual sample patch to be printed according to the sample ink amount data, the color difference index representing a color difference between a sample color which is calculated from the spectral reflectance and a comparative color which is selected as a basis for comparison, the image quality index including a smoothness evaluation index representing smoothness of distribution of points in a specific color space, the point representing a color of the virtual sample patch;
- (e) selecting plural sample ink amount data based on the evaluation index; and
- (f) producing a profile defining correspondence between colorimetric value data and ink amount data based on the selected plural sample ink amount data.

19. A method of producing a profile defining correspondence between colorimetric value data and ink amount data representing a set of ink amounts of plural inks usable by a printer, comprising:
- (a) providing a spectral printing model converter configured to convert ink amount data to spectral reflectance of a color patch to be printed according to the ink amount data;
- (b) providing a plurality of sample ink amount data each representing a set of ink amounts of plural inks;
- (c) converting each sample ink amount data into spectral reflectance of a virtual sample patch to be printed with the ink amounts represented by the sample ink amount data using the spectral printing model converter;
- (d) calculating an evaluation index for each sample ink amount data, the evaluation index including a color difference index and an image quality index of the virtual sample patch to be printed according to the sample ink amount data, the color difference index representing a color difference between a sample color which is calculated from the spectral reflectance and a comparative color which is selected as a basis for comparison, the evaluation index being obtained by averaging the color difference index and the image quality index with respective weights;
- (e) selecting plural sample ink amount data based on the evaluation index; and
- (f) producing a profile defining correspondence between colorimetric value data and ink amount data based on the selected plural sample ink amount data.

20. An apparatus for producing a profile defining correspondence between colorimetric value data and ink amount data representing a set of ink amounts of plural inks usable by a printer, comprising:
- a spectral printing model converter for converting ink amount data to spectral reflectance of a color patch to be printed according to the ink amount data, the spectral printing model converter converting each of a plurality of sample ink amount data into spectral reflectance of a virtual sample patch to be printed with the ink amounts represented by the sample ink amount data;
- an evaluation index generator for calculating an evaluation index for each sample ink amount data, the evaluation index including a color difference index and an image quality index of the virtual sample patch to be printed according to the sample ink amount data, the color difference index representing a color difference between a sample color which is calculated from the spectral reflectance and a comparative color which is selected as a basis for comparison, the image quality index including an index indicating graininess of the virtual sample color patch to be printed according to the sample ink amount data;
- a selector for selecting plural sample ink amount data based on the evaluation index; and
- a profile generator for producing a profile defining correspondence between colorimetric value data and ink amount data based on the selected plural sample ink amount data.

21. A system for producing a profile defining correspondence between colorimetric value data and ink amount data representing a set of ink amounts of plural inks usable by a printer, the system comprising:
- a spectral printing model converter configured to convert ink amount data to spectral reflectance of a color patch to be printed according to the ink amount data;
- a data source of a plurality of sample ink amount data each representing a set of ink amounts of plural inks;
- a conversion system that converts each sample ink amount data into spectral reflectance of a virtual sample patch to be printed with the ink amounts represented by the sample ink amount data using the spectral printing model converter;
- an index calculation system that calculates an evaluation index for each sample ink amount data, the evaluation index including a color difference index and an image quality index of the virtual sample patch to be printed according to the sample ink amount data, the color difference index representing a color difference between a sample color which is calculated from the spectral reflectance and a comparative color which is selected as a basis for comparison, the image quality index including an index indicating graininess of the virtual sample color patch to be printed according to the sample ink amount data;
- a selection system that selects plural sample ink amount data based on the evaluation index; and
- a production system that produces a profile defining correspondence between colorimetric value data and ink amount data based on the selected plural sample ink amount data.

22. A system according to claim 21, wherein the index calculation system further comprises:
- a simulation system that simulates ink dot forming states on the virtual sample color patch to be printed according to the sample ink amount data; and
- a graininess calculation system that calculates the graininess index using the simulation result.

23. A system according to claim 22, wherein the ink dot forming states are represented by detailed shapes and positions of plural ink dots.

24. A system according to claim 22, wherein the simulation system further comprises a processing system that performs halftone processing on a uniform image area that is assigned with identical sample ink amount data, thereby producing halftone data for the uniform image area, wherein the calculation system calculates the ink dot forming states over the uniform image area using the halftone data.

25. A system according to claim 22, wherein the graininess calculation system further comprises:
- a distribution calculation system that calculates a lightness value distribution of the dot forming states; and
- a frequency calculation system that calculates spatial frequencies of the lightness value distribution, wherein the graininess calculation system calculates the graininess index from the spatial frequencies.

26. A system according to claim 21, wherein the simulation system further comprises:
- a retrieval system that obtains ink ejection characteristics for a plurality of ink ejection nozzles of a printer; and
- a state calculation system that calculates the ink dot forming states using the ink ejection characteristics.

27. A system according to claim 26, wherein the ink ejection characteristics include a deviation of dot formation position due to a mechanical error of the printer.

28. A system according to claim 21, wherein the image quality index includes an index representing a total ink amount per unit area.

29. A system according to claim 21, wherein the image quality index includes a medium dependent index that is selected from a plurality of medium dependent indices according to a printing medium to be used.

30. A system according to claim 22, wherein the image quality index includes an index for evaluating a gamut size, the gamut being formed by the virtual sample patch.

31. A system for producing a profile defining correspondence between colorimetric value data and ink amount data representing a set of ink amounts of plural inks usable by a printer, the system comprising:

a spectral printing model converter configured to convert ink amount data to spectral reflectance of a color patch to be printed according to the ink amount data;

a data source of a plurality of sample ink amount data each representing a set of ink amounts of plural inks;

a conversion system that converts each sample ink amount data into spectral reflectance of a virtual sample patch to be printed with the ink amounts represented by the sample ink amount data using the spectral printing model converter;

an index calculation system that calculates an evaluation index for each sample ink amount data, the evaluation index including a color difference index and an image quality index of the virtual sample patch to be printed according to the sample ink amount data, the color difference index representing a color difference between a sample color which is calculated from the spectral reflectance and a comparative color which is selected as a basis for comparison;

a selection system that selects plural sample ink amount data based on the evaluation index; and a production system that produces a profile defining correspondence between colorimetric value data and ink amount data based on the selected plural sample ink amount data, the production system including a definition system that defines a smoothness evaluation index representing smoothness of distribution of points in a specific color space, the smoothness evaluation index being a function of coordinates of a point;

a smoothness calculation system that calculates a value of the smoothness evaluation index for the point in the specific color space corresponding to the selected sample ink amount data;

a judgment system that judges whether the smoothness evaluation index value satisfies a predetermined criterion;

when the smoothness evaluation index value does not satisfy the predetermined criterion, repeating (i) modifying the coordinates of the point in the specific color space, and (ii) calculating the smoothness evaluation index value for the point having the modified coordinates, until the smoothness evaluation index value satisfies the predetermined criterion; and a reselection system that reselects plural sample ink amount data corresponding to the modified coordinates of the point in the specific color space whose smoothness evaluation index value satisfies the predetermined criterion; and wherein the production system produces the profile defining correspondence between colorimetric value data and ink amount data based on the re-selected plural sample ink amount data.

32. A system according to claim 31, wherein the smoothness evaluation index has different functional formats at plural portions of the specific color space.

33. A system according to claim 31, wherein the smoothness evaluation index is a function of an absolute value of a combined vector of two vectors having substantially opposite directions that are oriented from a point of interest toward neighboring points.

34. A system according to claim 33, wherein when the point of interest is on an edge of a color gamut, the neighboring points are selected such that the neighboring points are located on the edge of the color gamut and on opposite sides across the point of interest.

35. A system according to claim 33, wherein when the point of interest is on an outer surface of a color gamut, the neighboring points are selected such that the neighboring points are located on the outer surface of the color gamut and on opposite sides across the point of interest.

36. A system according to claim 33, wherein when the point of interest is inside a color gamut, the neighboring points are selected such that the neighboring points are located inside the color gamut and on opposite sides across the point of interest.

37. A system for producing a profile defining correspondence between colorimetric value data and ink amount data representing a set of ink amounts of plural inks usable by a printer, the system comprising:

a spectral printing model converter configured to convert ink amount data to spectral reflectance of a color patch to be printed according to the ink amount data;

a data source of a plurality of sample ink amount data each representing a set of ink amounts of plural inks;

a conversion system that converts each sample ink amount data into spectral reflectance of a virtual sample patch to be printed with the ink amounts represented by the sample ink amount data using the spectral printing model converter;

an index calculation system that calculates an evaluation index for each sample ink amount data, the evaluation index including a color difference index and an image quality index of the virtual sample patch to be printed according to the sample ink amount data, the color difference index representing a color difference between a sample color which is calculated from the spectral reflectance and a comparative color which is selected as a basis for comparison, the image quality index including a smoothness evaluation index representing smoothness of distribution of points in a specific color space, the point representing a color of the virtual sample patch;

a selection system that selects plural sample ink amount data based on the evaluation index; and a production system that produces a profile defining correspondence between colorimetric value data and ink amount data based on the selected plural sample ink amount data.

38. A system for producing a profile defining correspondence between colorimetric value data and ink amount data representing a set of ink amounts of plural inks usable by a printer, the system comprising:

a spectral printing model converter configured to convert ink amount data to spectral reflectance of a color patch to be printed according to the ink amount data;

a data source of a plurality of sample ink amount data each representing a set of ink amounts of plural inks;

a conversion system that converts each sample ink amount data into spectral reflectance of a virtual sample patch to be printed with the ink amounts represented by the sample ink amount data using the spectral printing model converter;

an index calculation system that calculates an evaluation index for each sample ink amount data, the evaluation index including a color difference index and an image quality index of the virtual sample patch to be printed according to the sample ink amount data, the color difference index representing a color difference between a sample color which is calculated from the spectral reflectance and a comparative color which is selected as a basis for comparison, the evaluation index being obtained by averaging the color difference index and the image quality index with respective weights;

a selection system that selects plural sample ink amount data based on the evaluation index; and a production system that produces a profile defining correspondence between colorimetric value data and ink amount data based on the selected plural sample ink amount data.

* * * * *